(12) United States Patent
Ko et al.

(10) Patent No.: US 6,269,201 B1
(45) Date of Patent: Jul. 31, 2001

(54) MULTI-CHANNEL FIBER OPTICAL SWITCH

(75) Inventors: Chun-Ming Ko, Richmond; Jian-Hung Tsai, Cupertino, both of CA (US)

(73) Assignee: Lightech Fiberoptics Inc., Concord, CA (US)

( * ) Notice: Subject to any disclaimer, the term of this patent is extended or adjusted under 35 U.S.C. 154(b) by 0 days.

(21) Appl. No.: 09/131,283

(22) Filed: Aug. 7, 1998

(51) Int. Cl.[7] .................................................. G02B 6/36
(52) U.S. Cl. .............................. 385/22; 385/17; 385/18; 385/19; 385/20
(58) Field of Search .................................. 385/15–23, 24, 385/25, 47, 31, 33, 52, 59; 359/127, 128

(56) References Cited

U.S. PATENT DOCUMENTS

| | | | |
|---|---|---|---|
| 4,208,094 | 6/1980 | Tomlinson, III et al. | 350/96.2 |
| 4,220,396 | 9/1980 | Antell | 350/96.15 |
| 4,239,331 | 12/1980 | Aoyama | 350/96.2 |
| 4,303,303 | 12/1981 | Aoyama | 350/96.2 |
| 4,322,126 | 3/1982 | Minowa et al. | 350/96.2 |
| 4,447,118 | 5/1984 | Mulkey | 350/96.16 |
| 4,452,507 | 6/1984 | Winzer | 350/96.2 |
| 4,626,066 | 12/1986 | Levinson | 350/96.18 |
| 4,789,215 | 12/1988 | Anderson et al. | 350/96.19 |
| 4,790,621 | 12/1988 | Calaby et al. | 350/96.2 |
| 4,896,935 | 1/1990 | Lee | 350/96.2 |
| 4,938,555 | 7/1990 | Savage | 350/96.15 |
| 5,000,534 | 3/1991 | Watanabe et al. | 350/96.2 |
| 5,028,104 | 7/1991 | Kokoshvili | 350/91.15 |
| 5,042,889 | 8/1991 | Benzoni | 385/16 |
| 5,420,946 | 5/1995 | Tsai | 385/22 |
| 5,436,986 | 7/1995 | Tsai | 385/16 |
| 5,642,446 | 6/1997 | Tsai | 385/16 |
| 5,867,617 | * 2/1999 | Pan et al. | 385/18 |
| 5,875,271 | * 2/1999 | Laughlin | 385/16 |
| 5,903,687 | * 5/1999 | Young et al. | 385/17 |
| 5,960,132 | * 9/1999 | Lin | 385/18 |

FOREIGN PATENT DOCUMENTS

| | | | |
|---|---|---|---|
| 3147873 | 6/1983 | (DE) | 385/22 |
| 0 122 845 | * 10/1984 | (EP) . | |
| 2581204 | 10/1986 | (FR) | 350/96.16 |
| 58-72108 | 4/1983 | (JP) | 385/25 |

\* cited by examiner

*Primary Examiner*—Hemang Sanghavi
(74) *Attorney, Agent, or Firm*—Lyon & Lyon LLP

(57) ABSTRACT

A one-by-N fiber optical switch is provided wherein an optical signal is transmitted between a common optical fiber and one of a plurality of optical fibers. The one-by-N fiber optical switch includes reflector assemblies that are respectively movable between a first position and a second position to route the optical signal between the common optical fiber and the selected optical fiber. The one-by-N optical switch further includes magnetic reflector assembly movers that create electrically induced magnetic forces to respectively move the reflector assemblies between their first positions and second positions. An N-by-N optical switch can be created by cross-connecting a number of input common optical one-by-N switches with an equal number of output common optical one-by-N switches.

13 Claims, 44 Drawing Sheets

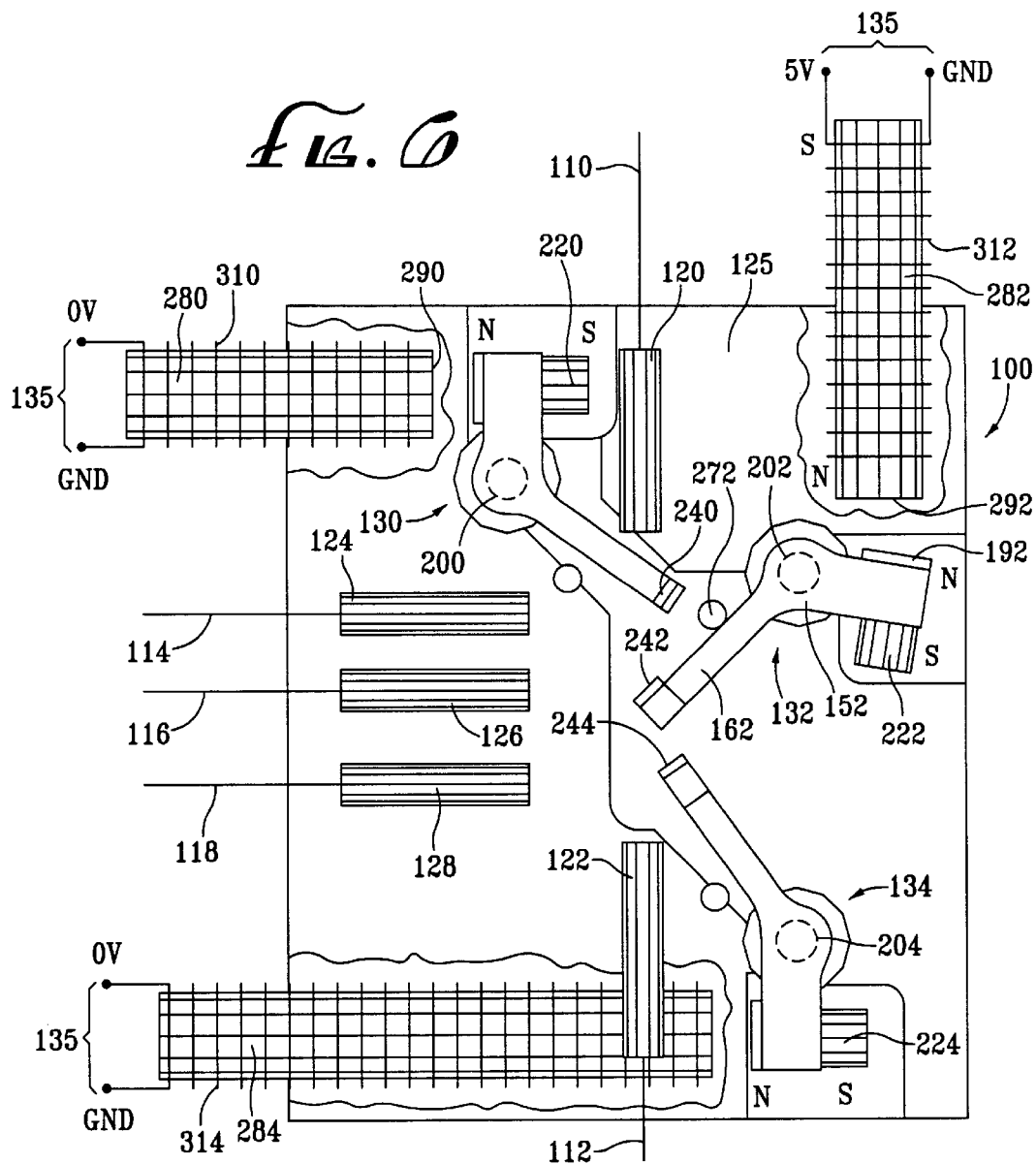

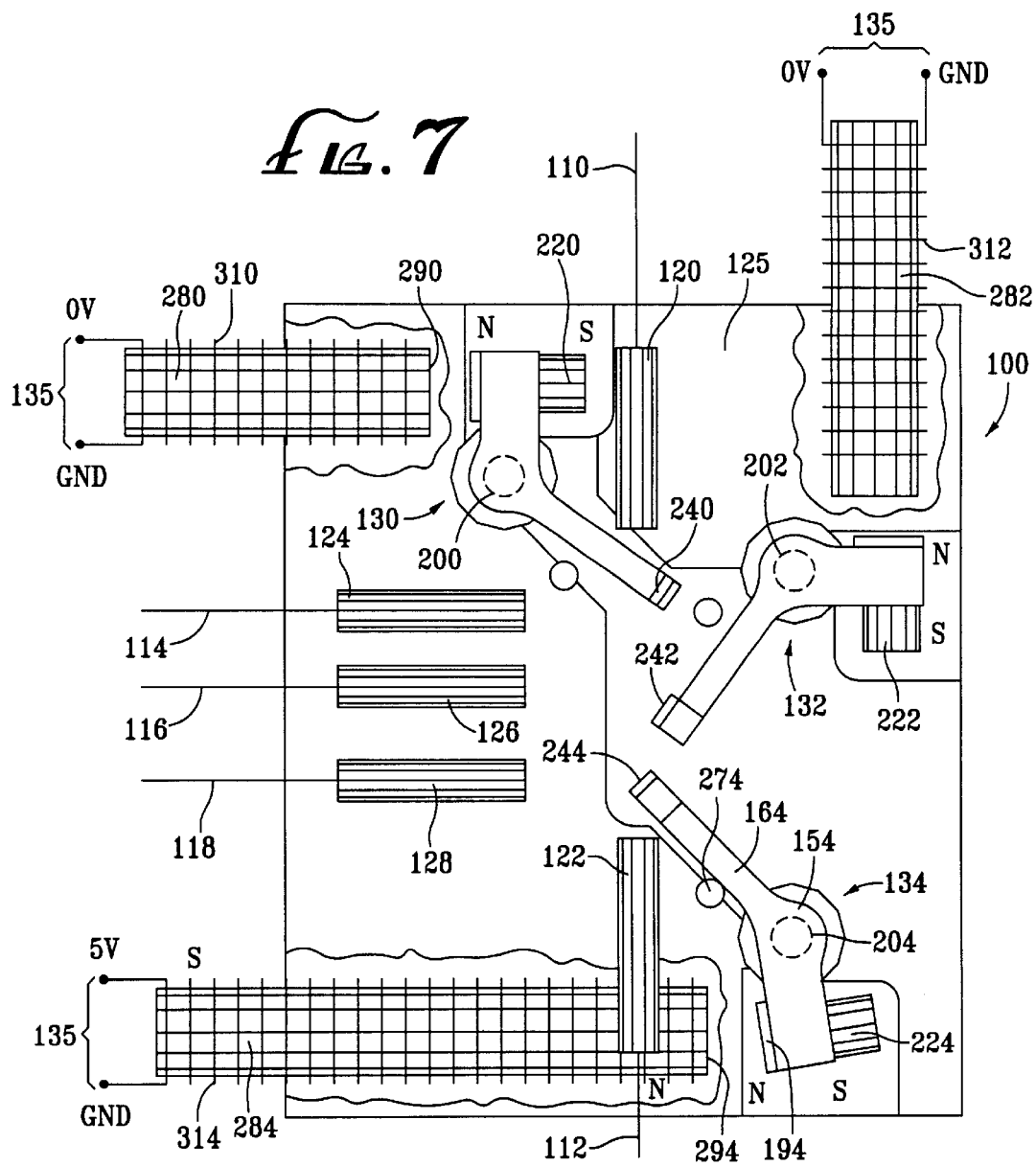

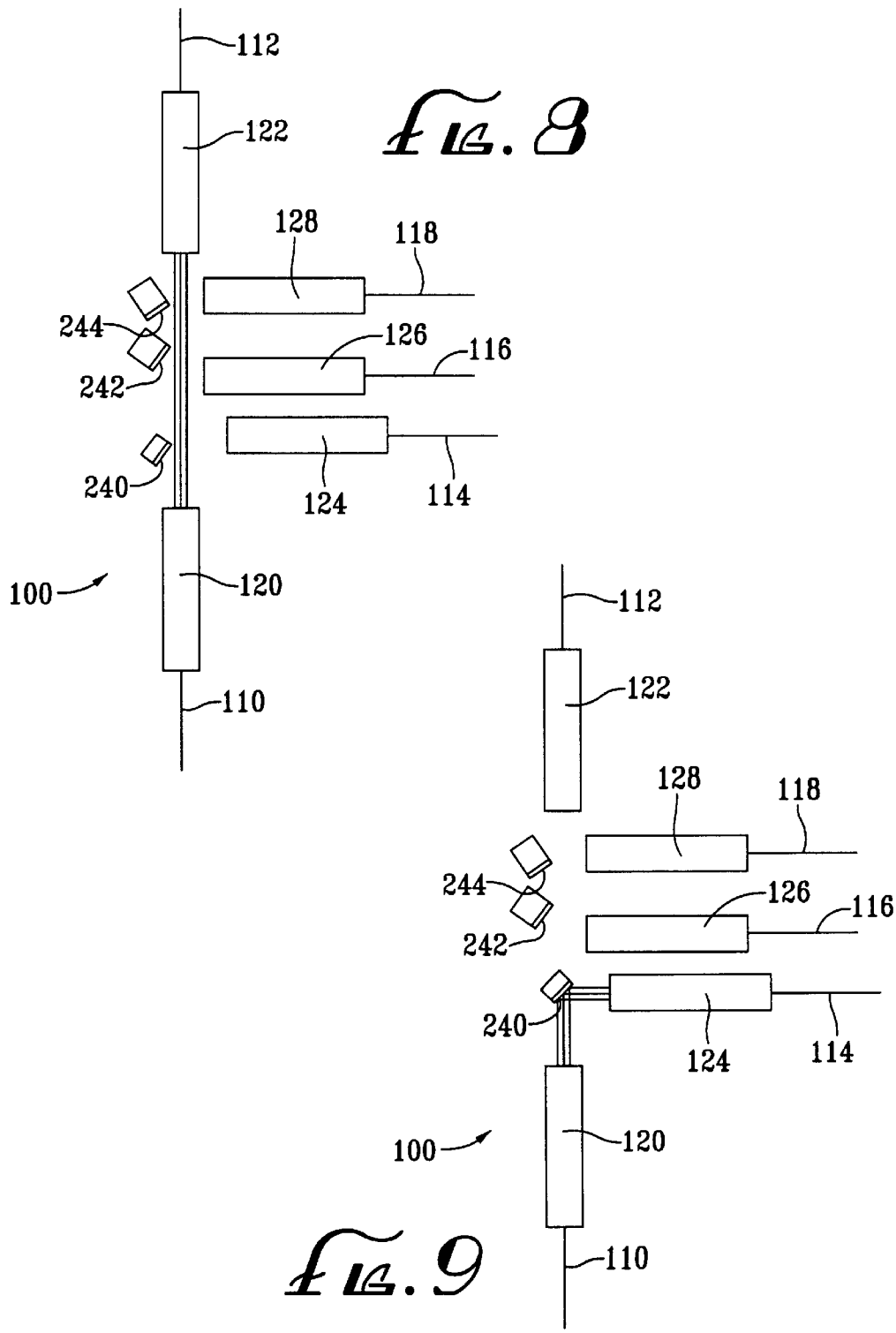

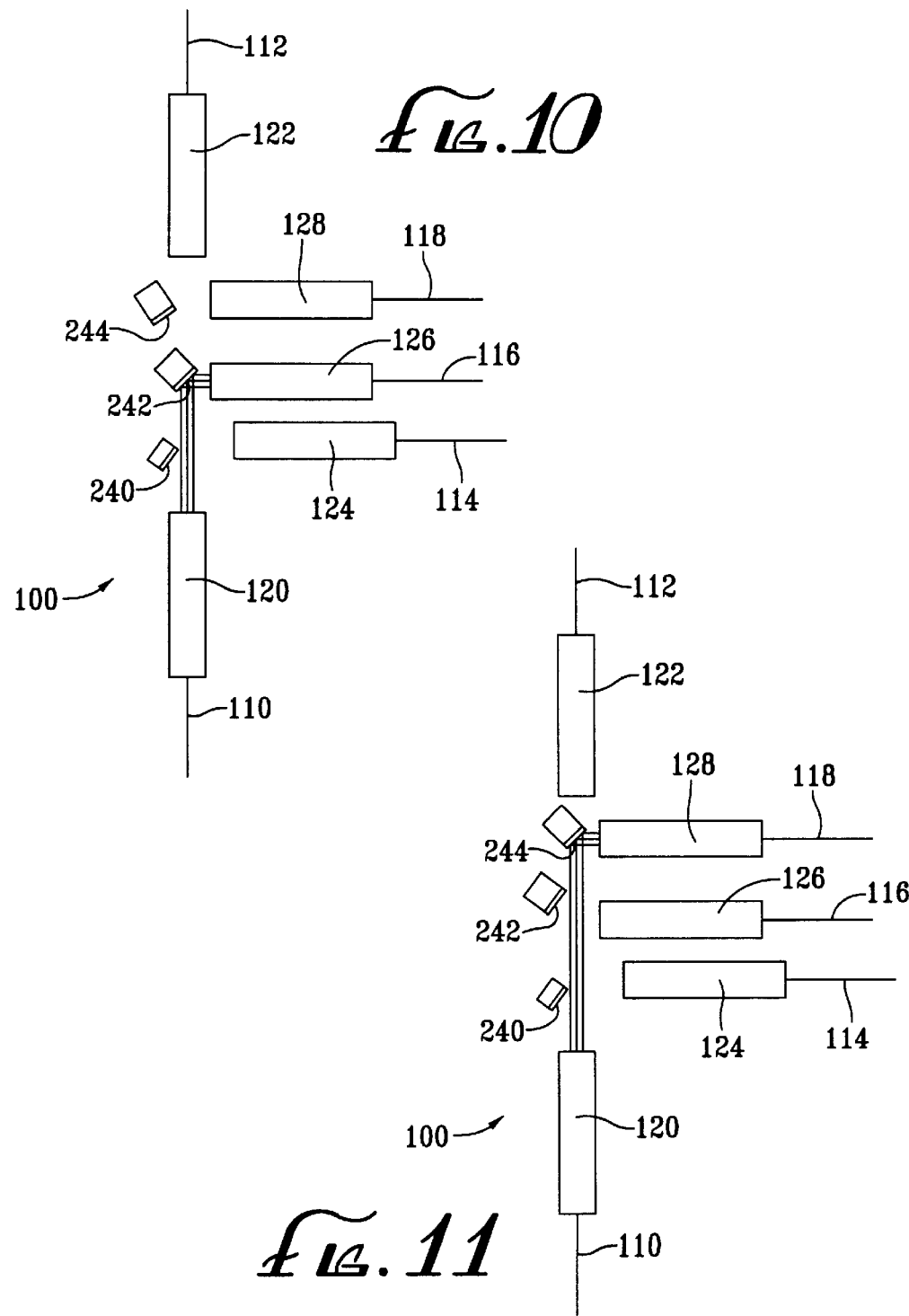

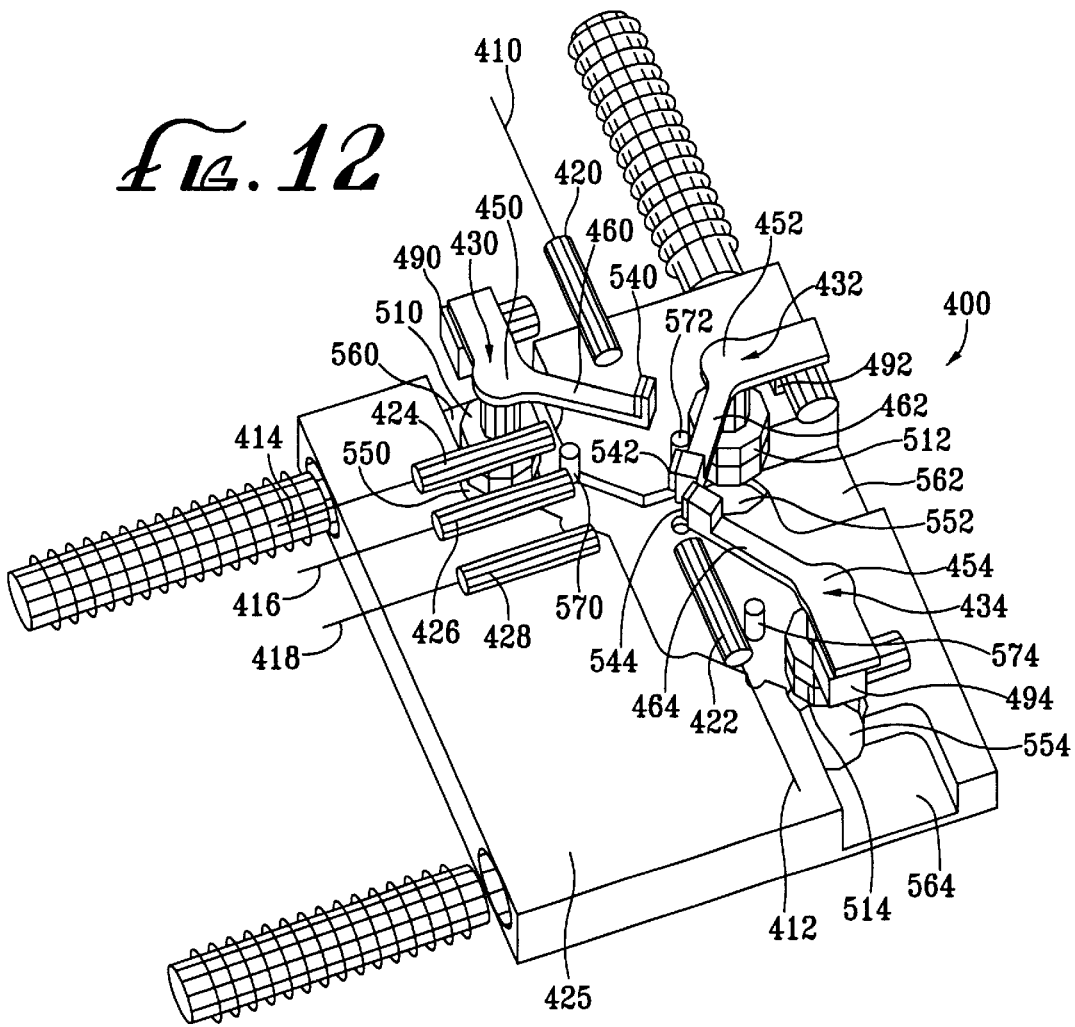

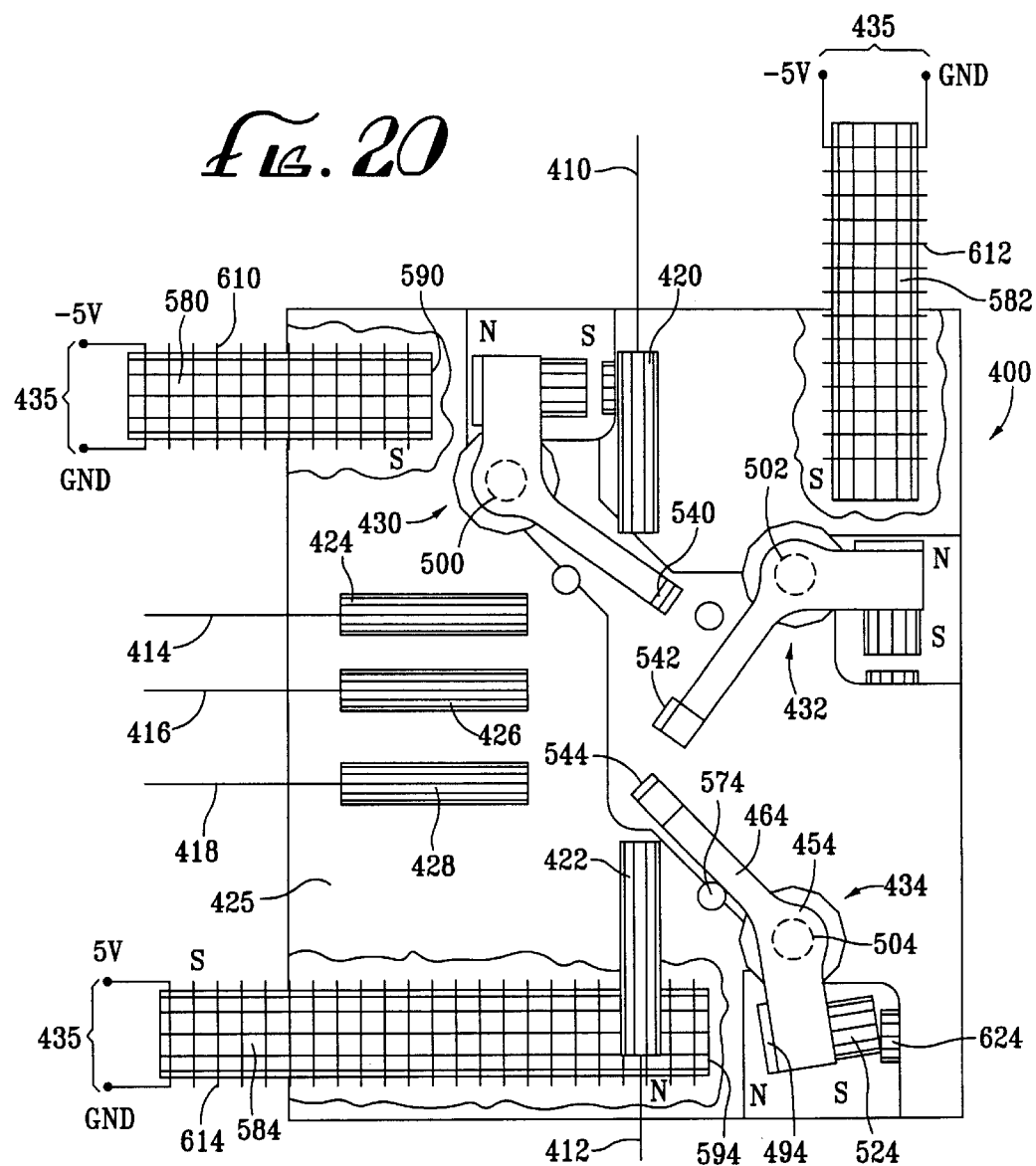

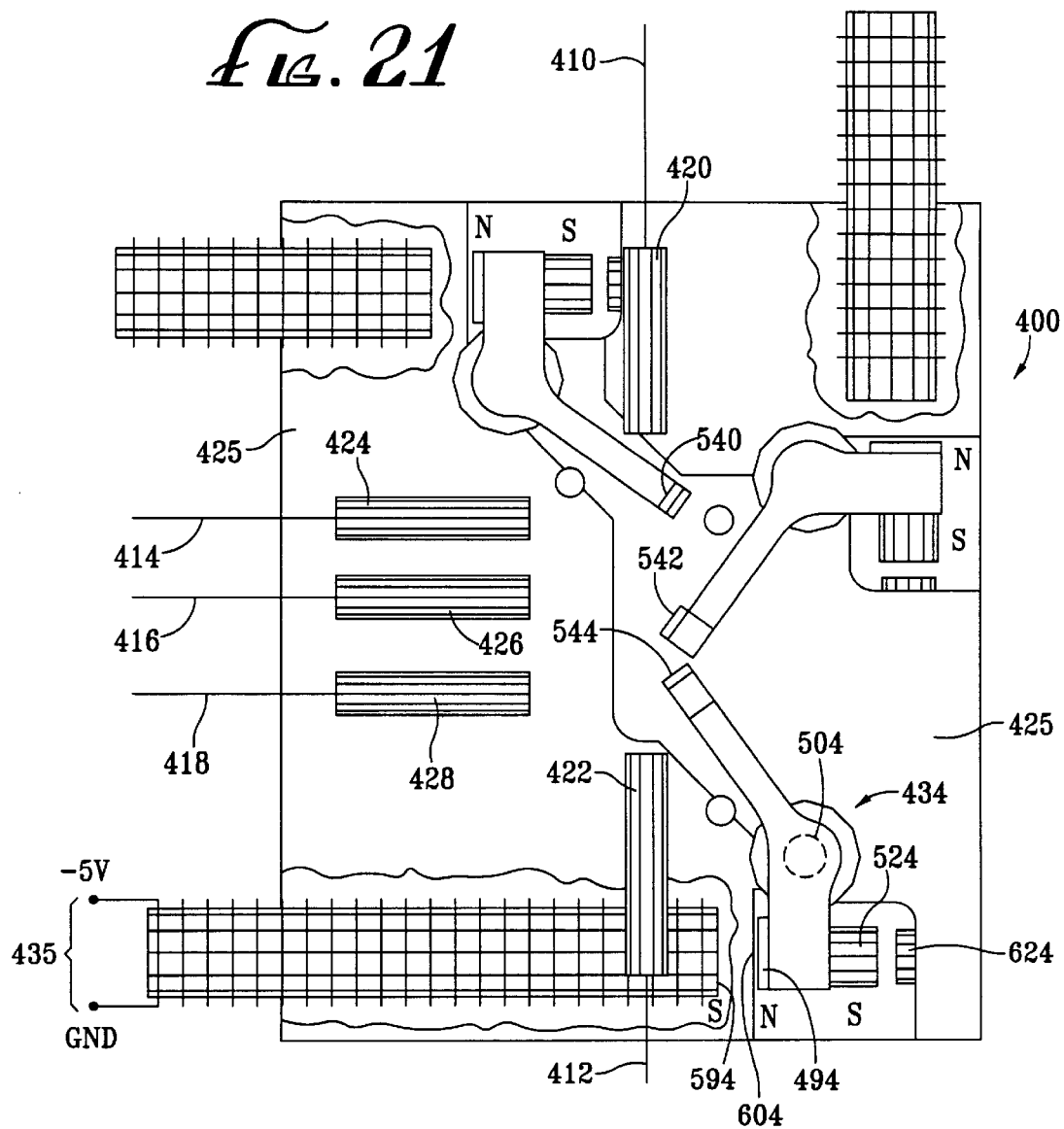

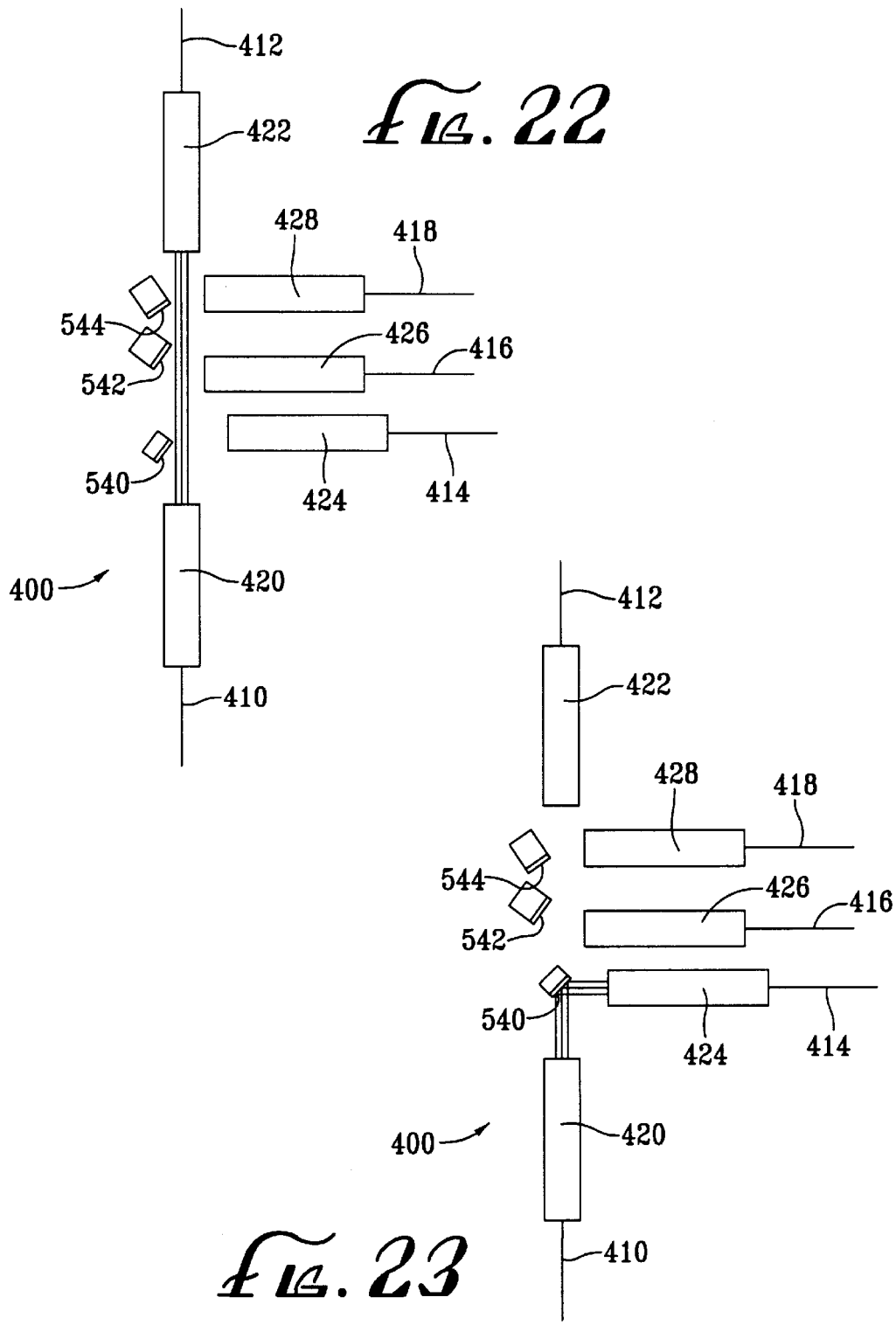

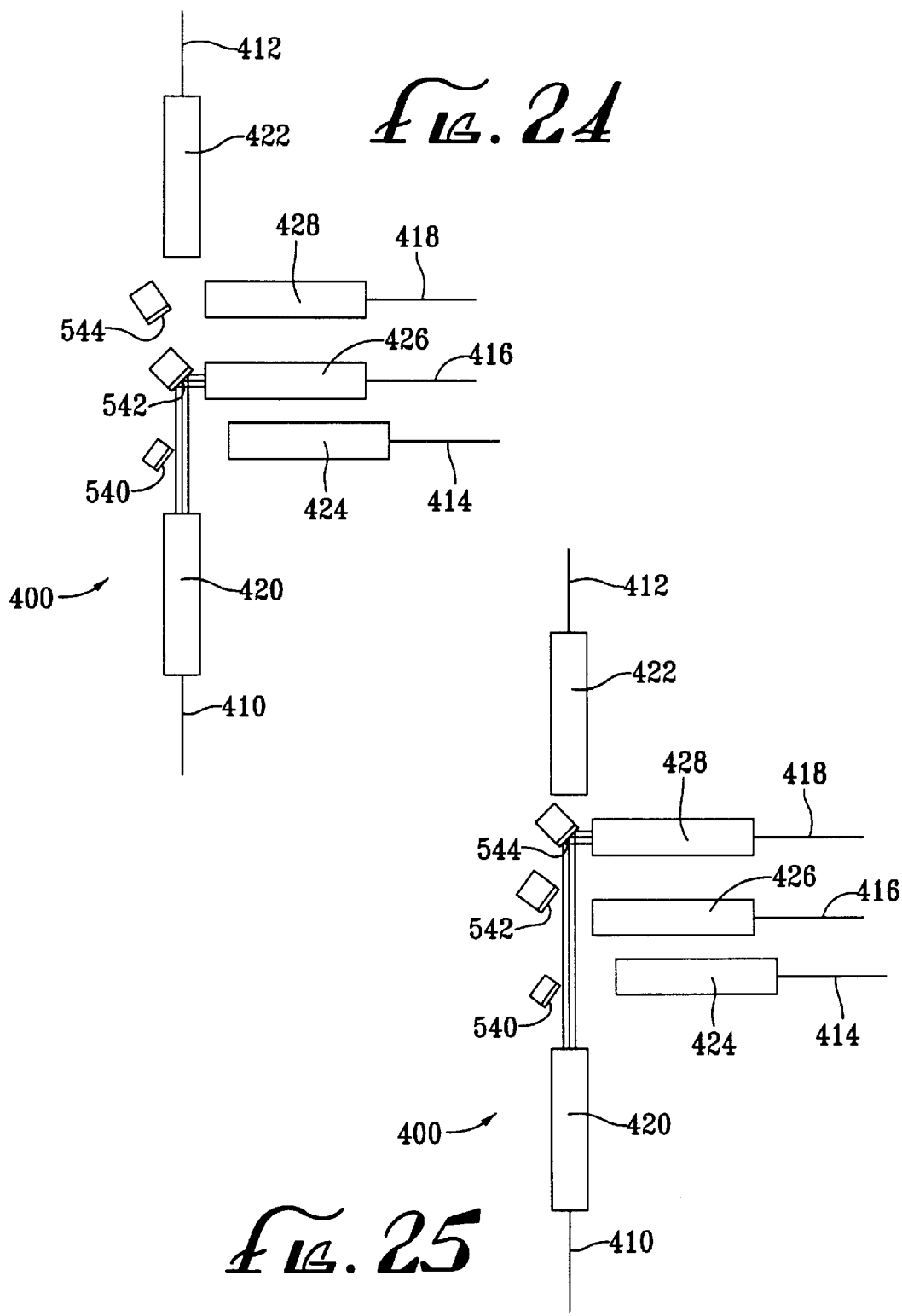

|  | | OUTPUT | | | | | | | |
|---|---|---|---|---|---|---|---|---|---|
|  | | 1 | | 2 | | 3 | | 4 | |
| INPUT | 1 | SW 1A (STATE 1) | SW 1B (STATE 1) | SW 1A (STATE 2) | SW 2B (STATE 1) | SW 1A (STATE 3) | SW 3B (STATE 1) | SW 1A (STATE 4) | SW 4B (STATE 1) |
|  | 2 | SW 2A (STATE 1) | SW 1B (STATE 2) | SW 2A (STATE 2) | SW 2B (STATE 2) | SW 2A (STATE 3) | SW 3B (STATE 2) | SW 2A (STATE 4) | SW 4B (STATE 2) |
|  | 3 | SW 3A (STATE 1) | SW 1B (STATE 3) | SW 3A (STATE 2) | SW 2B (STATE 3) | SW 3A (STATE 3) | SW 3B (STATE 3) | SW 3A (STATE 4) | SW 4B (STATE 3) |
|  | 4 | SW 4A (STATE 1) | SW 1B (STATE 4) | SW 4A (STATE 2) | SW 2B (STATE 4) | SW 4A (STATE 3) | SW 3B (STATE 4) | SW 4A (STATE 4) | SW 4B (STATE 4) |

Fig. 27

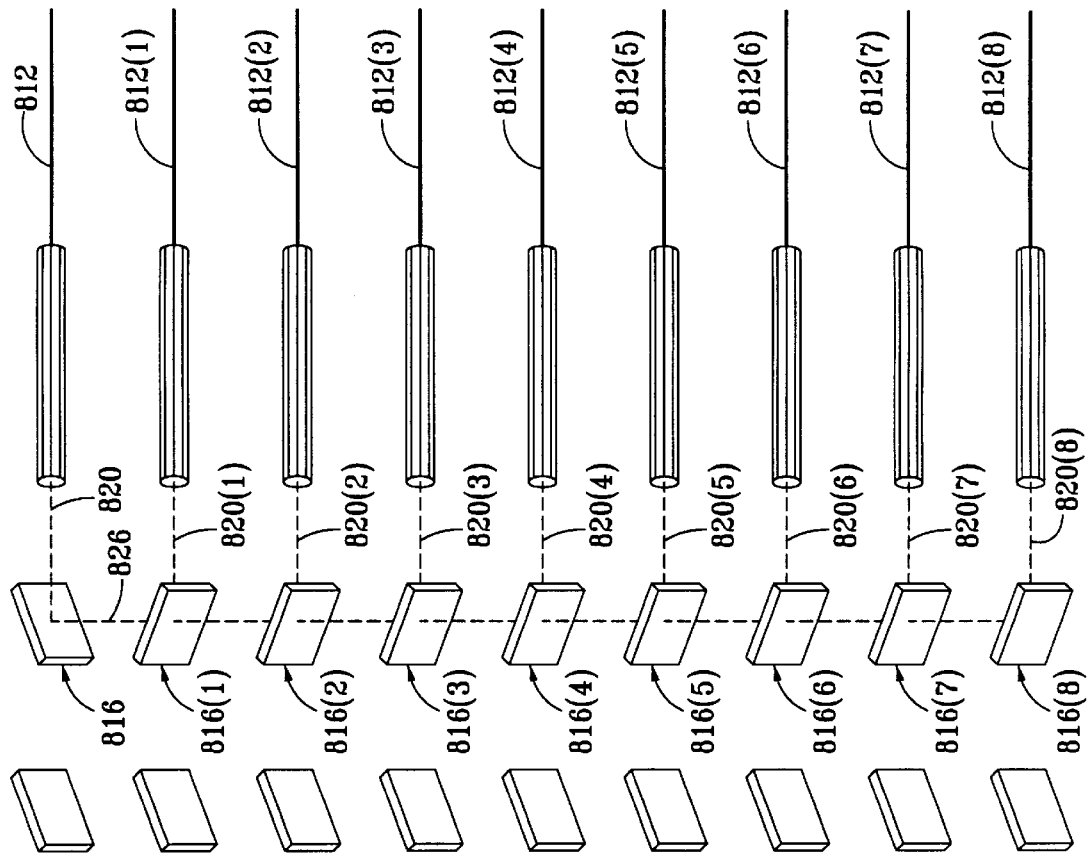
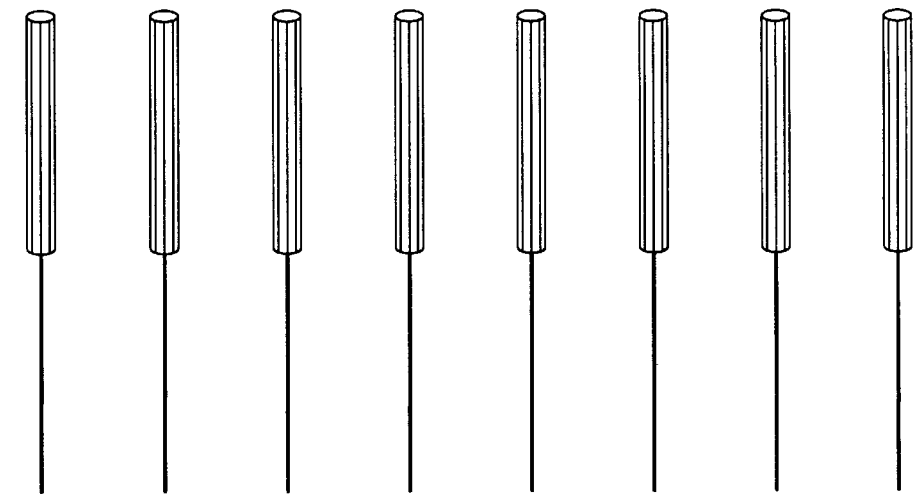
Fig. 29

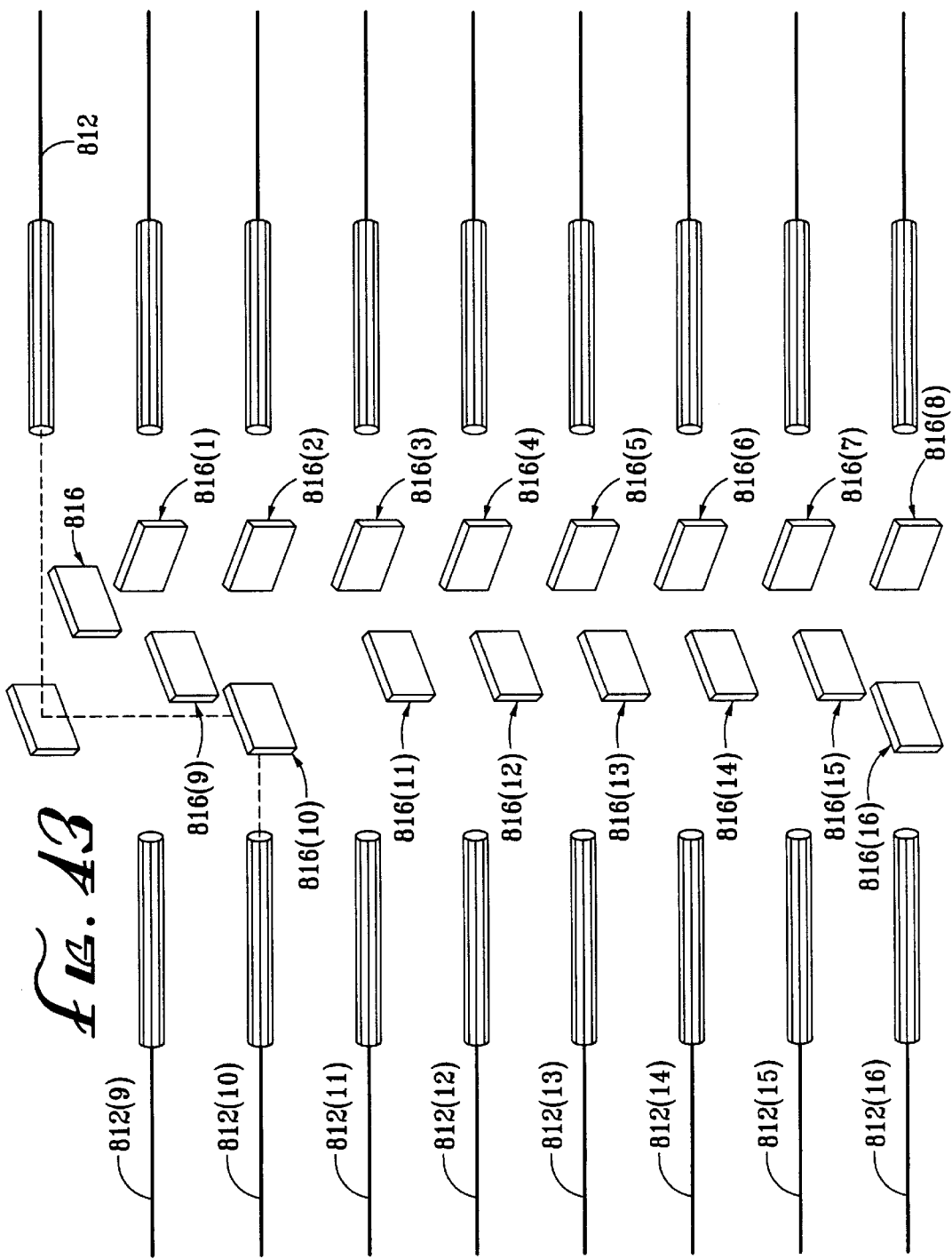

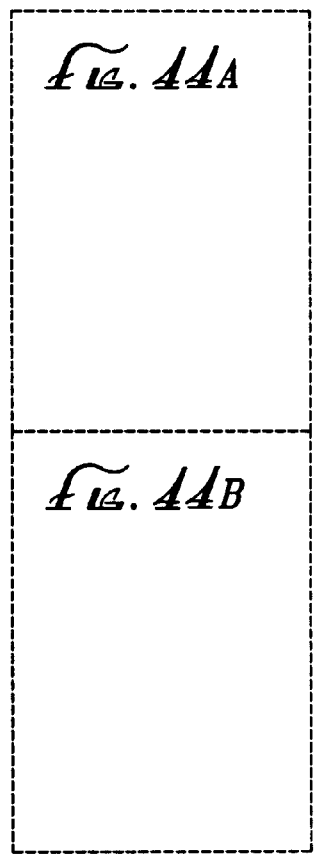

FIG. 45

MULTI-CHANNEL FIBER OPTICAL SWITCH

FIELD OF THE INVENTION

This invention relates generally to fiber optical switches, and more particularly concerns a one-by-N fiber optical switch.

BACKGROUND OF THE INVENTION

For purposes of convenience and economics, it is often desirable to employ switches in optical networks, so that either a single optical signal can be shared between two or more users or a single user can choose from a variety of optical signals without the added expense and complexity of installing additional hardware. In particular, one-by-four fiber optical switch is used to change the path of an optical signal between a single input optical fiber connected to a transmitting location and four different output optical fibers connected to receiving locations, thereby allowing four different users to access an optical signal originating from a single source. Similarly, an output common one-by-four fiber optical switch is used to change the path of an optical signal between four different input optical fibers connected to transmitting locations and a single output optical fiber connected to a receiving location, thereby allowing a single user to access four different optical signals.

In optical fiber switches, either multi-mode fiber or single-mode fiber can be used. Regardless of what type of fiber is used, it has always been very difficult to align optical paths when bare fiber is used. Because fiber cores are so small, a misalignment of a few micrometers can cause large insertion losses (i.e., the loss in signal transmission). This is especially true when using single-mode fiber.

This misalignment problem has been addressed to some extent in the prior art through the use of a Grade Refractive Index (GRIN) lens. The GRIN lens makes the fiber act as if its core diameter has been enlarged to the size of the GRIN lens diameter, thereby making the fiber core diameter behave as if it was at least ten to one-hundred times larger. As a result, insertion losses will be minimized when there is a few micrometers of misalignment between the optical signal from the input fiber to the output fiber. Inherent misalignments cannot be corrected through the use of a GRIN lens.

Currently, there are two different technologies used to make optical fiber switches (exclusive of the integrated optic switch). A first is known as moving fiber. In this technology, either the input optical fibers (or the output optical fibers) are actually reoriented to switch the optical signal between outputs, or vice versa. The second is known as moving prism or mirror. In this technology, the refractive medium (i.e., the prism) or the mirror is reoriented to switch the optical signal between outputs while the fibers do not move. These prior art technologies, however, have suffered from unacceptable insertion losses and low stability (e.g. alignment problems).

An example of an optical system that uses a moving reflector assembly is disclosed in U.S Pat. No. 5,436,986 and co-pending application, U.S. Ser. No. 08/451,527, by the same inventor as this application. Both are hereby incorporated by reference in their entirety.

SUMMARY OF THE INVENTION

The present invention overcomes the problems and disadvantages of the prior art through the use of unique arrangements of high-quality reflective surfaces and optical fibers. At least one of a plurality of optical fibers is optically aligned with a common optical fiber to create a one-by-N optical switch. The one-by-N optical switch can either be employed as an input common optical switch or an output common optical switch. An N-by-N optical switch can be created by cross-connecting a plurality of input common optical switches with an equal plurality of output common optical switches.

In accordance with the present inventions, a one-by-N optical switch includes a common optical fiber, an opposing optical fiber, and a plurality of optical fibers, and a base on which the optical fibers are fixably mounted. The opposing optical fiber is opposite to and collinear with the common optical fiber. The plurality of optical fibers are perpendicular to the common optical fiber. An equal plurality of reflector assemblies respectively associated with the plurality of optical fibers are pivotably mounted to the base. Each of the reflector assemblies are movable between a first position and a second position. When one of the reflector assemblies are in a first position, an optical signal emerging from the common optical fiber is deflected by the reflector assembly into the associated optical fiber, and vice versa; and when all of the reflector assemblies are in second positions, an optical signal emerging from the common optical fiber travels to the opposing optical fiber without deflection, and vice versa.

The one-by-N optical switch further includes a plurality of reflector assembly movers respectively and magnetically coupled to the plurality of reflector assemblies. Each reflector assembly mover creates an electrically induced magnetic force that moves the associated reflector assembly between its first position and a second position. Alternatively, each reflector assembly mover creates a passive magnetic force that tends to maintain the associated reflector assembly in its first position and/or second position.

In accordance with the present inventions, another one-by-N optical switch includes a common optical fiber, a first series of optical fibers, and a base on which the optical fibers are fixably mounted. The first series of optical fibers can be characterized as first intermediate optical fibers and a first terminal optical fiber. The first intermediate optical fibers includes one or more optical fibers. The first intermediate optical fibers are parallel to and adjacent the common optical fiber. The first terminal optical fiber is parallel to and adjacent the first intermediate optical fibers.

The one-by-N optical switch further includes a common reflector assembly associated with the common optical fiber, first intermediate reflector assemblies associated with the first intermediate optical fibers, and a first terminal reflector assembly associated with the first terminal optical fiber. The first intermediate reflector assemblies are pivotably mounted to the base. The common reflector assembly and first terminal reflector assembly can either be pivotably or fixably mounted to the base. The common reflector assembly is placed in a first position to optical engage the first series of optical fibers with the common optical fibers such that an optical signal emerging from the common optical fiber is deflected towards the first series of optical fibers, and vice versa. The first intermediate reflector assemblies are movable between a first position and a second position. When one of the first intermediate reflector assemblies are in a first position, an optical signal deflected from the common reflector assembly is further deflected into the associated first intermediate optical fiber. The first terminal reflector assembly is in a first position such that when all of the first intermediate reflector assemblies are in second positions, an optical signal deflected from the common reflector assembly is further deflected into the first terminal optical fiber, and vice versa.

The one-by-N optical switch can also include a second series of optical fibers fixably mounted to the base. The second series of optical fibers can be characterized as second intermediate optical fibers and a second terminal optical fiber. The second intermediate optical fibers include one or more optical fibers. The second intermediate optical fibers are parallel to and opposite the common optical fiber. The second terminal optical fiber is parallel to and adjacent the second intermediate optical fibers.

A common trans-series reflector assembly, second intermediate reflector assemblies and a second terminal reflector assembly are respectively associated with the common optical fiber, second intermediate optical fibers, and the second terminal optical fiber. The second intermediate reflector assemblies are pivotably mounted to the base. The common trans-series reflector assembly and the second terminal reflector assembly can either be pivotably or fixably mounted to the base. The common trans-series reflector assembly is pivotably mounted to the base. The common trans-series reflector assembly is in a first position, and the common reflector assembly is movable between a first position to optically engage the first series of optical fibers with the common optical fiber such that an optical signal emerging from the common optical fiber is deflected towards the first series of optical fibers, and vice versa; and a second position to optically engage the second series of optical fibers with the common optical fiber such that an optical signal emerging from the common optical fiber is deflected towards the second series of optical fibers by the trans-series reflector assembly, and vice versa. The second intermediate reflector assemblies are movable between a first position and a second position. When one of the second intermediate reflector assemblies are in a first position, an optical signal deflected from the trans-series common reflector assembly is further deflected into the associated second intermediate optical fiber. The second terminal reflector assembly is in a first position such that when all of the second intermediate reflector assemblies are in second positions, an optical signal deflected from the trans-series common reflector assembly is further deflected into the second terminal optical fiber, and vice versa.

The one-by-N optical switch further includes a plurality of reflector assembly movers respectively and magnetically coupled to the plurality of movable reflector assemblies. Each reflector assembly mover creates an electrically induced magnetic force that moves the associated reflector assembly between its first position and a second position. Alternatively, each reflector assembly mover creates a passive magnetic force that tends to maintain the associated reflector assembly in its first position and/or second position.

The one-by-N optical switch can either be integral or modularized, with each module including a module base, an optical fiber, a reflector assembly, and a reflector assembly mover.

The above and other features of the invention, including various novel details of construction and combination of parts, will now be more particularly described with reference to the accompanying drawings and pointed out in the claims. It will be understood that the particular device embodying the invention are shown by way of illustration only and not as limitations of the invention. The principles and features of this invention may be employed in various and numerous embodiments without departing from the free spirit of the invention.

BRIEF DESCRIPTION OF DRAWINGS

Reference is made to the accompanying drawings in which are shown illustrative embodiments of aspects of the invention, from which novel features and advantages will be apparent.

FIG. 6 is a top view of the input common one-by-four fiber optical switch in FIG. 1 showing a first reflector assembly in a first position, a second reflector assembly in a second position, and a third reflector assembly in a first position.

FIG. 7 is a top view of the input common one-by-four fiber optical switch in FIG. 1 showing a first reflector assembly in a first position, a second reflector assembly in a first position, and a third reflector assembly in a second position.

FIG. 8 is a schematic top view of the input common one-by-four fiber optical switch in FIG. 1 showing optical signals when all of the reflector assemblies are in first positions.

FIG. 9 is a schematic top view of the input common one-by-four fiber optical switch in FIG. 1 showing optical signals when a first reflector assembly is in a second position, a second reflector assembly is in a first position, and a third reflector assembly is in a first position.

FIG. 10 is a schematic top view of the input common one-by-four fiber optical switch in FIG. 1 showing optical signals when is a first reflector assembly is in a first position, a second reflector assembly is in a second position, and a third reflector assembly is in a first position.

FIG. 11 is a schematic top view of the input common one-by-four fiber optical switch in FIG. 1 showing optical signals when a first reflector assembly is in a first position, a second reflector assembly is in a first position, and a third reflector assembly is in a second position.

FIG. 12 is a perspective view of yet another embodiment of an input common one-by-four fiber optical switch made in accordance with the aspects of the present invention.

FIG. 20 is a top view of the input common one-by-four fiber optical switch in FIG. 12 showing a first reflector assembly in a first position, a second reflector assembly in a first position, and a third reflector assembly in a second position.

FIG. 21 is a top view of the input common one- by-four fiber optical switch in FIG. 12 showing a third reflector assembly being electrically driven from a second position to a first position.

FIG. 22 is a schematic top view of the input common one-by-four fiber optical switch in FIG. 12 showing optical signals when all of the reflector assemblies are in first positions.

FIG. 23 is a schematic top view of the input common one-by-four fiber optical switch in FIG. 12 showing optical signals when a first reflector assembly is in a second position, a second reflector assembly is in a first position, and a third reflector assembly is in a first position.

FIG. 24 is a schematic top view of the input common one-by-four fiber optical switch in FIG. 12 showing optical signals when a first reflector assembly is in a first position, a second reflector assembly is in a second position, and a third reflector assembly is in a first position.

FIG. 25 is a schematic top view of the input common one-by-four fiber optical switch in FIG. 12 showing optical signals when a first reflector assembly is in a first position, a second reflector assembly is in a first position, and a third reflector assembly is in a second position.

FIG. 27 is a switching table for the four-by-four fiber optical switch shown in FIG. 26.

FIG. 29 is a schematic perspective view of the one-by-sixteen fiber optical switch in FIGS. 28A–28B showing optical signal paths when a common reflector assembly is in a first position and first intermediate reflector assemblies are respectively in first positions.

FIG. 43 is a schematic perspective view of the one-by-sixteen fiber optical switch in FIG. 28 showing an optical signal path when the common reflector assembly is in a second position and a selected second intermediate reflector assembly is in a first position.

FIG. 44 depicts the arrangement of FIGS. 44A and 44B.

FIG. 45 is a switching table for the sixteen-by-sixteen fiber optical switch in FIGS. 44A and 44B.

DETAILED DESCRIPTION OF DRAWINGS

Figure 1:
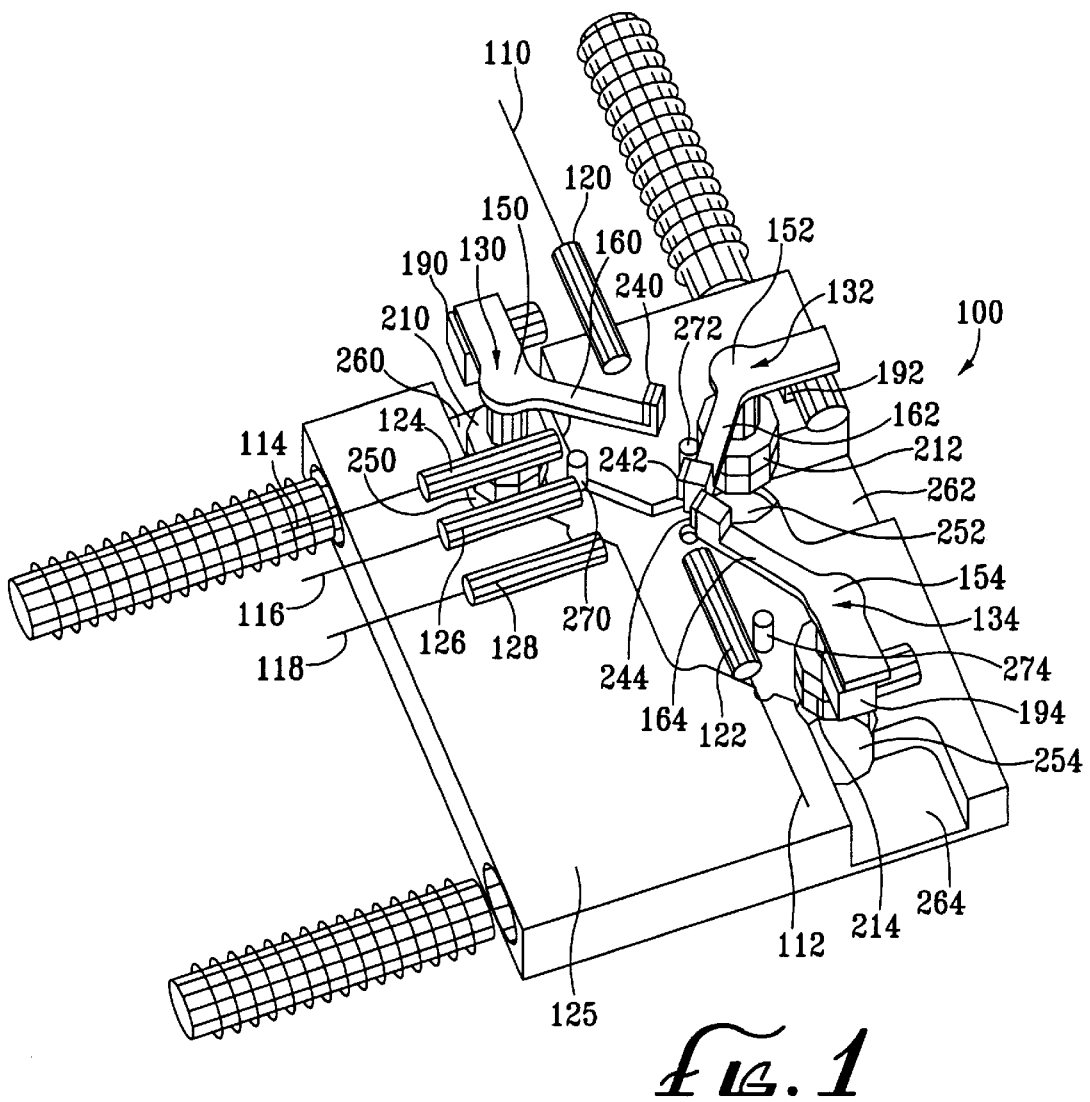
FIG. 1 is a perspective view of an embodiment of an input common one-by-four fiber optical switch made in accordance with the aspects of the present invention.

Referring to the drawings, and in particular, FIG. 1, there is shown a first embodiment of an input common one-by-four fiber optical switch 100 incorporating aspects of the invention. The switch 100 has five optical fibers, an input fiber 110, a first output fiber 112, a second output fiber 114, a third output fiber 116, and a fourth output fiber 118. Each fiber is in a fixed position. Placed in front of each fiber are one-quarter pitch Grade Refractive Index (GRIN) lenses 120, 122, 124, 126, and 128, respectively. The purpose of the GRIN lenses are to collimate light to produce a parallel and focused optical beam. As is apparent from FIG. 1, the input fiber 110 is placed opposite to and collinear with the first output fiber 112, while the second, third, and fourth output fibers 114, 116, and 118 are adjacent and parallel to each other and perpendicular to the input fiber 110 and first output fiber 112.

Figure 2:
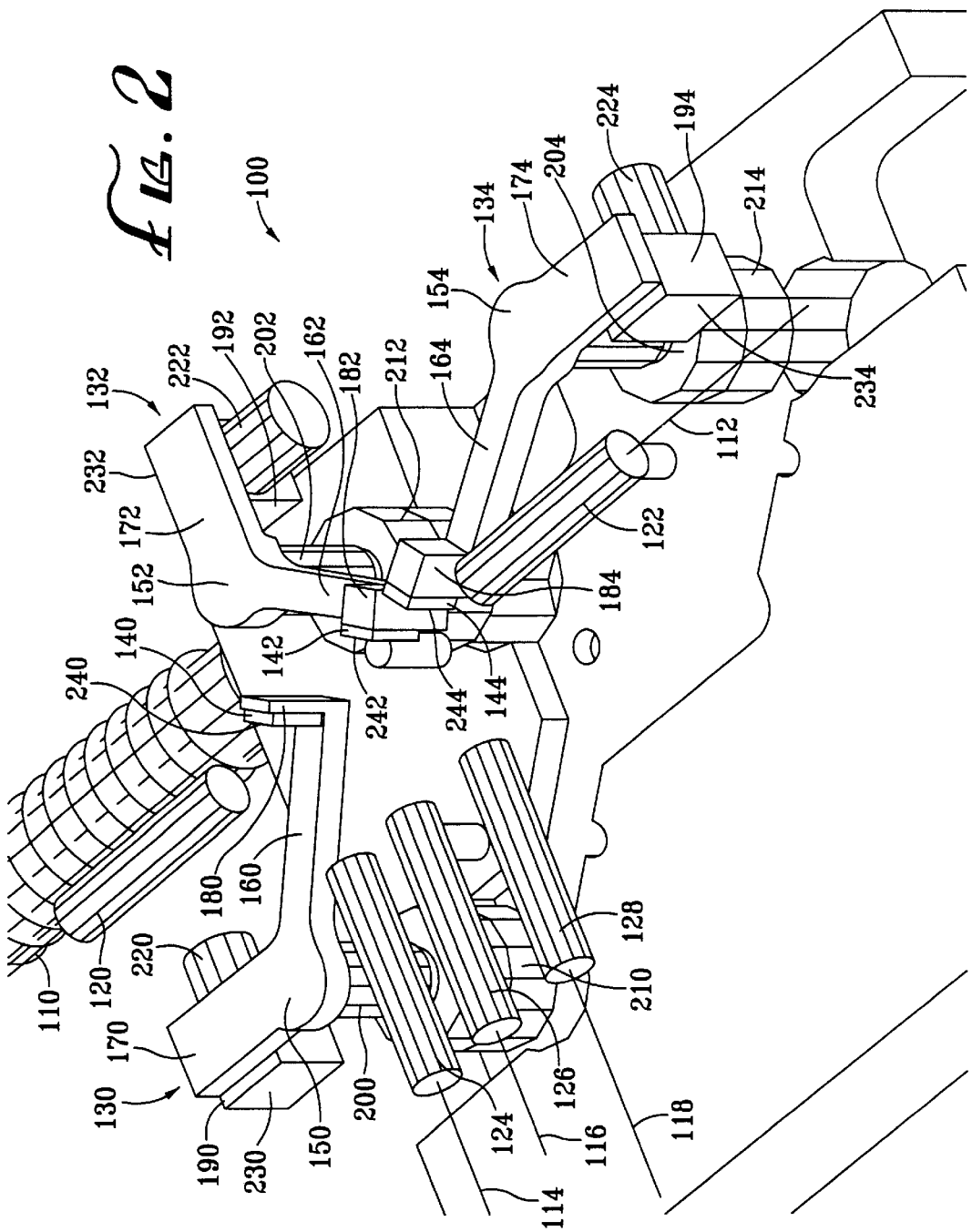
FIG. 2 is a perspective view of the reflector assemblies of the input common one-by-four fiber optical switch in FIG. 1.

The switch 100 has a first reflector assembly 130, a second reflector assembly 132, and a third reflector assembly 134. With reference to FIG. 2, the first reflector assembly 130 comprises a reflector 140 and an armature 150 having a first arm 160 and a second arm 170 that are preferably integral to each other. The first arm 160 comprises a vertical flange 180. In a preferred embodiment, the reflector 140 has a single flat, front-coated mirror surface 240, and is affixed to the vertical flange 180. Other types of reflectors, e.g., spherical reflectors, can be used as well without departing from the scope of the invention. When the first reflector assembly 110 is in a first position, i.e., out of the optical signal's path, as will be described, the mirror surface 240 is not located between the input fiber 110 and the first output fiber 112. When the first reflector assembly 130 is in a second position, i.e., in the optical signal's path, as will be described, the mirror surface 240 is located between the input fiber 110 and the first output fiber 112 and faces the input fiber 110 at a forty-five degree angle. A rotation stop 190 is connected to the bottom of the second arm 170. A support 200 is connected to the center of armature 150. Support 200 is rotatably mounted in bearing assembly 210.

Figure 4:
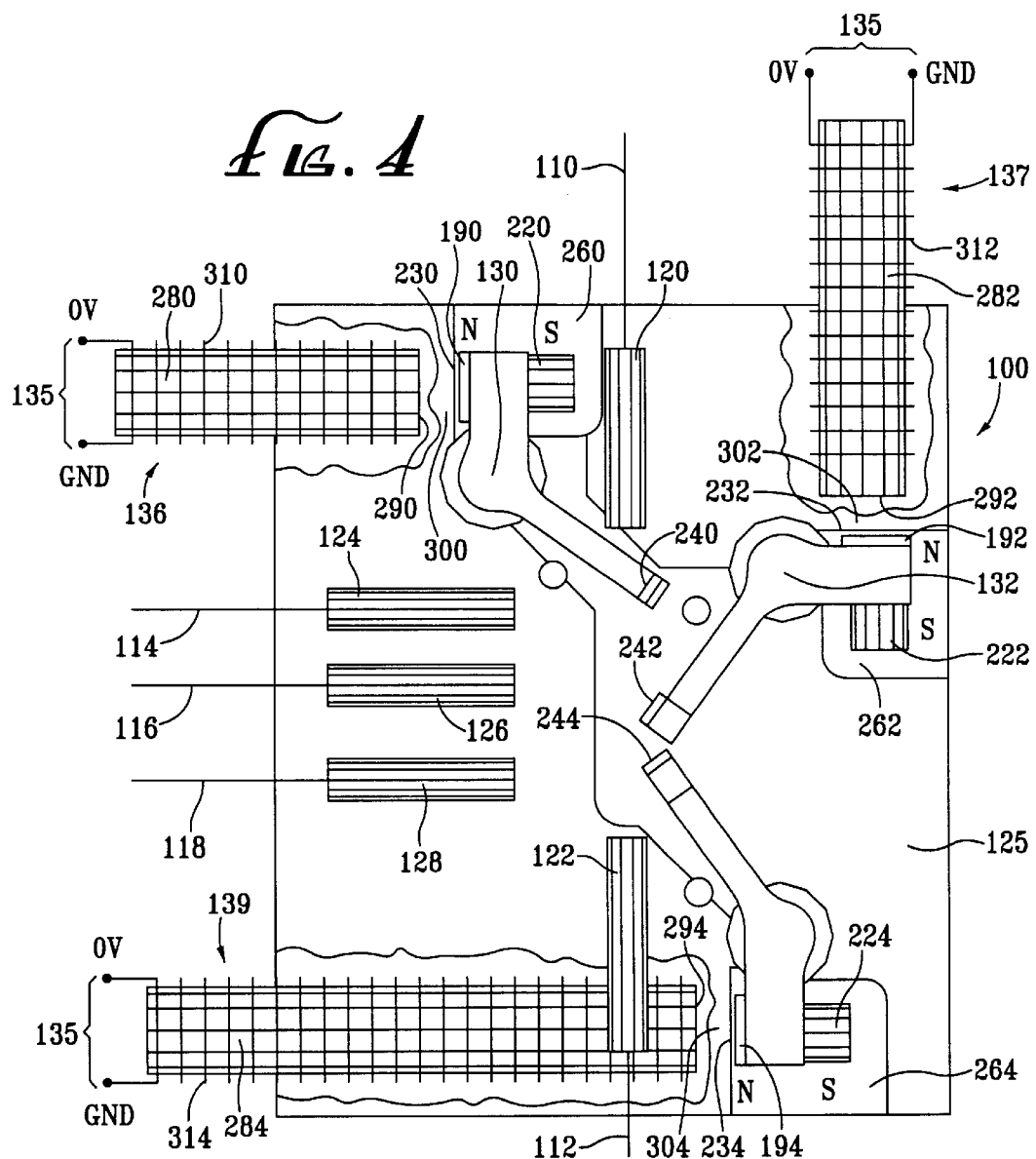
FIG. 4 is a top view of the input common one-by-four fiber optical switch in FIG. 1 showing all of the reflector assemblies in first positions.

As seen in FIGS. 2 and 4, rotation stop 190 maintains magnet 220 in the first reflector assembly 130. Magnet 220 is installed such that a portion of it exists within the rotation stop 190 and a portion exists external to rotation stop 190. Rotation stop 190 has an integral portion 230. As will be discussed in more detail below, the integral portion 230 of rotation stop 190 is arranged such that the first reflector assembly 130 can be moved to its first position.

Figure 3:
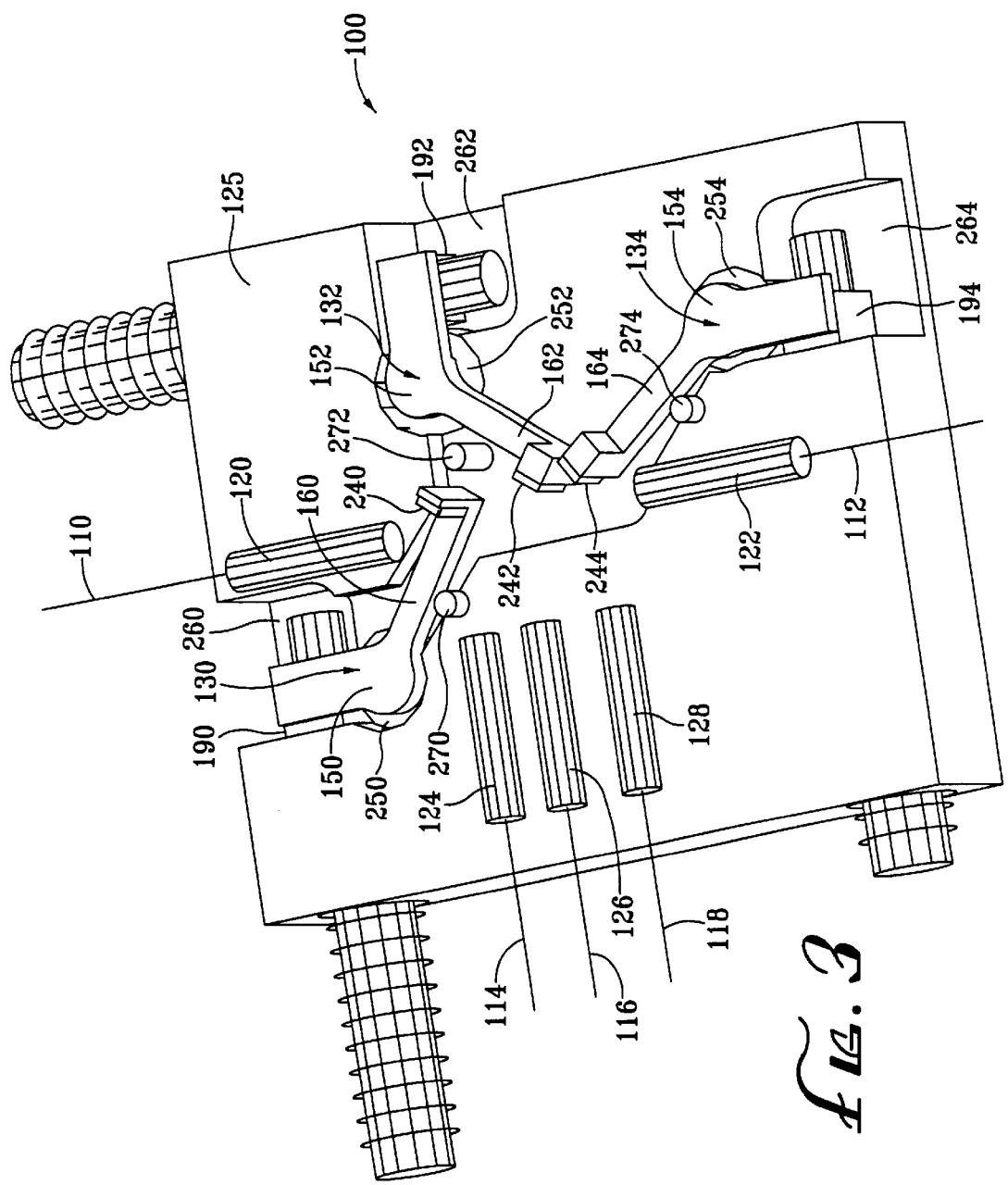
FIG. 3 is a perspective view of the reflector assemblies mounted in a switch base of the input common one-by-four fiber optical switch in FIG. 1 showing all of the reflector assemblies are in first positions.

Referring to FIGS. 1 and 3, the first reflector assembly 130 is mated to a switch base 125. The switch base 125 is arranged such that the first reflector assembly 130 fits therein via bearing assembly 210 to allow the first reflector assembly 130 to rotate in an arcuate manner. Specifically, switch base 125 comprises a first cavity 250, which receives bearing assembly 210 (shown in FIG. 2). Bearing assembly 210 is preferably inserted therein in a snug fashion. The first cavity 250 is located such that the center of the mirror surface 240 is placed at the intersection of the optical signal paths of the input fiber 110 and second output fiber 114 when the first reflector assembly 130 is in its second position, as will be discussed below. The switch base 125 has a first opening 260 adjacent to the first cavity 250 that allows the rotation stop 190 to arcuately move when the first reflector assembly 130 moves from its first position to its second position, and vice versa. The first opening 260 restricts the movement of rotation stop 190 such that the first reflector assembly 130 can come to rest in its first position, as discussed below. A first stationary stop 270 is installed in switch base 125. Stationary stop 270 restricts the movement of the first arm 160 of armature 150 such that the first is reflector assembly 130 can come to rest in its second position, as discussed below.

With further reference to FIG. 4, a first reflector assembly mover 135 is described. The first reflector assembly mover 135 includes a first soft iron 280 disposed in the switch base 125. The first soft iron 280 is installed in the switch base 125 such that it extends into the core of the switch base 125. This is done so that end 290 is located substantially close to a stop wall 300 bounding first opening 260 inside the switch base 125. In the embodiment of FIG. 4, the first soft iron 280 preferably does not break through the stop wall 300. Wound around the first soft iron 280 is wire 310, which, as will be discussed below, is used to create the magnetic fields used to rotate the first reflector assembly 130 with arcuate movements.

With reference to FIG. 2, the second reflector assembly 132 comprises a reflector 142 and an armature 152 having a first arm 162 and a second arm 172 that are preferably integral to each other. The first arm 162 comprises a vertical flange 182. In a preferred embodiment, the reflector 142 has a single flat, front coated mirror surface 242, and is affixed to the vertical flange 182. Other types of mirrors, e.g., spherical mirrors, can be used as well without departing from the scope of the invention. When the second reflector assembly 132 is in a first position, i.e., out of the optical signal's path, as will be described, the mirror surface 242 is not located between the input fiber 110 and the first output fiber 112. When the second reflector assembly 132 is in a second position, i.e., in the optical signal's path, as will be described, the mirror surface 242 is located between the input fiber 110 and the first output fiber 112 and faces the input fiber 110 at a forty-five degree angle. A rotation stop 192 is connected to the bottom of the second arm 172. A support 202 is connected to the center of armature 152. Support 202 is rotatably mounted in bearing assembly 212.

As seen in FIGS. 2 and 4, rotation stop 192 maintains magnet 222 in the second reflector assembly 132. Magnet 222 is installed such that a portion of it exists within the rotation stop 192 and a portion exists external to rotation stop 192. Rotation stop 192 has an integral portion 232. As will be discussed in more detail below, the integral portion 232 of rotation stop 192 is arranged such that the second reflector assembly 132 can be moved to its first position.

Referring to FIGS. 1 and 3, the second reflector assembly 132 is mated to a switch base 125. The switch base 125 is arranged such that the second reflector assembly 132 fits therein via bearing assembly 212 to allow the second reflector assembly 132 to rotate in an arcuate manner. Specifically, switch base 125 comprises a second cavity 252 which receives bearing assembly 212, (see FIG. 2). Bearing assembly 212 is preferably inserted therein in a snug fashion. The second cavity 252 is located such that the center of the mirror surface 242 is placed at the intersection of the optical signal paths of the input fiber 110 and third output fiber 116 when the second reflector assembly 132 is in its second position, as will be discussed below. The switch base 125 has a second opening 262 adjacent to the second cavity 252 which allows the rotation stop 192 to arcuately move when the second reflector assembly 132 moves from its first position to its second position, and vice versa. The second opening 262 restricts the movement of rotation stop 192 such that the second reflector assembly 132 can come to rest in its first position, as discussed below. A second stationary stop 272 is installed in switch base 125. Stationary stop 272 restricts the movement of the first arm 162 of armature 152 such that the second reflector assembly 132 can come to rest in its second position, as discussed below.

With further reference to FIG. 4, a second reflector assembly mover 137 is described. The second reflector assembly mover 137 includes a second soft iron 282 disposed in the switch base 125. The second soft iron 282 is installed in the switch base 125 such that it extends into the core of the switch base 125. This is done so that one end 292 is located substantially close to a stop wall 302 bounding second opening 262 inside the switch base 125. In the embodiment of FIG. 4, the second soft iron 282 preferably does not break through the stop wall 302. Wound around the second soft iron 282 is wire 312, which, as will be discussed below, is used to create the magnetic fields used to rotate the second reflector assembly 132 with arcuate movements.

With reference to FIG. 2, the third reflector assembly 134 comprises a reflector 144 and an armature 154 having a first arm 164 and a second arm 174 that are preferably integral to each other. The first arm 164 comprises a vertical flange 184.

In a preferred embodiment, the reflector 144 has a single flat, front coated mirror surface 244, and is affixed to the vertical flange 184. Other types of mirrors, e.g., spherical mirrors, can be used as well without departing from the scope of the invention. When the third reflector assembly 134 is in a first position, i.e., out of the optical signal's path, as will be described, the mirror surface 244 is not located between the input fiber 110 and the first output fiber 112. When the third reflector assembly 134 is in a second position, i.e., in the optical signal's path, as will be described, the mirror surface 244 is located between the input fiber 110 and the first output fiber 112 and faces the input fiber 110 at a forty-five degree angle. A rotation stop 194 is connected to the bottom of the second arm 174. A support 204 is connected to the center of armature 154. Support 204 is rotatably mounted in bearing assembly 214.

As seen in FIGS. 2 and 4, rotation stop 194 maintains magnet 224 in the third reflector assembly 134. Magnet 224 is installed such that a portion of it exists within the rotation stop 194 and a portion exists external to rotation stop 194. Rotation stop 194 has an integral portion 234. As will be discussed in more detail below, the integral portion 234 of rotation stop 194 is arranged such that the third reflector assembly 134 can be moved to its first position.

Referring to FIGS. 1 and 3, the third reflector assembly 134 is mated to a switch base 125. The switch base 125 is arranged such that the third reflector assembly 134 fits therein via bearing assembly 214 to allow the third reflector assembly 134 to rotate in an arcuate manner. Specifically, switch base 125 comprises a third cavity 254, which receives bearing assembly 214 (see FIG. 2). Bearing assembly 214 is preferably inserted therein in a snug fashion. The third cavity 254 is located such that the center of the mirror surface 244 is placed at the intersection of the optical signal paths of the input fiber 110 and fourth output fiber 118 when the third reflector assembly 134 is in its second position, as will be discussed below. The switch base 125 has a third opening 264 adjacent to the third cavity 254 that allows the rotation stop 194 to arcuately move when the third reflector assembly 134 moves from its first position to its second position, and vice versa. The third opening 264 restricts the movement of rotation stop 194 such that the third reflector assembly 134 can come to rest in its first position, as discussed below. A third stationary stop 274 is installed in switch base 125. Stationary stop 274 restricts the movement of the first arm 164 of armature 154 such that the third reflector assembly 134 can come to rest in its second position, as discussed below.

With further reference to FIG. 4, a third reflector assembly mover 139 is described. The third reflector assembly mover 139 includes a third soft iron 284 disposed in the switch base 125. The third soft iron 284 is installed in the switch base 125 such to that it extends into the core of the switch base 125. This is done so that one end 294 is located substantially close to a stop wall 304 bounding third opening 264 inside the switch base 125. In the embodiment of FIG. 4, the third soft iron 284 preferably does not break through the stop wall 304. Wound around the third soft iron 284 is wire 314, which, as will be discussed below, is used to create the magnetic fields used to rotate the third reflector assembly 134 with arcuate movements.

FIGS. 4–7 show how the application of current to the wires 310, 312, and 314 by power supply 135 can create electrically induced magnetic fields, and therefore cause movement of the first reflector assembly 130, second reflector assembly 132, and third reflector assembly 134. The polarities of magnets 220, 222, and 224 in the examples shown in FIGS. 4–7 are such that the portions extending out of rotation stops 190, 192, and 194 have southern magnetic polarities and the portions within rotation stops 190, 192, and 194 have a northern magnetic polarities.

FIG. 4 shows the positioning of the first reflector assembly 130, second reflector assembly 132, and third reflector assembly 134 when no current is applied to either of the wires 310, 312, and 314. In this case, because no current is applied to wires 310, 312, and 314, no electrically induced magnetic fields are created about first soft iron 280, second soft iron 282, or third soft iron 284. Thus, first reflector assembly 130, second reflector assembly 132, and third reflector assembly 134 will not rotate about supports 200, 202, and 204, respectively. Instead, the passive magnetic attraction between the first soft iron 280, second soft iron 282, and third soft iron 284 and the respective northern magnetic poles of magnets 220, 222, and 224 force the integral portions 230, 232, and 234 of rotation stops 190, 192, and 194, respectively, to rest against stop walls 300, 302, and 304, respectively.

With reference to FIGS. 4 and 8, when the first reflector assembly 130, the second reflector assembly 132, and the third reflector assembly 134 are each in their first position, none of the reflector surfaces 240, 242, and 244 interfere with the paths of the optical signals emerging from the input fiber 110. Thus, the switch 100 is in a first state, and optical signals from GRIN lens 120 affixed to input fiber 110 travel without reflection to GRIN lens 122 affixed to first output fiber 112.

Figure 5:
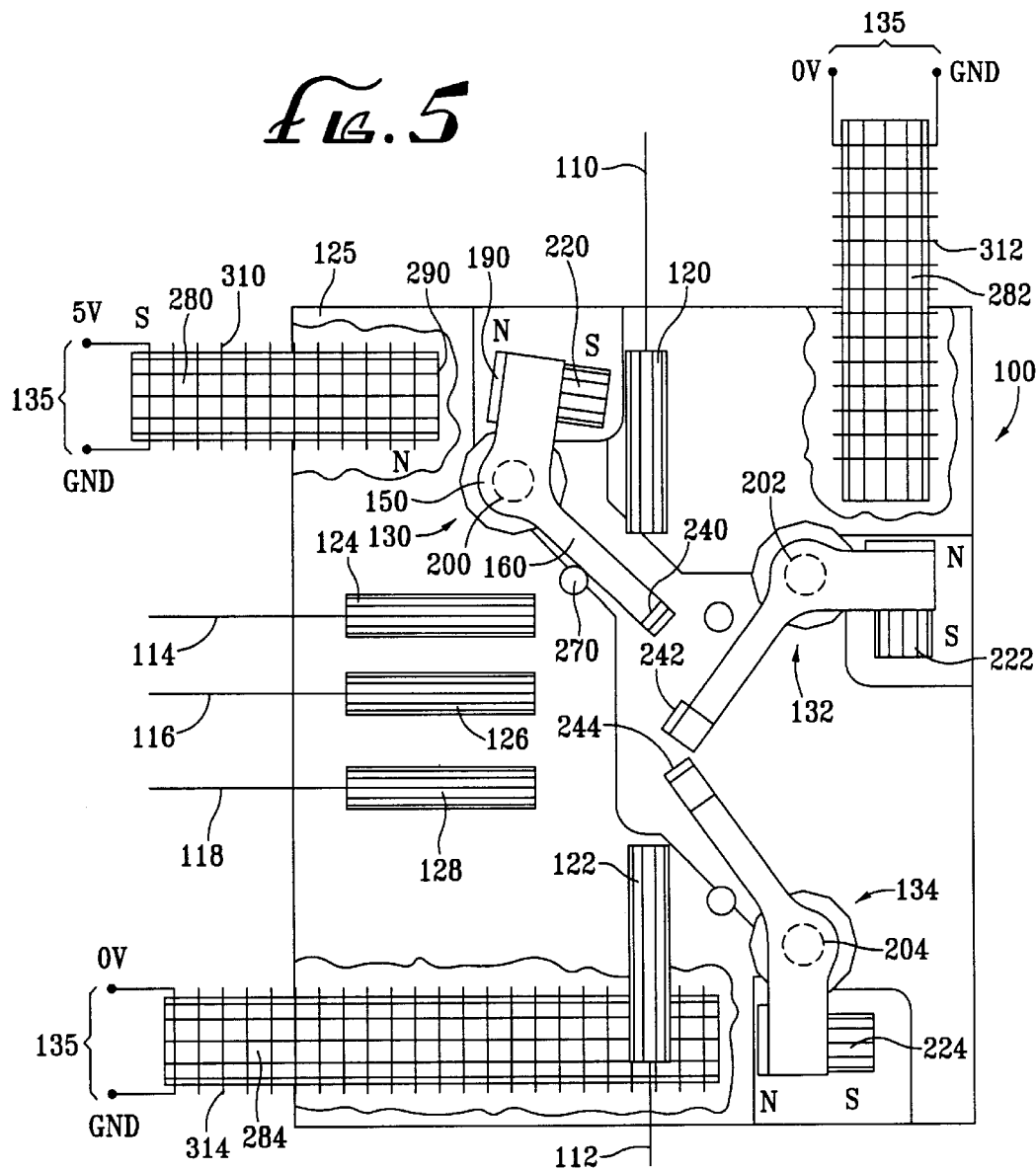
FIG. 5 is a top view of the input common one-by-four fiber optical switch in FIG. 1 showing a first reflector assembly in a second position, a second reflector assembly in a first position, and a third reflector assembly in a first position.

FIG. 5 shows the polarity of the magnetic fields created when current is applied only to wire 310 by power supply 135, thereby inducing a magnetic field about first soft iron 280. In the embodiment shown, the wire 310 is wound such that a northern magnetic field is created at the end 290 of first soft iron 280 inside the switch base 125 when the current in wire 310 flows in an appropriate direction. This northern magnetic field repels the northern magnetic pole of magnet 220 located in rotation stop 190. This force acts to rotate the first reflector assembly 130 about support 200.

When the first reflector assembly 130 rotates about support 200, the first arm 160 of armature 150 of the first reflector assembly 130 rotates against the first stationary stop 270 of switch base 125, thereby moving the first reflector assembly 130 from its first position to its second position. Since no current is applied to wires 312 and 314 by power supply 135, no electrically induced magnetic fields are created about second soft iron 282 and third soft iron 284, and therefore, the second reflector assembly 132 and the third reflector assembly 134 will not rotate about supports 202 and 204, respectively. Instead, the passive magnetic attraction between the second soft iron 282 and third soft iron 284 and the northern magnetic poles of respective magnets 222 and 224 maintains the second reflector assembly 132 and the third reflector assembly 134 in first positions, as described above.

With reference to FIGS. 5 and 9, the first reflector assembly 130 is in its second position, and the second reflector assembly 132 and third reflector assembly 134 each remain in their first position. As such, only the reflector surface 240 of the first reflector assembly 130 is disposed between GRIN lens 120 affixed to the input fiber 110 and the GRIN lens 122 affixed to the first output fiber 112. Thus, the switch 100 is in a second state. When switch 100 is in its second state, optical signals from GRIN lens 120 affixed to input fiber 110 reflect off of reflector surface 240 and enter GRIN lens 124 affixed to the second output fiber 114.

When current is no longer applied to wire 310 by power supply 135, the electrically induced magnetic fields created about first soft iron 280 collapse. The passive attraction between the first soft iron 280 and the magnet 220 causes the first reflector assembly 130 to rotate about support 200 until the integral portion 230 of rotation stop 190 rests against the stop wall 300 (shown in FIG. 4), thus returning the first reflector assembly 130 to its first position. With the first reflector assembly 130, the second reflector assembly 132, and the third reflector assembly 134 each in their first position, the switch 100 is in its first state, where, as discussed, optical signals from input fiber 110 travel without reflection to first output fiber 112.

FIG. 6 shows the polarity of the magnetic fields created when current is applied only to wire 312 by power supply 135, thereby inducing a magnetic field about second soft iron 282. In the embodiment shown, the wire 312 is wound such that a northern magnetic field is created at the end 292 of second soft iron 282 inside the switch base 125 when the current in wire 312 flows in an appropriate direction. This northern magnetic field repels the northern magnetic pole of magnet 222 located in rotation stop 192. This force acts to rotate the second reflector assembly 132 about support 202.

When the second reflector assembly 132 rotates about support 202, the first arm 162 of armature 152 of the second reflector assembly 132 rotates against the second stationary stop 272 of switch base 125, thereby moving the second reflector assembly 132 from its first position to its second position. Since no current is applied to wires 310 and 314 by power supply 135, no electrically induced magnetic fields are created about first soft iron 280 and third soft iron 284, and therefore, the first reflector assembly 130 and the third reflector assembly 134 will not rotate about supports 200 and 204, respectively. Instead, the passive magnetic attraction between the first soft iron 280 and third soft iron 284 and the respective magnets 220 and 224 maintains the first reflector assembly 130 and the third reflector assembly 134 in first positions, as described above.

With reference to FIGS. 6 and 10, the second reflector assembly 132 is in its second position, and the first reflector assembly 130 and third reflector assembly 134 each remain in their first position. As such, only the reflector surface 242 of the second reflector assembly 132 is disposed between GRIN lens 120 affixed to the input fiber 110 and the GRIN lens 122 affixed to the first output fiber 112. Thus, the switch 100 is in a third state. When switch 100 is in its third state, optical signals from GRIN lens 120 affixed to input fiber 110 reflect off of reflector surface 242 and enter GRIN lens 126 affixed to the third output fiber 116.

When current is no longer applied to wire 312 by power supply 135, the electrically induced magnetic fields created about second soft iron 282 collapse. The passive attraction between the second soft iron 282 and the magnet 222 causes the second reflector assembly 132 to rotate about support 202 until the integral portion 232 of rotation stop 192 rests against the stop wall 302 (shown in FIG. 4), thus returning the first reflector assembly 132 to its first position. With the first reflector assembly 130, the second reflector assembly 132, and the third reflector assembly 134 each in their first position, the switch 100 is in its first state, where, as discussed, optical signals from input fiber 110 travel without reflection to first output fiber 112.

FIG. 7 shows the polarity of the magnetic fields created when current is applied only to wire 314 by power supply 135, thereby inducing a magnetic field about third soft iron 284. In the embodiment shown, the wire 314 is wound such that a northern magnetic field is created at the end 294 of third soft iron 284 inside the switch base 125 when the current in wire 314 flows in an appropriate direction. This northern magnetic field repels the northern magnetic pole of magnet 224 located in rotation stop 194. This force acts to rotate the third reflector assembly 134 about support 204.

When the third reflector assembly 134 rotates about support 204, the first arm 164 of armature 154 of the third reflector assembly 134 rotates against the third stationary stop 274 of switch base 125, thereby moving the third reflector assembly 134 from its first position to its second position. Since no current is applied to wires 310 and 312 by power supply 135, no electrically induced magnetic fields are created about first soft iron 280 and second soft iron 282, and therefore, the first reflector assembly 130 and the second reflector assembly 132 will not rotate about supports 200 and 202, respectively. Instead, the passive magnetic attraction between the first soft iron 280 and second soft iron 282 and the respective magnets 220 and 222 maintains the first reflector assembly 130 and the second reflector assembly 132 in first positions, as described above.

With reference to FIGS. 7 and 11, the third reflector assembly 134 is in its second position, and the first reflector assembly 130 and second reflector assembly 132 each remain in their first position. As such, only the reflector surface 244 of the third reflector assembly 134 is disposed between GRIN lens 120 affixed to the input fiber 110 and the GRIN lens 122 affixed to the first output fiber 112. Thus, the switch 100 is in a fourth state. When switch 100 is in its fourth state, optical signals from GRIN lens 120 affixed to input fiber 110 reflect off of reflector surface 244 and enter GRIN lens 128 affixed to the fourth output fiber 118.

When current is no longer applied to wire 314 by power supply 135, the electrically induced magnetic fields created about third soft iron 284 collapse. The passive attraction between the third soft iron 284 and the magnet 224 causes the third reflector assembly 134 to rotate about support 204 until the integral portion 234 of rotation stop 194 rests against the stop wall 304 (shown in FIG. 4), thus returning the first reflector assembly 134 to its first position. With the first reflector assembly 130, the second reflector assembly 132, and the third reflector assembly 134 each in their first position, the switch 100 is in its first state, where, as discussed, optical signals from input fiber 110 travel without reflection to first output fiber 112.

Of course, one skilled in the art will recognize that the polarity selected for magnet 220, magnet 222, or magnet 224 as shown in FIG. 4, can be reversed, and for each magnet in which the polarity was reversed, the corresponding wire 310, 312, or 314 could be wound in the opposite direction, or the direction of the current could be reversed so as to create the opposite magnetic polarity about first soft iron 280, second soft iron 282, or third soft iron 284, respectively, with equally satisfactory results. One skilled in the art will also recognize that by employing four input fibers in place of the first output fiber 112, the second output fiber 114, the third output fiber 116, and the fourth output fiber 118, and by employing an output fiber in place of the input fiber 110, an output common one-by-four fiber optical switch can be created.

Reference is now made to FIGS. 12–25 in which yet another embodiment of the present invention is shown. FIGS. 12–25 show an input common one-by-four fiber optical switch 400, which can switch a signal from one input fiber among four outputs using a short voltage pulse. With reference to FIG. 12, the switch 400 comprises an input fiber 410 with a GRIN lens 420, a first output fiber 412 with a GRIN lens 422, a second output fiber 414 with a GRIN lens 424, a third output fiber 416 with a GRIN lens 426, and a fourth output fiber 418 with a GRIN lens 428. The switch 400 has a first reflector assembly 430, a second reflector assembly 432, and a third reflector assembly 434.

Figure 13:
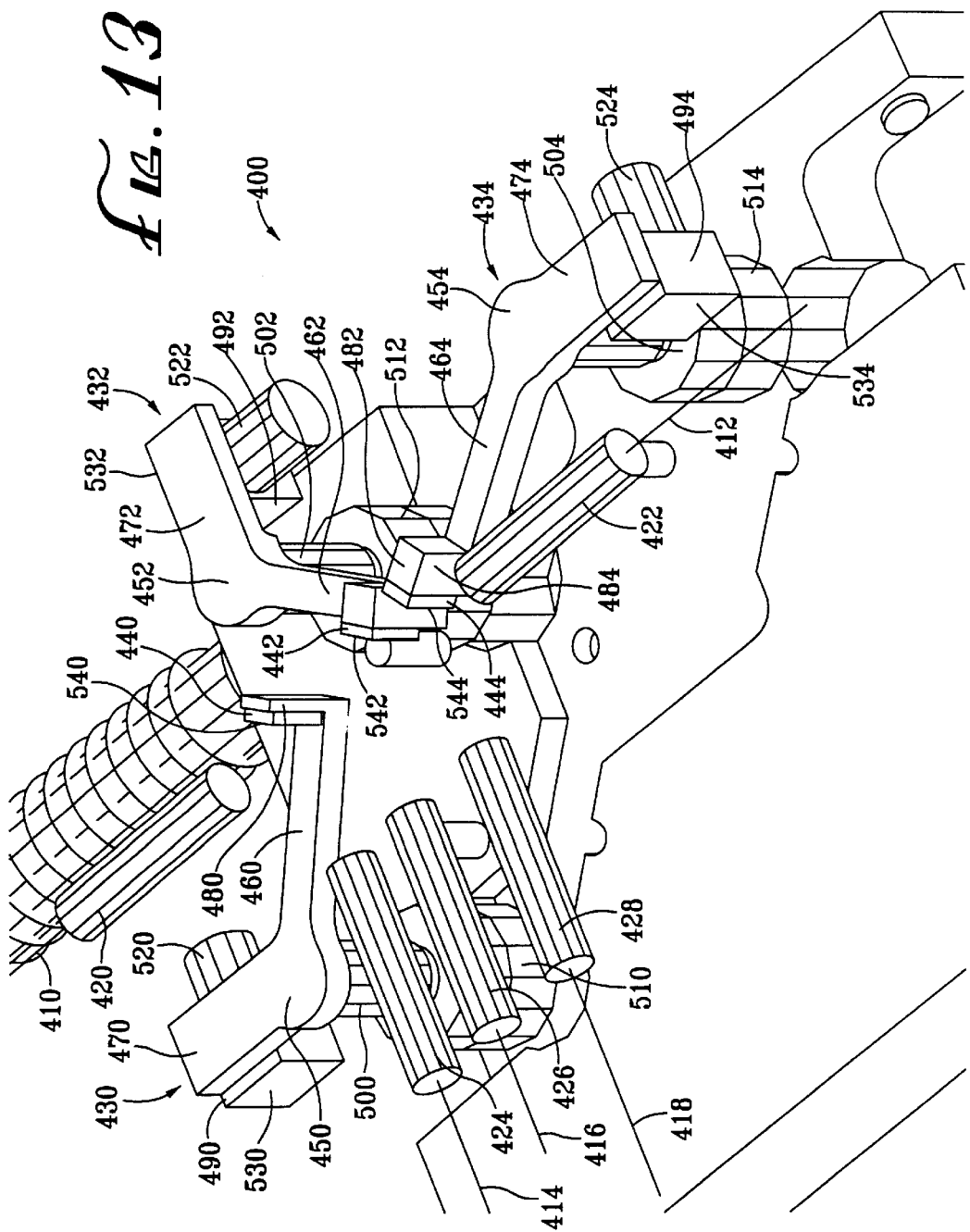
FIG. 13 is a perspective view of the reflector assemblies of the input common one-by-four fiber optical switch shown in FIG. 12.

With reference to FIG. 13, the first reflector assembly 430 comprises a reflector 440 and an armature 450 having a first arm 460 and a second arm 470 that are preferably integral to each other. The first arm 460 comprises a vertical flange 480. In a preferred embodiment, the reflector 440 has a single flat, front coated mirror surface 540, and is affixed to the vertical flange 480. Other types of reflectors, e.g., spherical reflectors, can be used as well without departing from the scope of the invention. When the first reflector assembly 430 is in a first position, i.e., out of the optical signal's path, as will be described, the mirror surface 540 is not located between the input fiber 410 and the first output fiber 412. When the first reflector assembly 430 is in a second position, i.e., in the optical signal's path, as will be described, the mirror surface 540 is located between the input fiber 410 and the first output fiber 412 and faces the input fiber 410 at a forty-five degree angle. A rotation stop 490 is connected to the bottom of the second arm 470. A support 500 is connected to the center of armature 450. Support 500 is rotatably mounted in bearing assembly 510.

Figure 15:
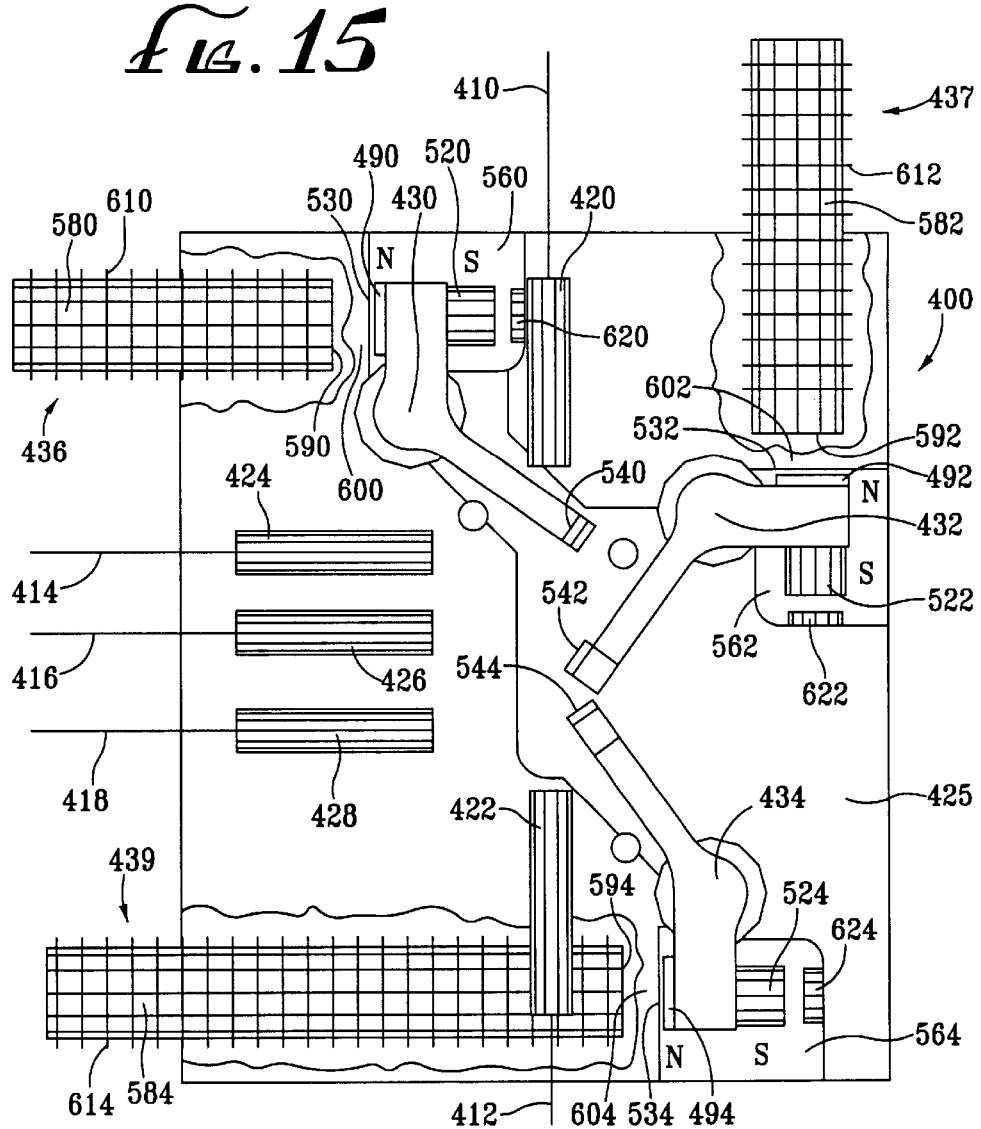
FIG. 15 is a top view of the input common one-by-four fiber optical switch in FIG. 12 showing all of the reflector assemblies are in first positions.

As seen in FIGS. 13 and 15, rotation stop 490 maintains magnet 520 in the first reflector assembly 430. Magnet 520 is installed such that a portion of it exists within the rotation stop 490 and a portion exists external to rotation stop 490. Rotation stop 490 has an integral portion 530. As will be discussed in more detail below, the integral portion 530 of rotation stop 490 is arranged such that the first reflector assembly 430 can be moved to its first position.

Figure 14:
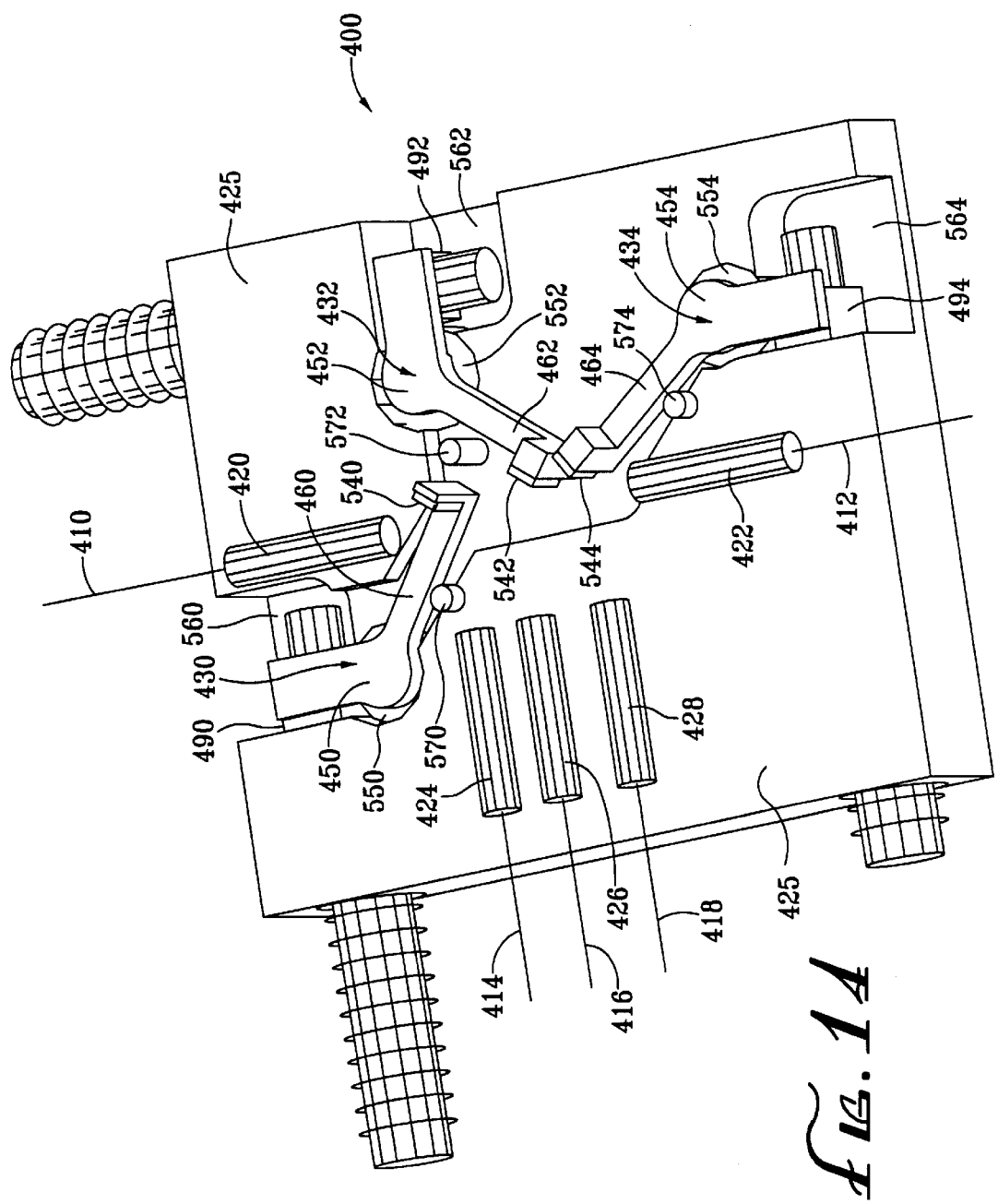
FIG. 14 is a perspective view of the reflector assemblies mounted in a switch base of the input common one-by-four fiber optical switch shown in FIG. 12.

Referring to FIGS. 12 and 14, the first reflector assembly 430 is mated to a switch base 425. The switch base 425 is arranged such that the first reflector assembly 430 fits therein via bearing assembly 510 to allow the first reflector assembly 430 to rotate in an arcuate manner. Specifically, switch base 425 comprises a first cavity 550, which receives bearing assembly 510 (see FIG. 13). Bearing assembly 510 is preferably inserted therein in a snug fashion. The first cavity 550 is located such that the center of the mirror surface 540 is placed at the intersection of the optical signal paths of the input fiber 410 and second output fiber 414 when the first reflector assembly 430 is in its second position, as will be discussed below. The switch base 425 has a first opening 560 adjacent to the first cavity 550 that allows the rotation stop 490 to arcuately move when the first reflector assembly 430 moves from its first position to its second position, and vice versa. The first opening 560 restricts the movement of rotation stop 490 such that the first reflector assembly 430 can come to rest in its first position, as discussed below. A first stationary stop 570 is installed in switch base 425. Stationary stop 570 restricts the movement of the first arm 460 of armature 450 such that the first reflector assembly 430 can come to rest in its second position, as discussed below.

With further reference to FIG. 15, a first reflector assembly mover 435 is described. The first reflector assembly mover 435 comprises a first soft iron 580 and a fourth soft iron 620. The first soft iron 580 is installed in the switch base 425 such that it extends into the core of the switch base 425, so that one end 590 is located substantially close to a stop wall 600 bounding first opening 560 inside the switch base 425. In this embodiment, the first soft iron 580 preferably does not break through the stop wall 600. Wound around the first soft iron 580 is wire 610, which, as will be discussed below, is used to create the magnetic fields used to rotate the first reflector assembly 430 with arcuate movements. Fourth soft iron 620 is disposed in the switch base 425 such that a portion extends into the first opening 560. The operation of the fourth soft iron 620 will be discussed below.

With reference to FIG. 13, the second reflector assembly 432 comprises a reflector 442 and an armature 452 having a first arm 462 and a second arm 472 that are preferably integral to each other. The first arm 462 comprises a vertical flange 482. In a preferred embodiment, the reflector 442 has a single flat, front coated mirror surface 542, and is affixed to the vertical flange 482. Other types of reflectors, e.g., a spherical mirror, can be used as well without departing from the scope of the invention. When the second reflector assembly 432 is in a first position, i.e., out of the optical signal's path, as will be described, the mirror surface 542 is not located between the input fiber 410 and the first output fiber 412. When the second reflector assembly 432 is in a second position, i.e., in the optical signal's path, as will be described, the mirror surface 542 is located between the input fiber 410 and the first output fiber 412 and faces the input fiber 410 at a forty-five degree angle. A support 502 is connected to the center of armature 452. Support 502 is rotatably mounted in bearing assembly 512.

As seen in FIGS. 13 and 15, rotation stop 492 maintains magnet 522 in the second reflector assembly 432. Magnet 522 is installed such that a portion of it exists within the rotation stop 492 and a portion exists external to rotation stop 492. Rotation stop 492 has an integral portion 532. As will be discussed in more detail below, the integral portion 532 of rotation stop 492 is arranged such that the second reflector assembly 432 can be moved to its first position.

Referring to FIGS. 12 and 14, the second reflector assembly 432 is mated to a switch base 425. The switch base 425 is arranged such that the second reflector assembly 432 fits therein via bearing assembly 512 to allow the second reflector assembly 432 to rotate in an arcuate manner. Specifically, switch base 425 comprises a second cavity 552, which receives bearing assembly 512. Bearing assembly 512 is preferably inserted therein in a snug fashion. The second cavity 552 is located such that the center of the mirror surface 542 is placed at the intersection of the optical signal paths of the input fiber 410 and third output fiber 416 when the second reflector assembly 432 is in its second position, as will be discussed below. The switch base 425 has a second opening 562 adjacent to the second cavity 552 that allows the rotation stop 492 to arcuately move when the second reflector assembly 432 moves from its first position to its second position, and vice versa. The second opening 562 restricts the movement of rotation stop 492 such that the second reflector assembly 432 can come to rest in its first position, as discussed below. A second stationary stop 572 is installed in switch base 425. Stationary stop 572 restricts the movement of the first arm 462 of armature 452 such that the second reflector assembly 432 can come to rest in its second position, as discussed below.

With further reference to FIG. 15, a second reflector assembly mover 437 is described. The second reflector assembly mover 437 comprises a second soft iron 582 and a fifth soft iron 622. The second soft iron 582 is installed in the switch base 425 such that it extends into the core of the switch base 425, so that one end 592 is located substantially close to a stop wall 602 bounding second opening 562 inside the switch base 425. In this embodiment, the second soft iron 582 preferably does not break through the stop wall 602. Wound around the second soft iron 582 is wire 612, which, as will be discussed below, is used to create the magnetic fields used to rotate the second reflector assembly 432 with arcuate movements. Fifth soft iron 622 is disposed in the switch base 425 such that a portion extends into the second opening 562. The operation of the fifth soft iron 622 will be discussed below.

With reference to FIG. 13, the third reflector assembly 434 comprises a reflector 444 and an armature 454 having a first arm 464 and a second arm 474 that are preferably integral to each other. The first arm 464 comprises a vertical flange 484. In a preferred embodiment, the reflector 444 has a single flat, front coated mirror surface 544, and is affixed to the vertical flange 484. Other types of reflectors, e.g., spherical reflectors, can be used as well without departing from the scope of the invention. When the third reflector assembly 434 is in a first position, i.e., out of the optical signal's path, as will be described, the mirror surface 544 is not located between the input fiber 410 and the first output fiber 412. When the third reflector assembly 134 is in a second position, i.e., in the optical signal's path, as will be described, the mirror surface 544 is located between the input fiber 410 and the first output fiber 412 and faces the input fiber 410 at a forty-five degree angle. A rotation stop 494 is connected to the bottom of the second arm 474. A support 504 is connected to the center of armature 454. Support 504 is rotatably mounted in bearing assembly 514.

As seen in FIGS. 13 and 15, rotation stop 494 maintains magnet 524 in the third reflector assembly 434. Magnet 524 is installed such that a portion of it exists within the rotation stop 494 and a portion exists external to rotation stop 494. Rotation stop 494 has an integral portion 534. As will be discussed in more detail below, the integral portion 534 of rotation stop 494 is arranged such that the third reflector assembly 434 can be moved to its first position.

Referring to FIGS. 12 and 14, the third reflector assembly 434 is mated to a switch base 425. The switch base 425 is arranged such that the third reflector assembly 434 fits therein via bearing assembly 514 to allow the third reflector assembly 434 to rotate in an arcuate manner. Specifically, switch base 425 comprises a third cavity 554, which receives bearing assembly 514. Bearing assembly 514 is preferably inserted therein in a snug fashion. The third cavity 554 is located such that the center of the mirror surface 544 is placed at the intersection of the optical signal paths of the input fiber 410 and fourth output fiber 418 when the third reflector assembly 434 is in its second position, as will be discussed below. The switch base 425 has a third opening 564 adjacent to the third cavity 554 that allows the rotation stop 494 to arcuately move when the third reflector assembly 434 moves from its first position to its second position, and vice versa. The third opening 564 restricts the movement of rotation stop 494 such that the third reflector assembly 434 can come to rest in its first position, as discussed below. A third stationary stop 574 is installed in switch base 425. Stationary stop 574 restricts the movement of the first arm 464 of armature 454 such that the third reflector assembly 434 can come to rest in its second position, as discussed below.

With further reference to FIG. 15, a third reflector assembly mover 439 is described. The third reflector assembly mover 439 comprises a third soft iron 584 and a sixth soft iron 624. With further reference to FIG. 15, the third soft iron 584 is installed in the switch base 425 such that it extends into the core of the switch base 425, so that one end 594 is located substantially close to a stop wall 604 bounding third opening 564 inside the switch base 425. In this embodiment, the third soft iron 584 preferably does not break through the stop wall 604. Wound around the third soft iron 584 is wire 614, which, as will be discussed below, is used to create the magnetic fields used to rotate the third reflector assembly 434 with arcuate movements. Sixth soft iron 624 is disposed in the switch base 425 such that a portion extends into the third opening 564. The operation of the sixth soft iron 624 will be discussed below.

FIGS. 15–21 show how the application of current to the wires 610, 612, and 614 by power supply 435 can create electrically induced magnetic fields, and therefore cause movement of the first reflector assembly 430, second reflector assembly 432, and third reflector assembly 434. The polarities of magnets 520, 522, and 524 in the examples shown in FIGS. 15–21 are such that the portions extending out of rotation stops 490, 492, and 494 have southern magnetic polarities and the portions within rotation stops 490, 492, and 494 have a northern magnetic polarity.

FIG. 15 shows the first reflector assembly 430, second reflector assembly 432, and third reflector assembly 434 each in their first position. First passive magnetic forces maintain the first reflector assembly 430, second reflector assembly 432, and third reflector assembly 434 in their first position. In particular, the passive magnetic attraction between the first soft iron 580, second soft iron 582, and third soft iron 584 and the respective northern magnetic poles of magnets 520, 522, and 524 cause the integral portions 530, 532, and 534 of rotation stops 490, 492, and 494, respectively, to rest against stop walls 600, 602, and 604, respectively. In these first positions, none of the reflector surfaces 540, 542, and 544 interfere with the paths of the optical signals emerging from the input fiber 410. Thus, the switch 400 is in a first state. With the switch 400 in its first state, the optical signals from GRIN lens 420 affixed to input fiber 410 travel without reflection to GRIN lens 422 affixed to first output fiber 412.

Figure 16:
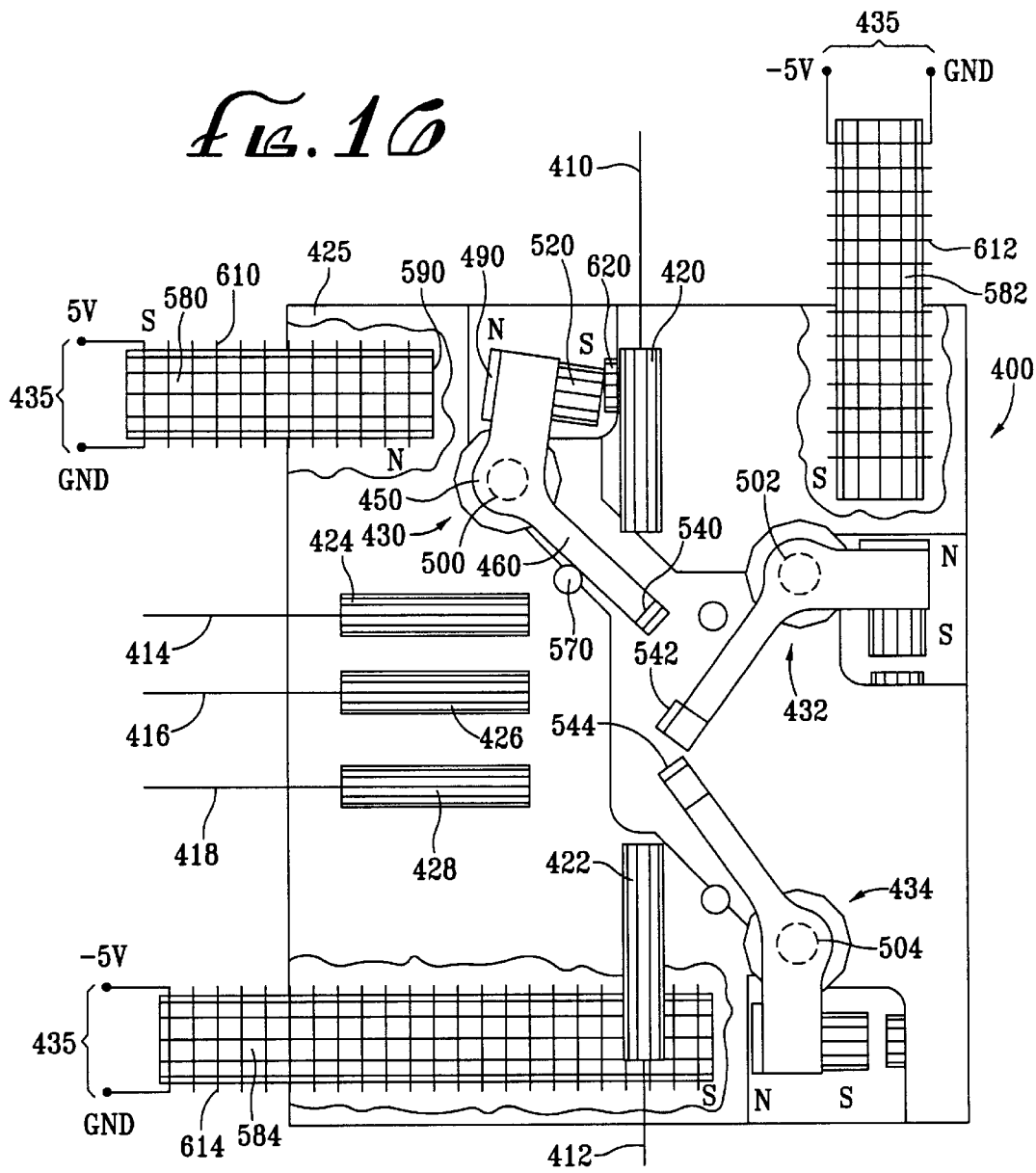
FIG. 16 is a top view of the input common one-by-four fiber optical switch in FIG. 12 showing a first reflector assembly in a in second position, a second reflector assembly in a first position, and a third reflector assembly in a first position.

FIG. 16 shows the polarity of the magnetic fields created when current of a first polarity is applied to wire 610 by power supply 435, thereby inducing a magnetic field about first soft iron 580. In this embodiment, the wire 610 is wound such that a northern magnetic field is created at the end 590 of first soft iron 580 inside the switch base 425 when current flows in an appropriate direction. This northern magnetic field repels the northern magnetic pole of magnet 520 located in rotation stop 490. This force acts to rotate the first reflector assembly 430 about support 500.

When the first reflector assembly 430 rotates about support 500, the first arm 460 of armature 450 of the first reflector assembly 430 rotates against the first stationary stop 570 of switch base 425, thereby moving the first reflector assembly 430 from its first position to its second position.

In addition, when first reflector assembly 430 is deflected to its second position, a second passive magnetic force caused by the attraction between the southern magnetic pole of the magnet 520 extending out of rotation stop 490 and the fourth soft iron 620 maintains the first reflector assembly 430 in its second position even when the current with the first polarity is removed from the wire 610. Thus, a short pulse of current of the first polarity can be applied to move the first reflector assembly 430 from its first position to its second position.

Figure 17:
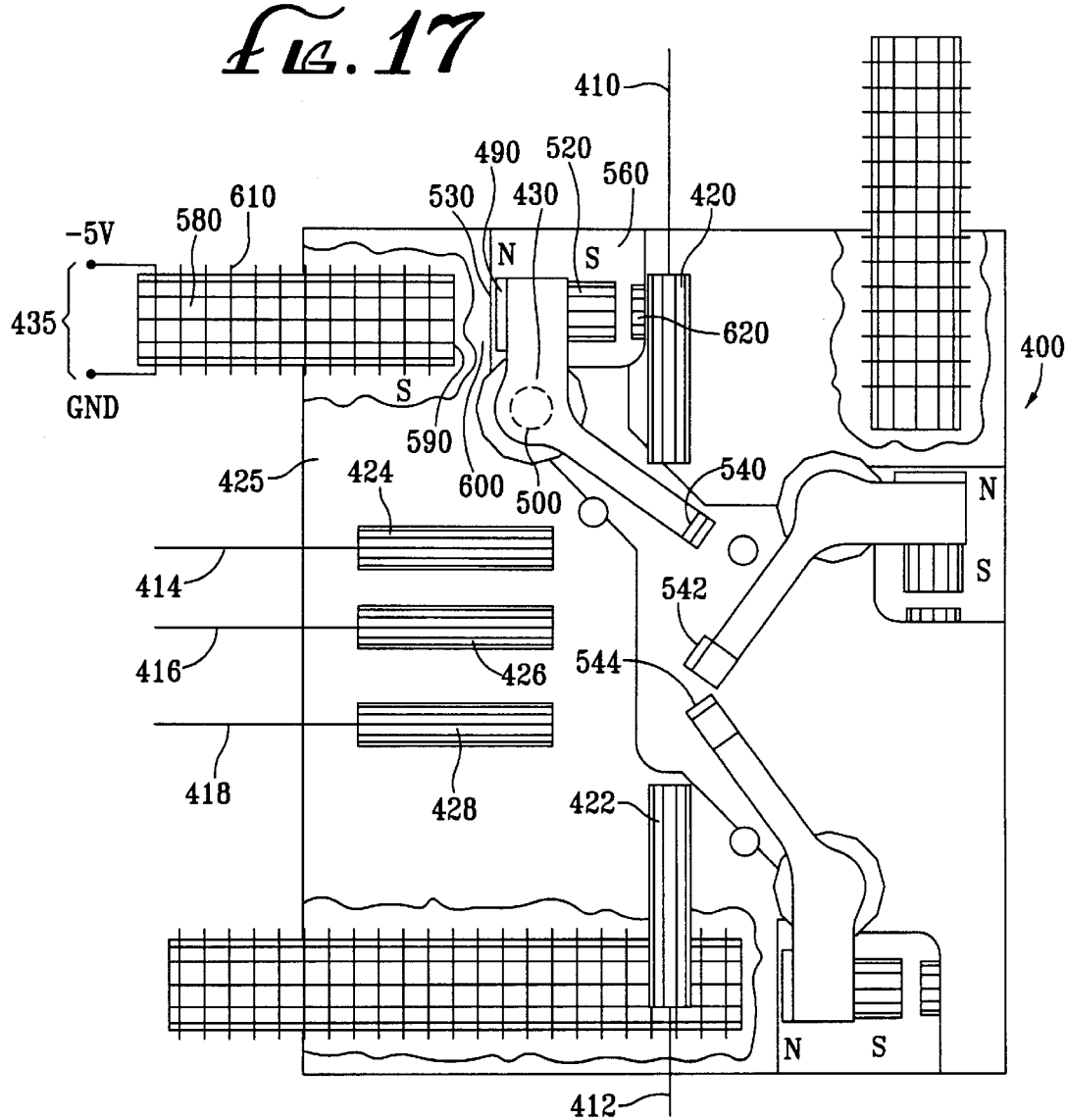
FIG. 17 is a top view of the input common one-by-four fiber optical switch in FIG. 12 showing a first reflector assembly being electrically driven from a second position to a first position.

FIG. 17 shows the polarity of the magnetic fields created when current of a second polarity is applied to wire 610. The wire 610 is wound such that a southern magnetic field is created at the end 590 of first soft iron 580 inside the switch base 425. This southern magnetic field attracts the northern magnetic pole of magnet 520 located in rotation stop 490. When the first reflector assembly 430 is in its second position prior to the application of the current of the second polarity, this attraction is strong enough to overcome the second passive magnetic force caused by the attraction between the southern magnetic pole of magnet 520 and the fourth soft iron 620. Thus, first reflector assembly 430 will rotate back about support 500 until the integral portion rotation stop 490 rests against the stop wall 600. Thus, the first reflector assembly 430 returns to its first position, which as discussed, is shown in FIG. 15. The first passive magnetic force will maintain the first reflector assembly 430 in its first position. In this manner, a short pulse of current of the second polarity can be applied to move the first reflector assembly 430 from its second position to its first position.

With reference to FIG. 16, only one reflector assembly should be in its second position at any given time. To achieve this, current of second polarities should be applied to wires 612 and 614 to either move or maintain second reflector assembly 432 and third reflector assembly 434 each in their first position, while current of the first polarity is being applied to wire 610 to place first reflector assembly 430 in the second position. When current of the second polarity is applied to wires 612 and 614, the creation of the magnetic fields and the movement of second reflector assembly 432 and third reflector assembly 434 will be similar to the magnetic fields and movement of first reflector assembly 430 described with reference to FIG. 17.

With reference to FIGS. 16 and 23, the first reflector assembly 430 is in its second position, and the second reflector assembly 432 and third reflector assembly 434 are each in their first position. As such, only the reflector surface 540 of the first reflector assembly 430 is disposed between GRIN lens 420 affixed to the input fiber 410 and the GRIN lens 422 affixed to the first output fiber 412. Thus, the switch 400 is in a second state. With the switch 400 in its second state, optical signals from GRIN lens 420 affixed to input fiber 410 reflect off of a reflector surface 540 and enter GRIN lens 424 affixed to the second output fiber 414.

Figure 18:
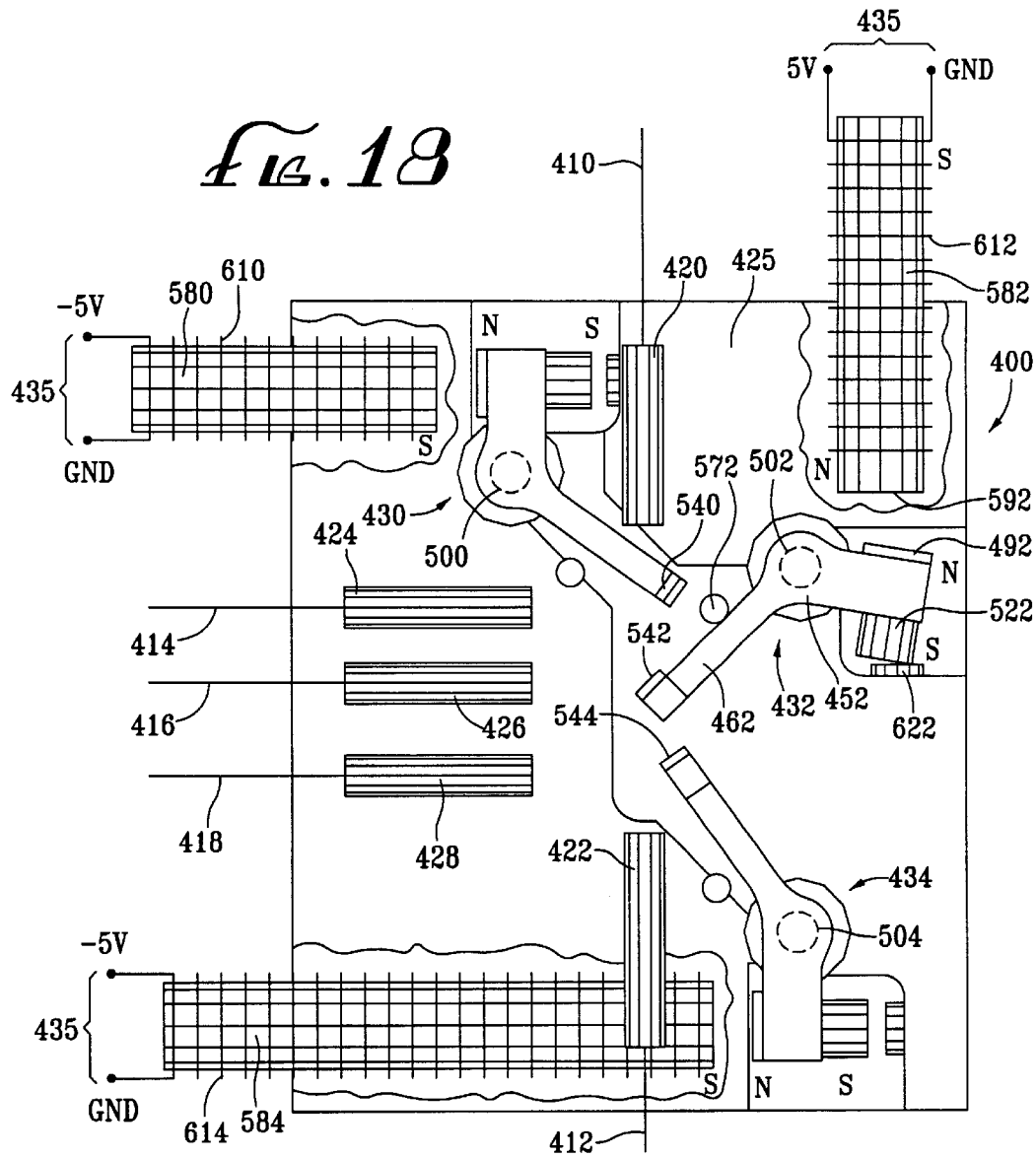
FIG. 18 is a top view of the input common one-by-four fiber optical switch in FIG. 12 showing a first reflector assembly in a first position, a second reflector assembly in a second position, and a third reflector assembly in a first position.

FIG. 18 shows the polarity of the magnetic fields created when current of a first polarity is applied to wire 612 by power supply 435. In this embodiment, the wire 612 is wound such that a northern magnetic field is created at the end 592 of second soft iron 582 inside the switch base 425 when current flows in an appropriate direction. This northern magnetic field repels the northern magnetic pole of the magnet 522 located in rotation stop 492. This force acts to rotate the second reflector assembly 432 about support 502.

When the second reflector assembly 432 rotates about support 502, the first arm 462 of armature 452 of the second reflector assembly 432 rotates against the second stationary stop 572 of switch base 425, thereby moving the second reflector assembly 432 from its first position to its second position.

In addition, when second reflector assembly 432 is deflected to its second position, a second passive magnetic force caused by the attraction between the southern magnetic pole of the magnet 522 extending out of rotation stop 492 and the fifth soft iron 622 maintains the second reflector assembly 432 in its second position even when the current with the first polarity is removed it from the wire 612. Thus, a short pulse of current of the first polarity can be applied to move the second reflector assembly 432 from its first position to its second position.

Figure 19:
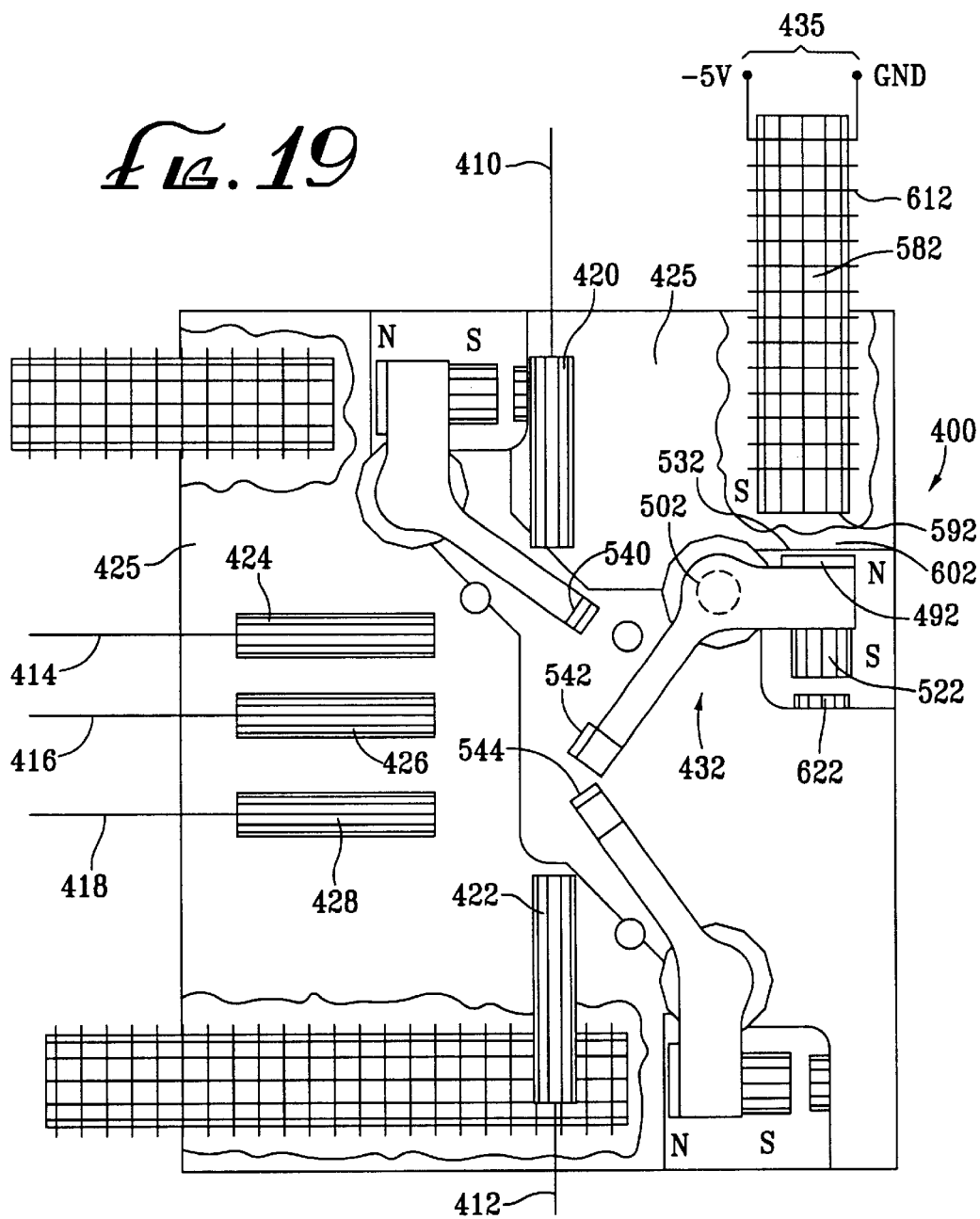
FIG. 19 is a top view of the input common one-by-four fiber optical switch in FIG. 12 showing a second reflector assembly being electrically driven from a second position to a first position.

FIG. 19 shows the polarity of the magnetic fields created when current of a second polarity is applied to wire 612. The wire 612 is wound such that a southern magnetic field is created at the end 592 of second soft iron 582 inside the switch base 425. This southern magnetic field attracts the northern magnetic pole of magnet 522 located in rotation stop 492. When the second reflector assembly 432 is in its second position prior to the application of the current of the second polarity, this attraction is strong enough to overcome the second passive magnetic force caused by the attraction between the southern magnetic pole of magnet 522 and the fifth soft iron 622. Thus, second reflector assembly 432 will rotate back about support 502 until the integral portion rotation stop 492 rests against the stop wall 602. Thus, the second reflector assembly 432 returns to its first position, which as discussed, is shown in FIG. 15. The first passive magnetic force will maintain the second reflector assembly 432 in its first position. In this manner, a short pulse of current of the second polarity can be applied to move the second reflector assembly 432 from its second position to its first position.

With reference to FIG. 18, only one reflector assembly should be in its second position at any given time. To achieve this, current of second polarities should be applied to wires 610 and 614 to either move or maintain first reflector assembly 430 and third reflector assembly 434 each in their first position, while current of the first polarity should be applied to wire 612 to place second reflector assembly 432 in the second position. When current of the second polarity is applied to wires 610 and 614, the creation of the magnetic fields and the movement of first reflector assembly 430 and third reflector assembly 434 will be similar to the magnetic fields and movement of second reflector assembly 432 described with reference to FIG. 19.

With reference to FIGS. 18 and 24, the second reflector assembly 432 is in its second position, and the first reflector assembly 430 and third reflector assembly 434 are each in their first position. As such, only the reflector surface 542 of the second reflector assembly 432 is disposed between GRIN lens 420 affixed to the input fiber 410 and the GRIN lens 422 affixed to the first output fiber 412. Thus, the switch 400 is in a third state. With the switch 400 in its third state, optical signals from GRIN lens 420 affixed to input fiber 410 reflect off of reflector surface 542 and enter GRIN lens 426 affixed to the third output fiber 416.

FIG. 20 shows the polarity of the magnetic fields created when current of a first polarity is applied to wire 614 by power supply 435. In this embodiment, the wire 614 is wound such that a northern magnetic field is created at the end 594 of second soft iron 584 inside the switch base 425 when current flows in an appropriate direction. This northern magnetic field repels the northern magnetic pole of the magnet 524 located in rotation stop 494. This force acts to rotate the third reflector assembly 434 about support 504.

When the third reflector assembly 434 rotates about support 504, the first arm 464 of armature 454 of the third reflector assembly 434 rotates against the third stationary stop 574 of switch base 425, thereby moving the third reflector assembly 434 from its first position to its second position.

In addition, when third reflector assembly 434 is deflected to its second position, a second passive magnetic force caused by the attraction between the southern magnetic pole of the magnet 524 extending out of rotation stop 494 and the sixth soft iron 624 maintains the third reflector assembly 434 in its second position even when the current with the first polarity is removed from the wire 614. Thus, a short pulse of current of the first polarity can be applied to move the third reflector assembly 434 from its first position to its second position.

FIG. 21 shows the polarity of the magnetic fields created when current of a second polarity is applied to wire 614. The wire 614 is wound such that a southern magnetic field is created at the end 594 of third soft iron 584 inside the switch base 425. This southern magnetic field attracts the northern magnetic pole of magnet 524 located in rotation stop 494. When the third reflector assembly 434 is in its second position prior to the application of the current of the second polarity, this attraction is strong enough to overcome the second passive magnetic force caused by the attraction between the southern magnetic pole of magnet 524 and the sixth soft iron 622. Thus, third reflector assembly 434 will rotate back about support 504 until the integral portion rotation stop 494 rests against the stop wall 604. Thus, the third reflector assembly 434 returns to its first position, which as discussed, is shown in FIG. 15. The first passive magnetic force will maintain the third reflector assembly 434 in its first position. In this manner, a short pulse of current of the second polarity can be applied to move the third reflector assembly 434 from its second position to its first position.

With reference to FIG. 20, only one reflector assembly should be in its second position at any given time. To achieve this, current of second polarities should be applied to wires 610 and 612 to either move or maintain first reflector assembly 430 and second reflector assembly 432 each in their first position, while current of the first polarity is being applied to wire 614 to place third reflector assembly 434 in the second position. When current of the second polarity is applied to wires 610 and 612, the creation of the magnetic fields and the movement of first reflector assembly 430 and second reflector assembly 432 will be similar to the magnetic fields and movement of third reflector assembly 434 described with reference to FIG. 21.

With reference to FIGS. 20 and 25, the third reflector assembly 434 is in its second position, and the first reflector assembly 430 and second reflector assembly 432 are each in their first position. As such, only the reflector surface 544 of the third reflector assembly 434 is disposed between GRIN lens 420 affixed to the input fiber 410 and the GRIN lens 422 affixed to the first output fiber 412. Thus, the switch 400 is in a fourth state. With the switch 400 in its fourth state, optical signals from GRIN lens 420 affixed to input fiber 410 reflect off of reflector surface 544 and enter GRIN lens 428 affixed to the fourth output fiber 418.

An advantage of this embodiment is that a user need only provide a short pulse of current to move any of the reflector assemblies to the second position, and then the current can be turned off. This reduces the amount of current required to use the switch and increases long-term reliability.

Of course, one skilled in the art will recognize that the polarity selected for magnet 520, magnet 522, or magnet 524 as shown in FIG. 15, can be reversed, and for each magnet in which the polarity was reversed, the corresponding wire 610, 612, or 614 could be wound in the opposite direction, or the direction of the current could be reversed so as to create the opposite magnetic polarity about first soft iron 580, second soft iron 582, or third soft iron 584, respectively, with equally satisfactory results. One skilled in the art will also recognize that by employing four input fibers in place of the first output fiber 412, the second output fiber 414, the third output fiber 416, and the fourth output fiber 418, and by employing an output fiber in place of the input fiber 410, an output common one-by-four fiber optical switch can be created.

Figure 26:
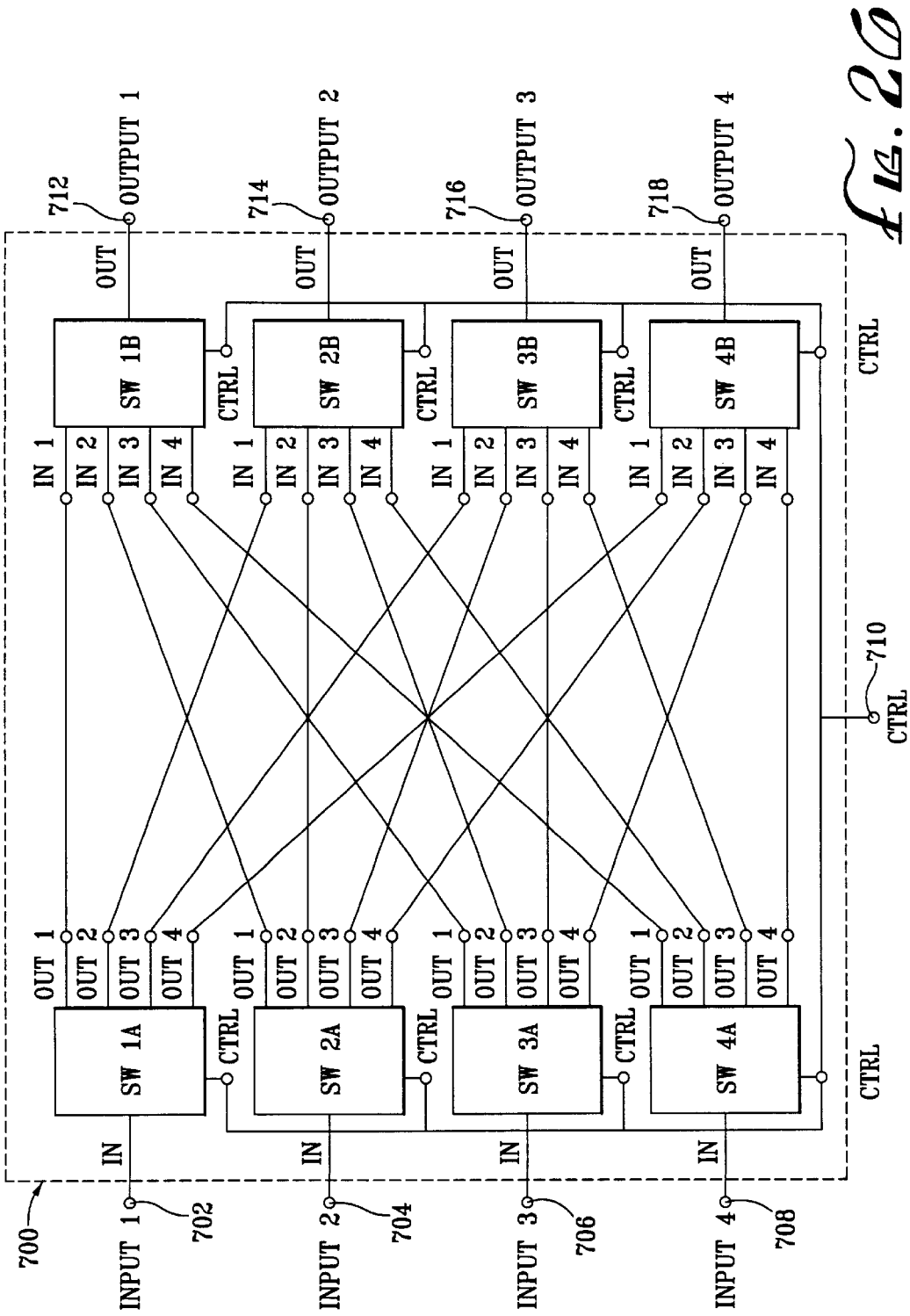
FIG. 26 is a schematic top view of a four-by-four fiber optical switch incorporating a plurality of the one-by-four fiber optical switches shown in FIGS. 1 and 12.

The switches 100 and 400 can be employed to create a four-by-four fiber optical switch 700 as depicted in FIG. 26. The fiber optical switch 700 includes four respective input terminals 702, 704, 706, and 708, and four respective output terminals 712, 714, 716, and 718. The internal structure of the fiber optical switch 700 is arranged such that an optical signal that is applied to either of the respective input terminals 702, 704, 706, and 708 appears on one of the selected output terminals 712, 714, 716, and 718.

The fiber optical switch 700 includes four respective input common one-by-four optical switches SW1A, SW2A, SW3A, SW4A, each having an input IN, outputs OUT1, OUT2, OUT3, and OUT4, and a control CTRL; and four respective output common one-by-four optical switches SW1B, SW2B, SW3B, and SW4B, each having inputs IN1, IN2, IN3, and IN4, an output OUT, and a control CTRL. The input terminals 702, 704, 706, and 708 are respectively formed from the inputs IN of the respective switches SW1A–SW4A. The output terminals 712, 714, 716, and 718 are respectively formed from the outputs OUT of the respective switches SW1B–SW4B.

The outputs of the switches SW1A–SW4A are cross-connected with the inputs of the switches SW1B–SW4B. That is, the respective outputs OUT1 of the switches SW1A–SW4A are respectively optically coupled to the respective inputs IN1, IN2, IN3, and IN4 of the switch SW1B. The respective outputs OUT2 of the switches SW1A–SW4A are respectively optically coupled to the respective inputs IN1, IN2, IN3, and IN4 of the switch SW2B. The respective outputs OUT3 of the switches SW1A–SW4A are respectively optically coupled to the respective inputs IN1, IN2, IN3, and IN4 of the switch SW3B. The respective outputs OUT4 of the switches SW1A–SW4A are respectively optically coupled to the respective inputs IN1, IN2, IN3, and IN4 of the switch SW4B.

The fiber optical switch 700 includes a control terminal 720 that is electrically coupled to the respective controls CTRL of the switches SW1A–SW4A such that each of the respective switches SW1A–SW4A can be placed in one of four switching states (i.e., IN-OUT1, IN-OUT2, IN-OUT3, IN-OUT4). Similarly, the control terminal 720 is electrically coupled to the respective controls CTRL of the switches SW1B–SW4B such that each of the respective switches SW1B–SW4B can be placed in one of four switching states (i.e., IN1-OUT, IN2-OUT, IN3-OUT, IN4-OUT).

An optical signal that is applied to one of the four input terminals 702, 704, 706, 708 of the fiber optical switch 700 can be routed to one of the four output terminals 712, 714, 716, and 718 of the fiber optical switch 700 by placing the particular input common switch coupled to the input terminal to which the optical signal is applied and the particular output common one-by-four optical switch coupled to the output terminal to which the optical signal is to be routed in the proper switching states.

FIG. 27 is a switching table that depicts the particular switch of the respective input common switches SW1–SW4 and the particular switch of the respective output common one-by-four optical switches SW5–SW8 that require activation and the switching states in which the activated switches are placed to effect the desired routing of the optical signal. For instance, to route an optical signal from the input terminal 706 (INPUT 3) to the output terminal 714 (OUTPUT 2) of the fiber optical switch 700, the switch SW3A is activated and placed in its second state, and the switch SW2B is activated and placed in its third state.

Figure 28A:
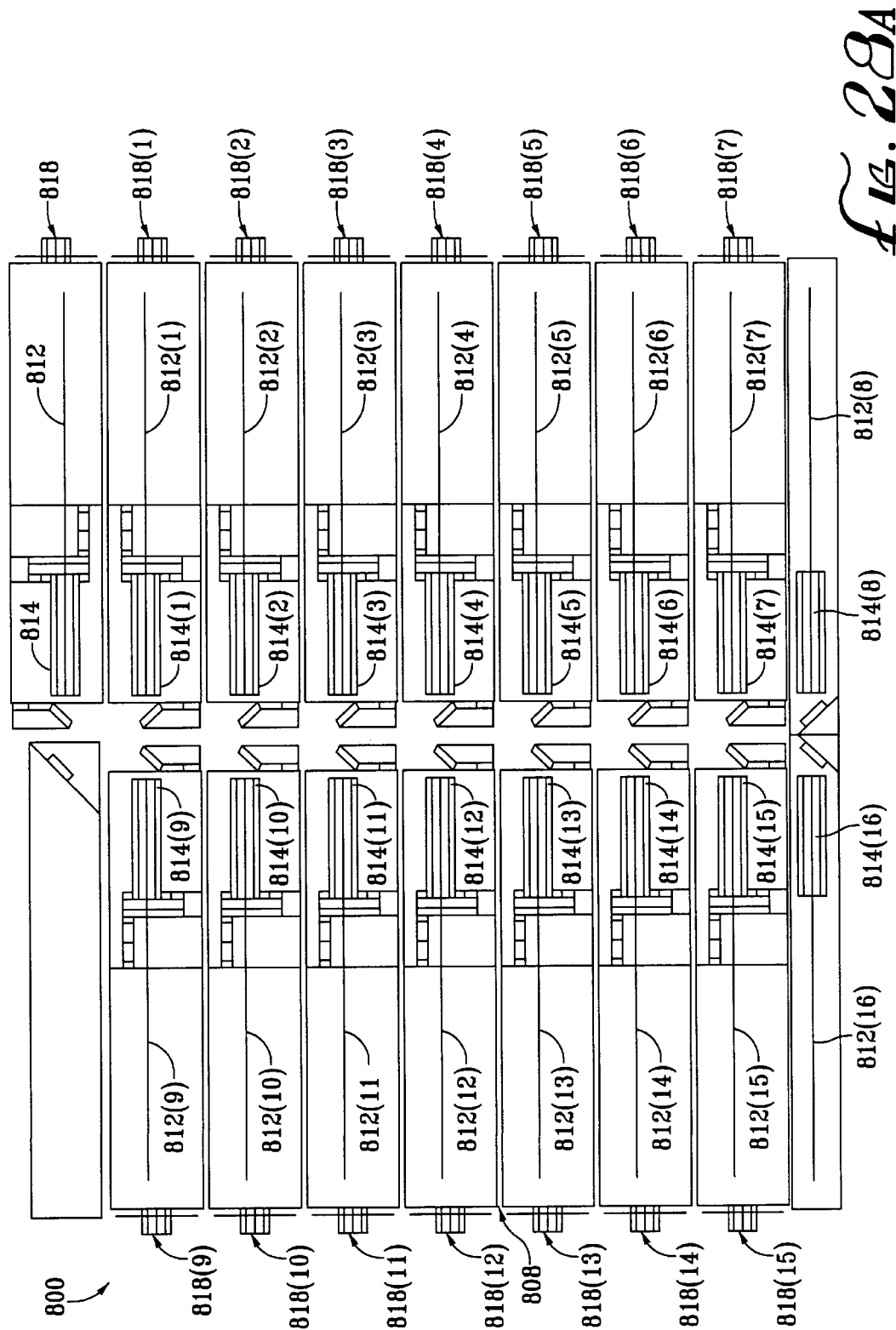
FIGS. 28A–28B are perspective view of embodiment of a sixteen-by-sixteen fiber optical switch made in accordance with the aspects of the present invention.
Figure 28B:
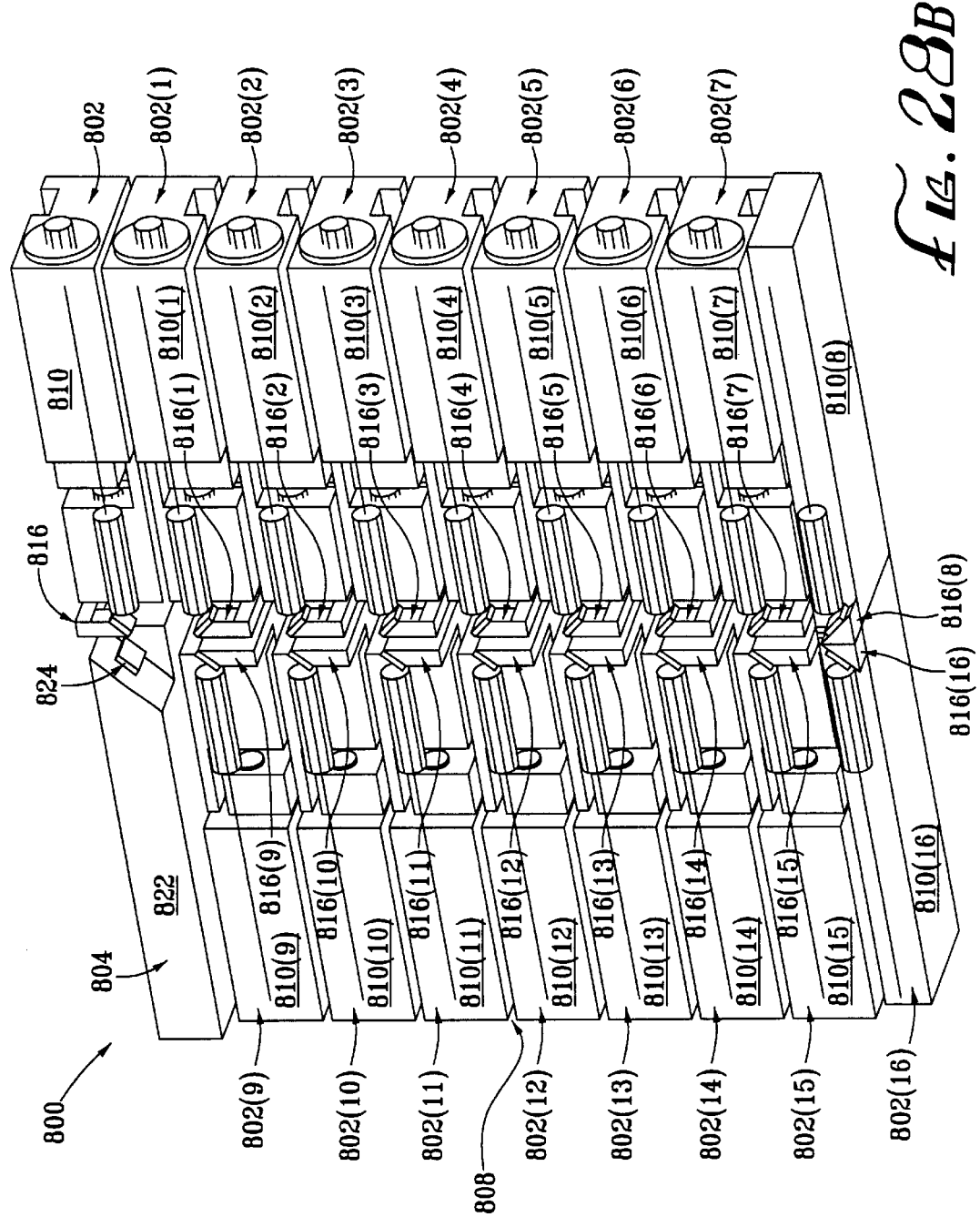

Reference is now made to FIGS. 28–43 in which yet another embodiment of the present invention is shown. FIGS. 28A and 28B show a one-by-N modular fiber optical switch, and in particular, a one-by-sixteen modular fiber optical switch 800, which can switch an optical signal from one common optical fiber among sixteen other optical fibers using a short voltage pulse.

Referring to FIG. 28A, the switch 800 includes a base 808 on which a common optical fiber 812, a first series of optical fibers 812(1)–812(8), and a second series of optical fibers 812(9)–812(10) are affixed. Respectively placed in front of each fiber are GRIN lens 814 and 814(1)–814(16). The first series of optical fibers 812(1)–812(8) are coplanar with and adjacent the common optical fiber 812, and the second series of optical fibers 812(9)–812(16) are coplanar with and opposite the common optical fiber 812. The optical fibers 812(1)–812(7) and 812(9)–812(15) are characterized as intermediate optical fibers, and the optical fibers 812(8) and 812(16) are characterized as terminal optical fibers. The first intermediate optical fibers 812(1)–812(7) are positioned between the common optical fiber 812 and the first terminal optical fiber 812(8), and the second intermediate optical fibers 812(9)–812(15) are positioned between the common optical fiber 812 and the second terminal optical fiber 812(16).

Referring further to FIG. 28B, the switch 800 further includes reflector assemblies that facilitate direction of an optical signal travelling between the common optical fiber 812 and the respective optical fibers 812(1)–812(16). A common reflector assembly 816 and a common terminal reflector assembly 824 are associated with the common optical fiber 812 and are mechanically coupled to the base 808. A first series of reflector assemblies 816(1)–816(8) are respectively associated with the first series of optical fibers 812(1)–812(8) and are mechanically coupled to the base 808 adjacent the common reflector assembly 816. A second series of reflector assemblies 816(9)–816(16) are respectively associated with the second series of optical fibers 812(9)–812(16) and are mechanically coupled to the base 808 opposite the common reflector assembly 816. The reflector assemblies 816(1)–816(7) and 816(9)–816(15) are characterized as intermediate reflector assemblies, and the reflector assemblies 816(8) and 816(16) are characterized as terminal reflector assemblies. The first intermediate reflector assemblies 816(1)–816(7) are positioned between the common reflector assembly 816 and the first terminal reflector assembly 816(8), and the second intermediate reflector assemblies 816(9)–816(15) are positioned between the common terminal reflector assembly 824 and the second terminal reflector assembly 816(16).

Figure 30:
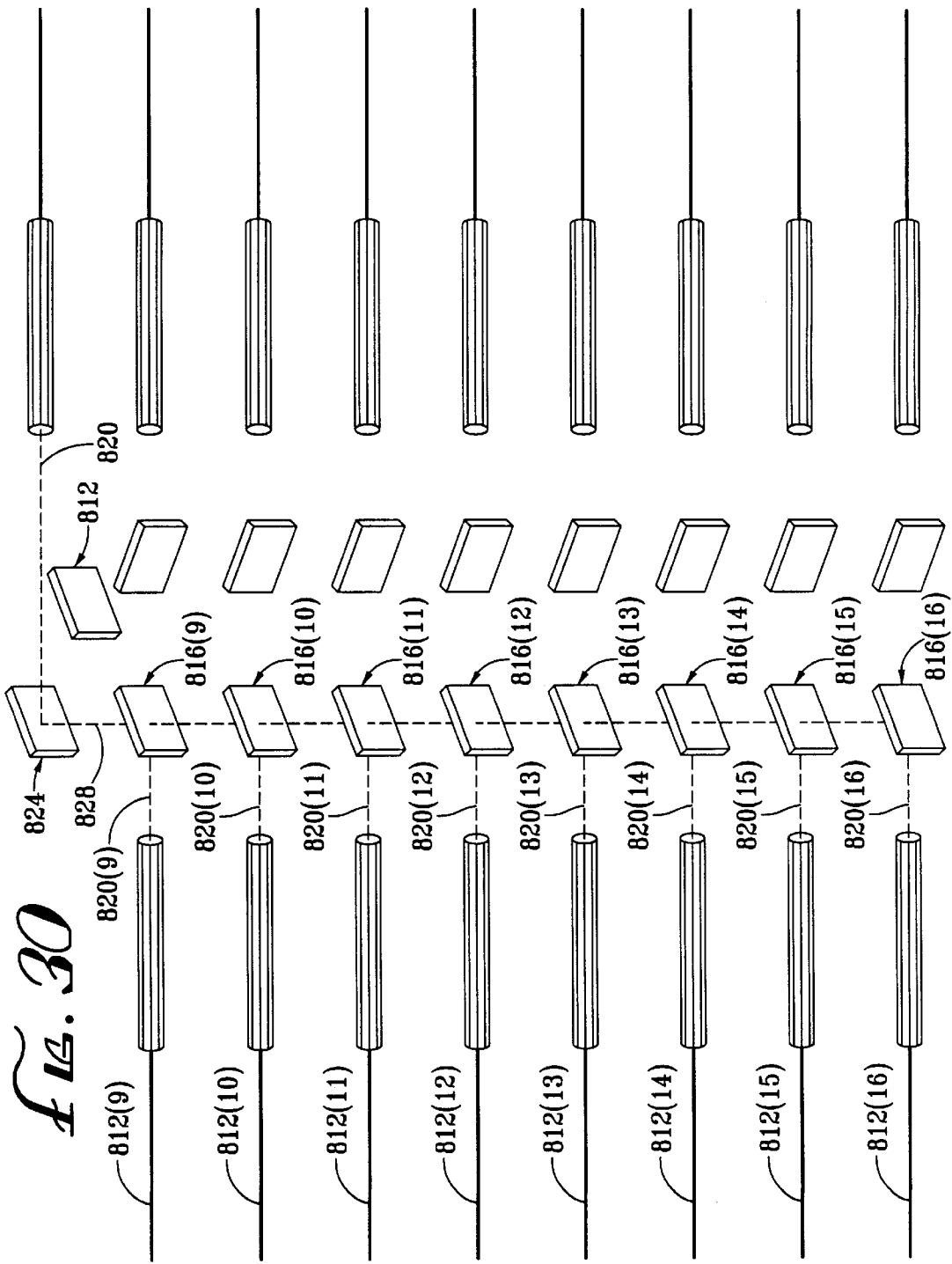
FIG. 30 is a schematic perspective view of the one-by-sixteen fiber optical switch in FIG. 28 showing optical signal paths when the common reflector assembly is in a second position and second intermediate reflector assemblies are respectively in first positions.
Figure 31:
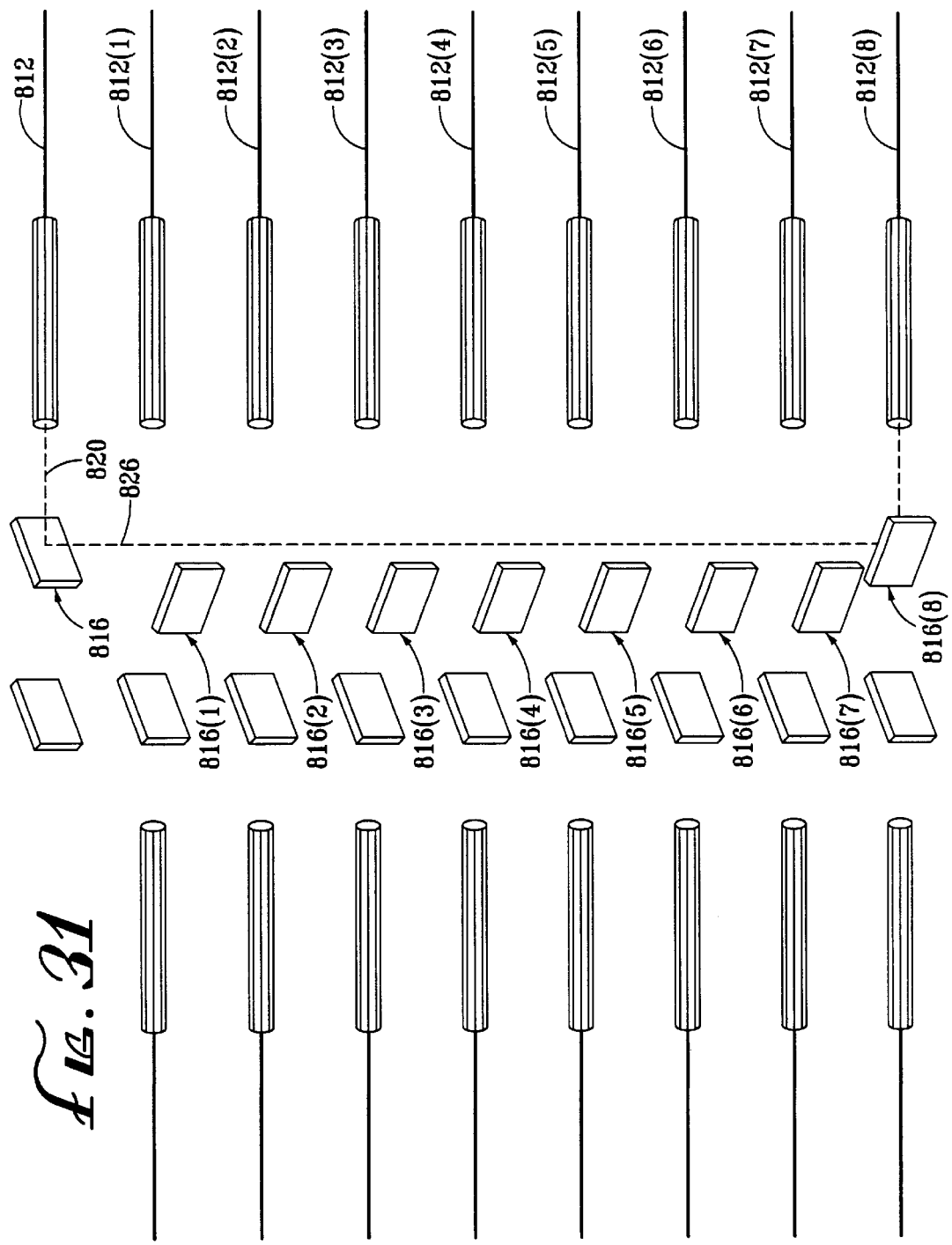
FIG. 31 is a schematic perspective view of the one-by-sixteen fiber optical switch in FIG. 28 showing optical signal paths when a common reflector assembly is in a first position and first intermediate reflector assemblies are in second positions.
Figure 32:
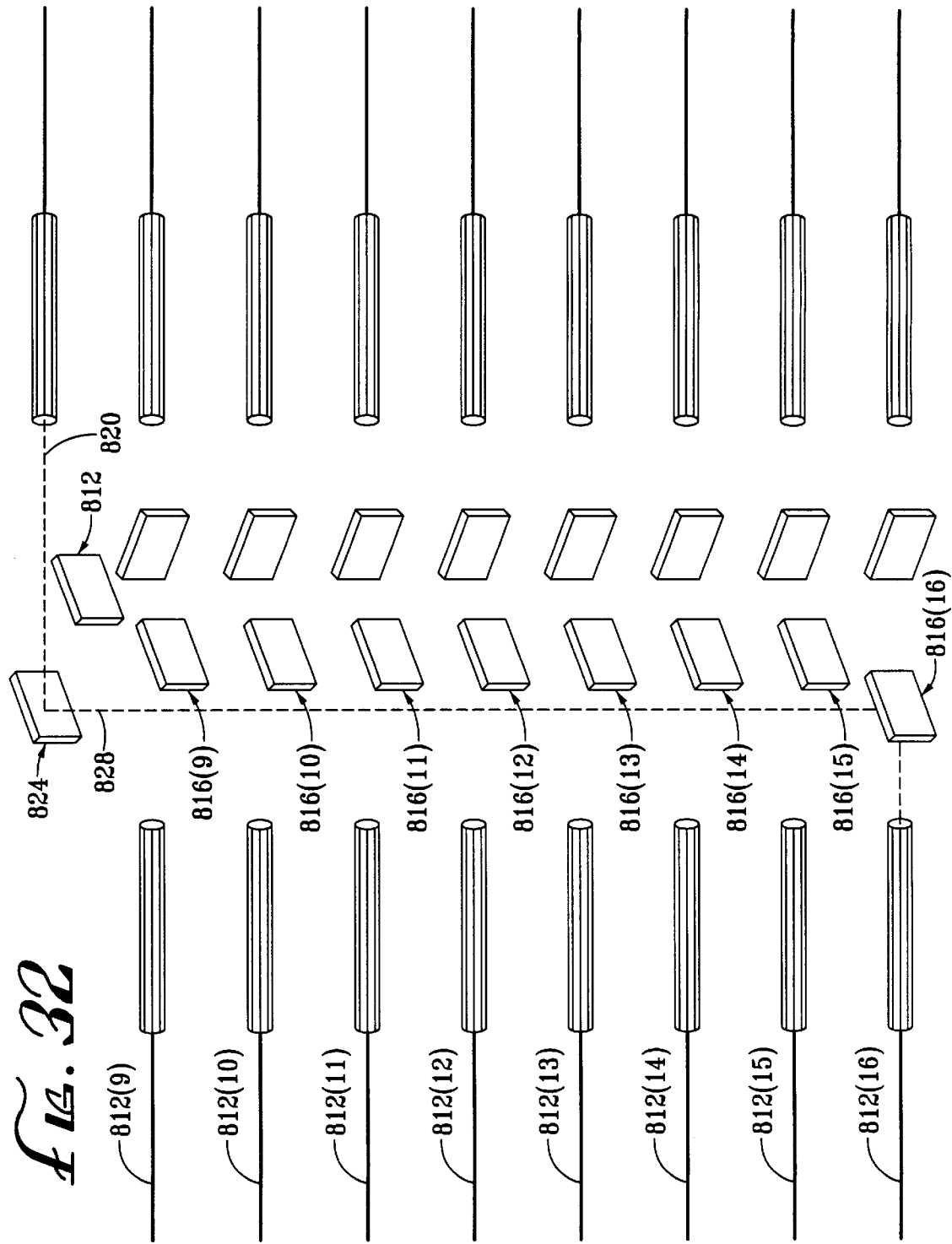
FIG. 32 is a schematic perspective view of the one-by-sixteen fiber optical switch in FIG. 28 showing optical signal paths when the common reflector assembly is in a second position and second intermediate reflector assemblies are in second positions.

Referring to FIGS. 29–32, the common optical fiber 812, intermediate optical fibers 812(1)–812(7) and 812(9)–812(15), and terminal optical fibers 812(8) and 812(16) respectively have common optical axis 820, intermediate optical axes 820(1)–820(7) and 820(9)–820(15), and terminal optical axes 820(8) and 820(16). The common reflector assembly 816 is movable between a first position to intersect the common optical axis 820 creating a first deflected optical axis 826 adjacent the first series of optical fibers 812(1)–812(8) (FIGS. 29 and 31) and a second position not to intersect the common optical axis 820 (FIGS. 30 and 32). The common terminal reflector assembly 824 is fixed in a position to intersect the common optical axis 820 creating a second deflected optical axis 828 adjacent the second series of optical fibers 812(9)–812(16) (FIGS. 30 and 32).

The first intermediate reflector assemblies 816(1)–816(7) are respectively movable between first positions and second positions. In their first positions, the first intermediate reflector assemblies 816(1)–816(7) intersect the first deflected optical axis 826 and the respective first intermediate optical axes 820(1)–820(7) (FIG. 29). In their second positions, the first intermediate reflector assemblies 816(1)–816(7) do not intersect the first deflected optical axis 826 (FIG. 31). The first terminal reflector assembly 816(8) is fixed in a position such that the first deflected optical axis 826 and the first terminal optical axis 820(8) are intersected (FIGS. 29 and 31). The second intermediate reflector assemblies 816(9)–816(15) are respectively movable between respective first positions and second positions. In their first positions, the second intermediate reflector assemblies 816(9)–816(15) intersect the second deflected optical axis 828 and the respective second intermediate optical axes 820(9)–820(15)(FIG. 30). In their second positions, the second intermediate reflector assemblies 816(9)–816(15) do not intersect the second deflected optical axis 828(FIG. 32). The second terminal reflector assembly 816(16) is fixed in a position such that the second deflected optical axis 828 and the second terminal optical axis 820(16) are intersected (FIGS. 30 and 32).

Figure 33:
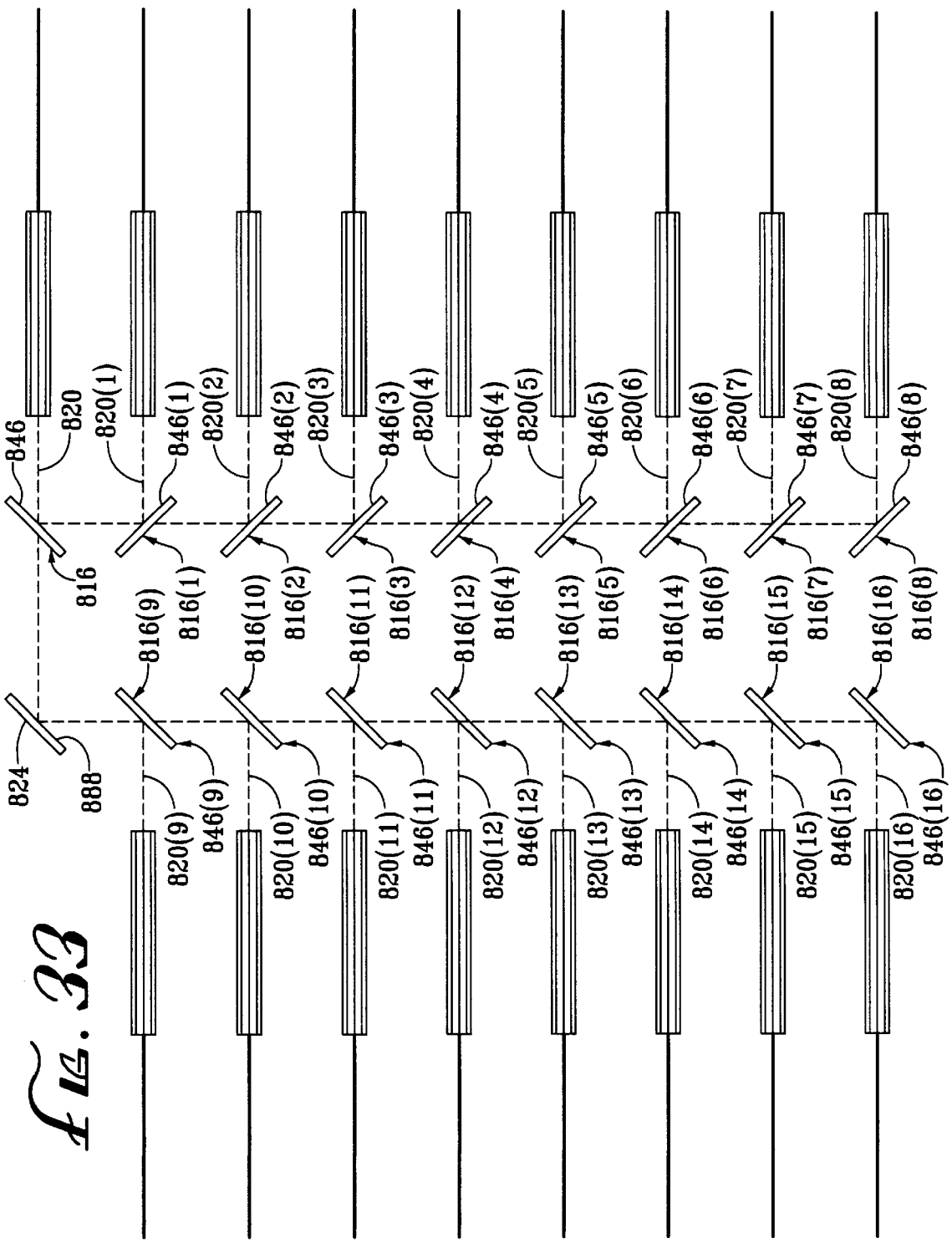
FIG. 33 is a schematic top view of the one-by-sixteen fiber optical switch in FIG. 28 showing relative angles of the reflectors of the reflector assemblies with respect to each other.
Figure 34:
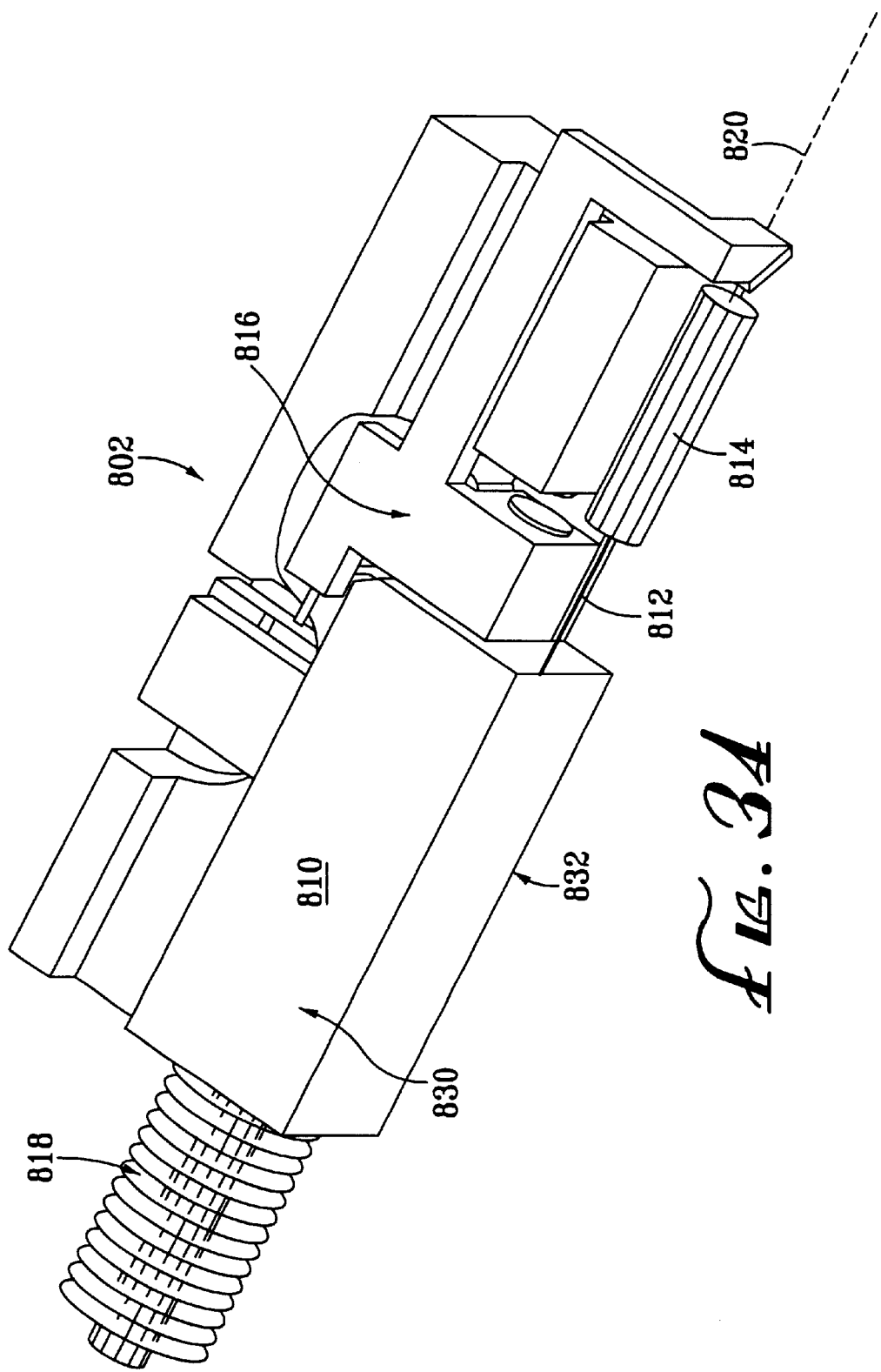
FIG. 34 is a perspective view of a common optical switch module employed in the one-by-sixteen fiber optical switch shown in FIG. 28.

As depicted in FIG. 33, the common reflector assembly 816 includes a common reflector 846. The first intermediate reflector assemblies 816(1)–816(7) include first intermediate reflectors 846(1)–846(7). The second intermediate reflector assemblies 816(9)–816(15) include second intermediate reflectors 846(9)–846(15). The first terminal reflector assembly 816(8) includes a first terminal reflector 846(8). The second terminal reflector assembly 816(16) includes a second terminal reflector 846(16). The common terminal reflector assembly 824 include a common terminal reflector 888.

When the common reflector assembly 816 and the first intermediate reflector assemblies 816(1)–816(7) are in their first positions, as depicted in FIG. 33, the common reflector 846 and the first intermediate reflectors 846(1)–846(7) respectively intersect the common optical axis 820 and first intermediate optical axes 820(1)–820(7) at forty-five degree angles, and the first intermediate reflectors 846(1)–846(7) are orthogonally positioned with respect to the common reflector 846. The first terminal reflector 846(8) intersects the terminal optical axis 820(8) at a forty-five degree angle and is orthogonally positioned with respect to the common reflector 846.

When the common terminal reflector assembly 824 and the second intermediate reflector assemblies 816(9)–816(15) are in their first positions, the common terminal reflector 888 and the second intermediate reflectors 846(9)–846(15) respectively intersect the common optical axis 820 and second intermediate optical axes 820(9)–820(15) at forty-five degree angles. In addition, the second intermediate reflectors 846(9)–846(15) are orthogonally positioned with respect to the common terminal reflector 888. The second terminal reflector 846(16) intersects the second terminal optical axis 820(16) at a forty-five degree angle and is orthogonally positioned with respect to the common terminal reflector 888.

Referring to FIG. 28A, the switch 800 further includes a common magnetic reflector assembly mover 818, first intermediate magnetic reflector assembly movers 818(1)–818(7), and second intermediate magnetic reflector assembly movers 818(9)–818(15) to respectively facilitate the movement of the common reflector assembly 816, first intermediate reflector assemblies 816(1)–816(7), and second intermediate reflector assemblies 816(9)–816(15) between their respective first positions and second positions. The structural and operational features of the respective magnetic reflector assembly movers will be described in further detail below.

Referring to FIGS. 28A and 28B, the switch 800 is preferably compartmentalized into eighteen fiber optical switch modules: a common fiber optical switch module 802, fourteen respective intermediate fiber optical switch modules 802(1)–802(7) and 802(9)–802(15), two respective terminal fiber optical switch modules 802(8) and 802(16), and a common terminal fiber optical switch module 804. The common fiber optical switch module 802 includes a common module base 810, the common optical fiber 812 and corresponding GRIN lens 814, common reflector assembly 816, and common magnetic reflector assembly mover 818.

The first intermediate fiber optical switch modules 802(1)–802(7) respectively include first intermediate module bases 810(1)–810(7), the first intermediate optical fibers 812(1)–812(7) and corresponding GRIN lenses 814(1)–814(7), first intermediate reflector assemblies 816(1)–816(7), and first intermediate magnetic reflector assembly movers 818(1)–818(7). The second intermediate fiber optical switch modules 802(9)–802(15) respectively include second intermediate module bases 810(9)–810(15), the second intermediate optical fibers 812(9)–812(15) and corresponding GRIN lenses 814(9)–814(15), second intermediate reflector assemblies 816(9)–816(15), and second intermediate magnetic reflector assembly movers 818(9)–818(15).

The first terminal fiber optical switch module 802(8) includes a first terminal module base 810(8), the first terminal optical fiber 812(8) and corresponding GRIN lens 814(8), and first terminal reflector assembly 816(8). The second terminal fiber optical switch module 802(16) includes a second terminal module base 810(16), the second terminal optical fiber 812(16) and corresponding GRIN lens 814(16), and second terminal reflector assembly 816(16). The common terminal fiber optical switch module 804 includes a common terminal module base 822 and the common terminal reflector assembly 824.

With reference to FIGS. 34–39, the structural and operational features of the common fiber optical switch module 802 will now be described in further detail. As described above and as shown in further detail in FIG. 34, the common fiber optical switch module 802 comprises the common module base 810, common optical fiber 812 and accompanying GRIN lens 814, common reflector assembly 816, and common magnetic reflector assembly mover 818. The module base has a top surface 830 and a bottom surface 832. The optical fiber 812 and GRIN lens 814 are fixably mounted to the module base 810 such that the optical axis 820 of the optical fiber 812 is parallel to the top surface 830 of the module base 810. The reflector assembly 816 is rotatably mounted to the module base 810. The magnetic reflector assembly mover 818 is magnetically coupled to the reflector assembly 816 to place the reflector assembly 816 between the first position and the second position to alternately intersect (see FIG. 35) and not intersect (see FIG. 36) the optical axis 820 of the optical fiber 812.

Figure 37:
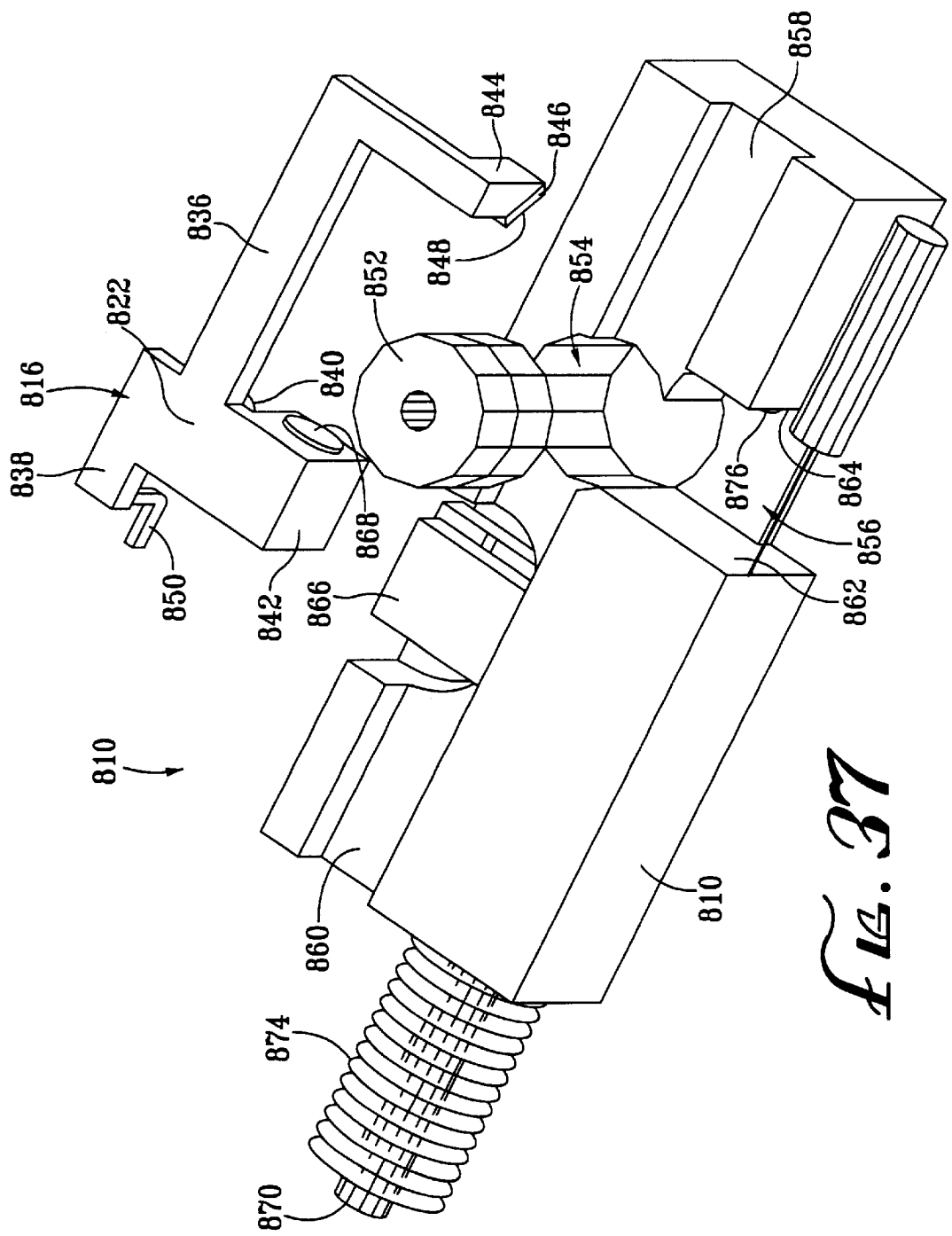
FIG. 37 is a top perspective exploded view of the common optical switch module shown in FIG. 34.
Figure 38:
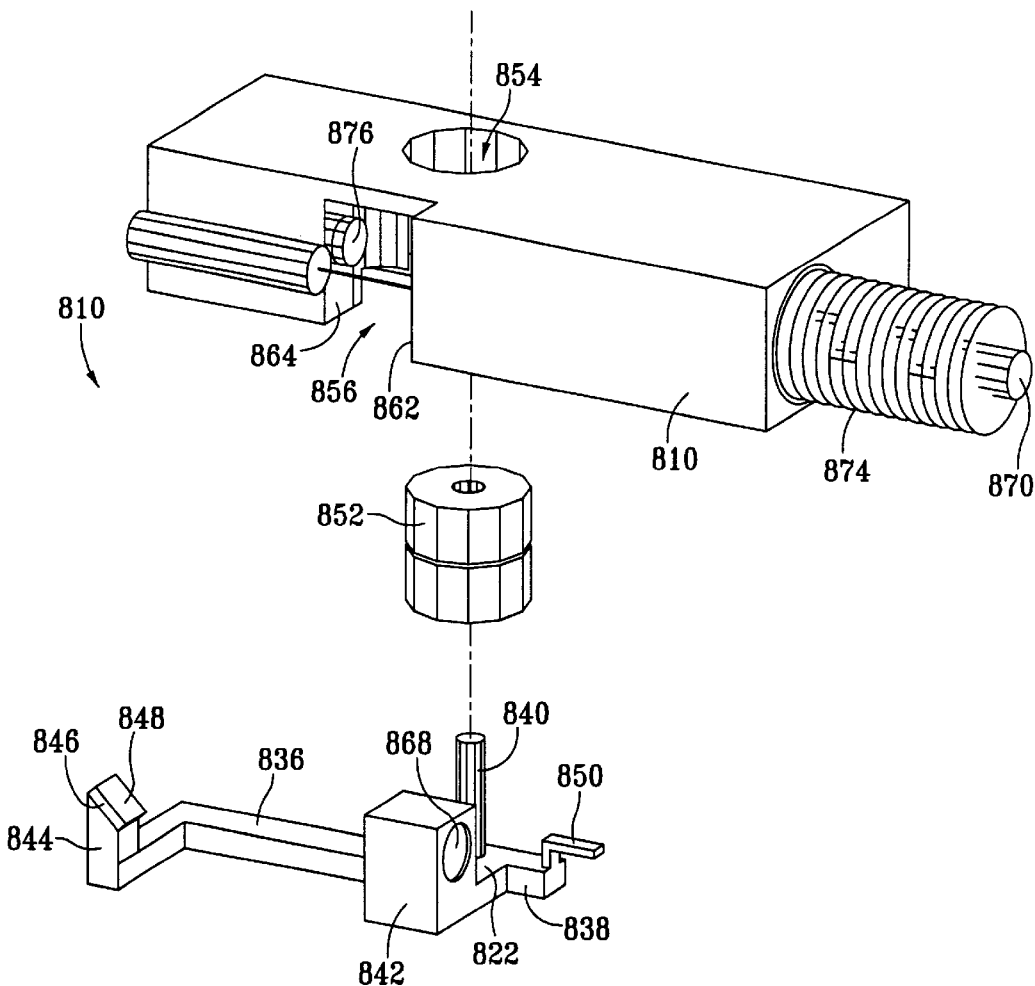
FIG. 38 is a bottom perspective exploded view of the common optical switch module in FIG. 34.

With reference to FIGS. 37 and 38, the reflector assembly 816 comprises an armature 822. The reflector assembly 816 further comprises a first arm 836, a second arm 838, a vertical support 840, and a rotation stop 842, which extend from the armature 822 and are preferably integrally formed therewith.

The first arm 836 is L-shaped and includes a vertical flange 844 on which a reflector 846 is affixed at a forty-five degree angle. Preferably, the reflector 846 has a single flat, front coated reflector surface 848. Other types of reflectors, e.g., spherical reflectors, can be used as well without departing from the scope of the invention. A zero-position plate 850 is affixed to the second arm 838 to provide positioning confirmation for use with a controller (not shown), as will be described in further detail below. The reflector assembly 816 further comprises a bearing assembly 852 in which the vertical support 840 is rotatably mounted.

The module base 810 is arranged such that the reflector assembly 816 fits therein via bearing assembly 852 to allow the reflector assembly 816 to rotate in an arcuate manner. Specifically, the module base 810 comprises a cavity 854 which receives bearing assembly 852. Bearing assembly 852 is preferably inserted therein in a snug fashion.

The module base 810 comprises an opening 856, which is adapted to receive the rotation stop 842. The module base 810 also comprises a first channel 858, which receives the first arm 836. The module base 810 also comprises a second channel 860, which receives the second arm 838. The opening 856, first channel 858, and second channel 860 are large enough to allow the reflector assembly 816 to arcuately rotate about the vertical support 840. The module base 810 further comprises a first stop wall 862 and a second stop wall 864 that bound the opening 856. The first stop wall 862 and second stop wall 864 restrict the arcuate movement of the reflector assembly 816 and allow the reflector assembly 816 to be accurately placed in a first position (see FIG. 35) and a second position (see FIG. 36), respectively, as will be discussed further below.

The module base 810 comprises an optical interrupter 866 mounted in the second channel 860. The zero position plate 850, which is mounted to the second arm 838, is disposed in the optical interrupter 866, in such a manner as to aid in determining the rotational position of the reflector assembly 816. The structure and method of using the optical interrupter 866 and zero position plate 850 are described in U.S. Pat. No. 5,420,946, which is hereby incorporated by reference in its entirety.

The reflector assembly mover 818 comprises a magnet 868, which is disposed in the rotation stop 842, and is installed such that a portion of the magnet 868 exists within the rotation stop 842 and a portion exists external to rotation stop 842. The polarity of magnet 868 is such that the portion extending out of rotation stop 842 has a southern magnetic polarity and the portion within rotation stop 842 has a northern magnetic polarity (see FIGS. 35 and 36).

Figure 35:
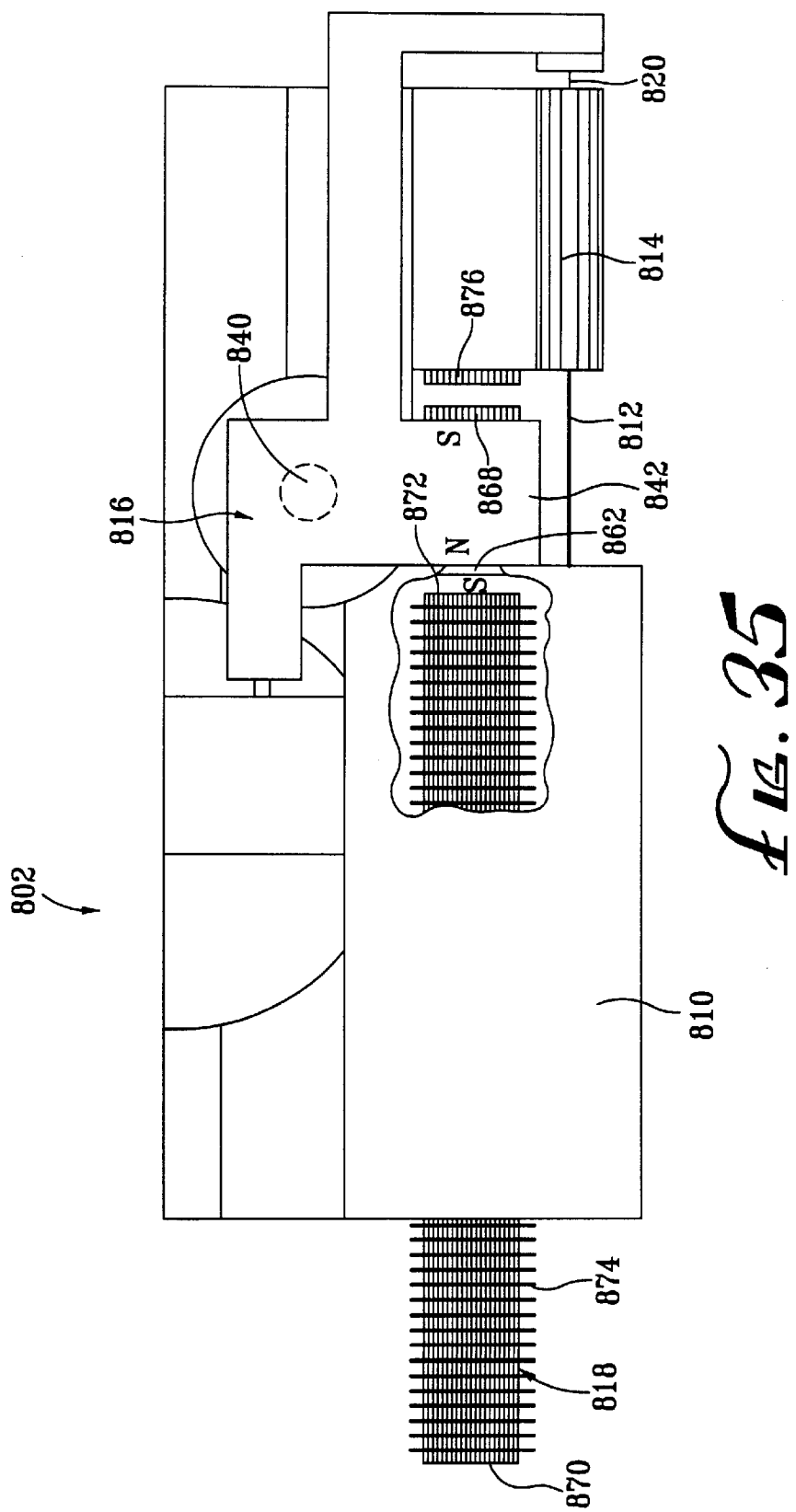
FIG. 35 is a top view of the common optical switch module shown in FIG. 34 with the reflector assembly in a first position.
Figure 36:
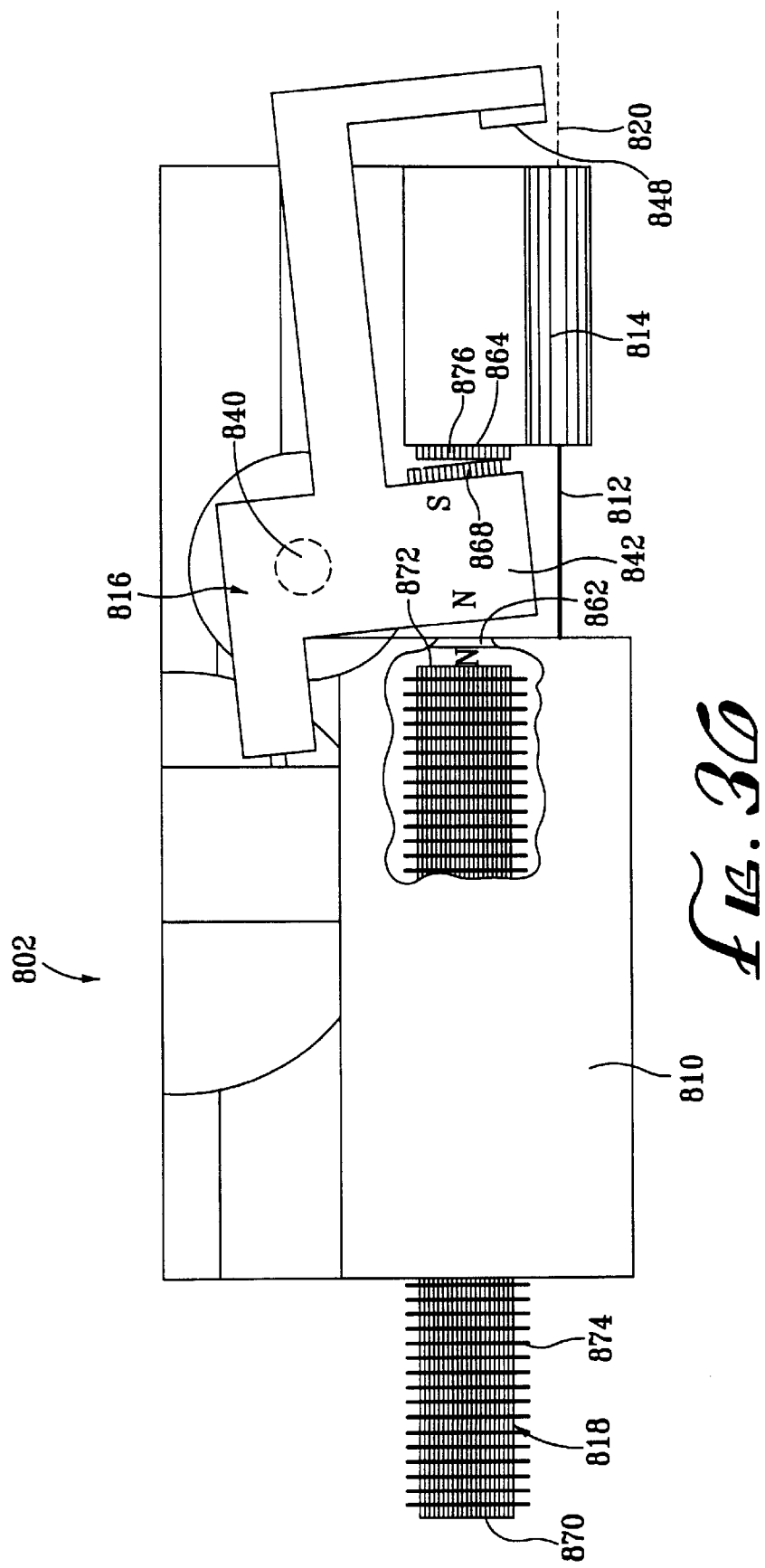
FIG. 36 is a top view of the common optical switch module shown in FIG. 34 with the reflector assembly in a second position.

As best seen in FIGS. 35 and 36, the reflector assembly mover 818 further comprises a first ferromagnetic object, such as soft iron 870, which is disposed in the module base 810. The first soft iron 870 is installed in the module base 810 such that it extends into the core of the module base 810. The first soft iron 870 has an end 872 that is located substantially close to the first stop wall 862 inside the module base 810. In this embodiment, the first soft iron 870 preferably does not break through the first stop wall 862. Wound around the first soft iron 870 is a wire 874, which, as will be discussed below, is used to create the electrically induced magnetic fields used to rotate the reflector assembly 816 with arcuate movements. The reflector assembly mover 818 further comprises a second ferromagnetic object, such as second soft iron 876, which is disposed in the module base 810 such that it extends through the second stop wall 864 into the opening 856.

The optical interrupter 866 and wire 874 are electrically coupled to a controller (not shown), so that the position of the reflector assembly 816 can be monitored and switched.

Application of current in alternating polarities to the wire 874 creates alternating electrically induced magnetic fields, causing movement of the reflector assembly 816 between its first position and second position.

As shown in FIG. 35, a first passive magnetic force maintains the reflector assembly 816 in its first position. In particular, the passive magnetic attraction between the first soft iron 862 and the northern magnetic pole of magnet 868 causes the rotation stop 842 to rest against the first stop wall 862.

Figure 39:
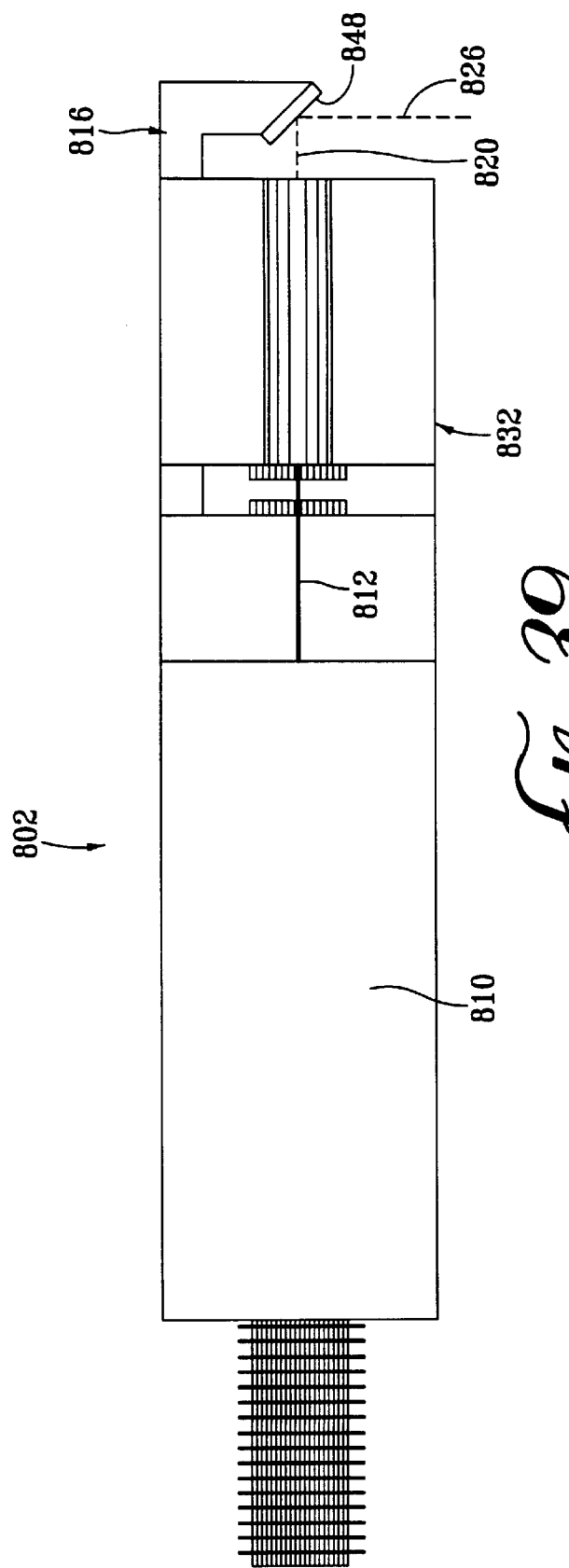
FIG. 39 is a side view of the common optical switch module in FIG. 34 showing the reflector assembly in a first position.

In this first position, the reflector assembly 816 interferes with the path of an optical signal emerging from the input optical fiber 812. As best shown in FIG. 39, the optical signal initially travels in a first direction along the optical axis 820 of the input optical fiber 812 and parallel to the bottom surface 832 of the module 802, and is deflected by the reflector surface 848 along the deflected optical axis 826, so that it travels perpendicular to the bottom surface 832 of the module 802, i.e., in a direction towards the plane of the bottom surface 832. To achieve this result, the reflector surface 848 intersects the optical axis 820 of the input optical fiber 812 at a forty-five degree angle.

As shown in FIG. 36, application of current with a first polarity creates an electrically induced magnetic field that rotates the reflector assembly 816 from its first position to its second position. In this embodiment, the wire 874 is wound such that a northern magnetic field is created at the end 872 of first soft iron 870 inside the module base 810 when current of the first polarity is applied to the wire 874. This northern magnetic field repels the northern magnetic pole of magnet 868 located in rotation stop 842, rotating the reflector assembly 816 about vertical support 840. When the reflector assembly 816 rotates from its first position about vertical support 840 (shown in phantom), the second stop wall 864 hinders the reflector assembly 816 placing the reflector assembly 816 into its second position, i.e., the magnet 868 extending out of rotation stop 842 contacts the second soft iron 876.

In this second position, the reflector assembly 816 does not interfere with the path of an optical signal emerging from the input optical fiber 812. As depicted in FIG. 36, the optical signal initially travels in a first direction along the optical axis 820 of the input optical fiber 812 and parallel to the bottom surface 832 of the module 802, and maintains this trajectory as the optical signal travels past the reflector surface 848.

When the reflector assembly 816 is moved to its second position, a second passive magnetic force caused by the attraction between the southern magnetic pole of the magnet 868 extending out of rotation stop 842 and the second soft iron 876 maintains the reflector assembly 816 in its second position even when the current is removed from the wire 874. Thus, a short pulse of current of the first polarity can be applied to move the reflector assembly 816 from its first position to its second position.

As shown in FIG. 35, application of current with a second polarity creates an electrically induced magnetic field that rotates the reflector assembly 816 from its second position to its first position, creating a southern magnetic field at the end 872 of first soft iron 870 inside the module base 810. This southern magnetic field attracts the northern magnetic pole of magnet 868 located in rotation stop 842. When the reflector assembly 816 is in its second position prior to the application of the current of the second polarity, this attraction is strong enough to overcome the second passive magnetic force caused by the attraction between the southern magnetic pole of magnet 868 and the second soft iron 876. Thus, reflector assembly 816 will rotate back about vertical support 840 from its second position until the first stop wall 862 hinders the reflector assembly 816 placing the reflector assembly 816 into its first position, i.e., the rotation stop 842 rests flush against the first stop wall 862. The first passive magnetic force will maintain the reflector assembly 816 in its first position. Thus, a short pulse of current of the second polarity can be applied to move the reflector assembly 816 from its second position to its first position.

In alternative embodiments, the second soft iron 876 is not used. This is done so that the passive magnetic force between the first soft iron 870 and the magnet 868 causes the reflector assembly 816 to rotate from its second position to its first position when the current of the first polarity is removed from the wire 874.

Of course, one skilled in the art will recognize that the polarity selected for the magnet 868 can be reversed, and the wire 874 can accordingly be wound in the opposite direction, or the direction of the current could be reversed so as to create the opposite magnetic polarity about first soft iron 870, with equally satisfactory results.

The first intermediate fiber optical switch modules 802(1)–802(7) are identical in structure to the common fiber optical switch module 802 with the exception that the elements of the first intermediate fiber optical switch modules 802(1)–802(7) are transposed from the elements of the common fiber optical switch module 802. That is, when the bottom surface 810 of the common fiber optical switch module 802 faces in the same direction as the respective bottom surfaces 810(1)–810(7) of the intermediate fiber optical switch modules 802(1)–807(7) as depicted in FIG. 28, the respective first intermediate reflectors 834(1)–834(7) are orthogonally positioned with respect to the common reflector 834, as mentioned above with reference to FIG. 33. The second intermediate fiber optical switch modules 802(9)–802(15) are identical in structure to the common fiber optical switch module 802.

Figure 40:
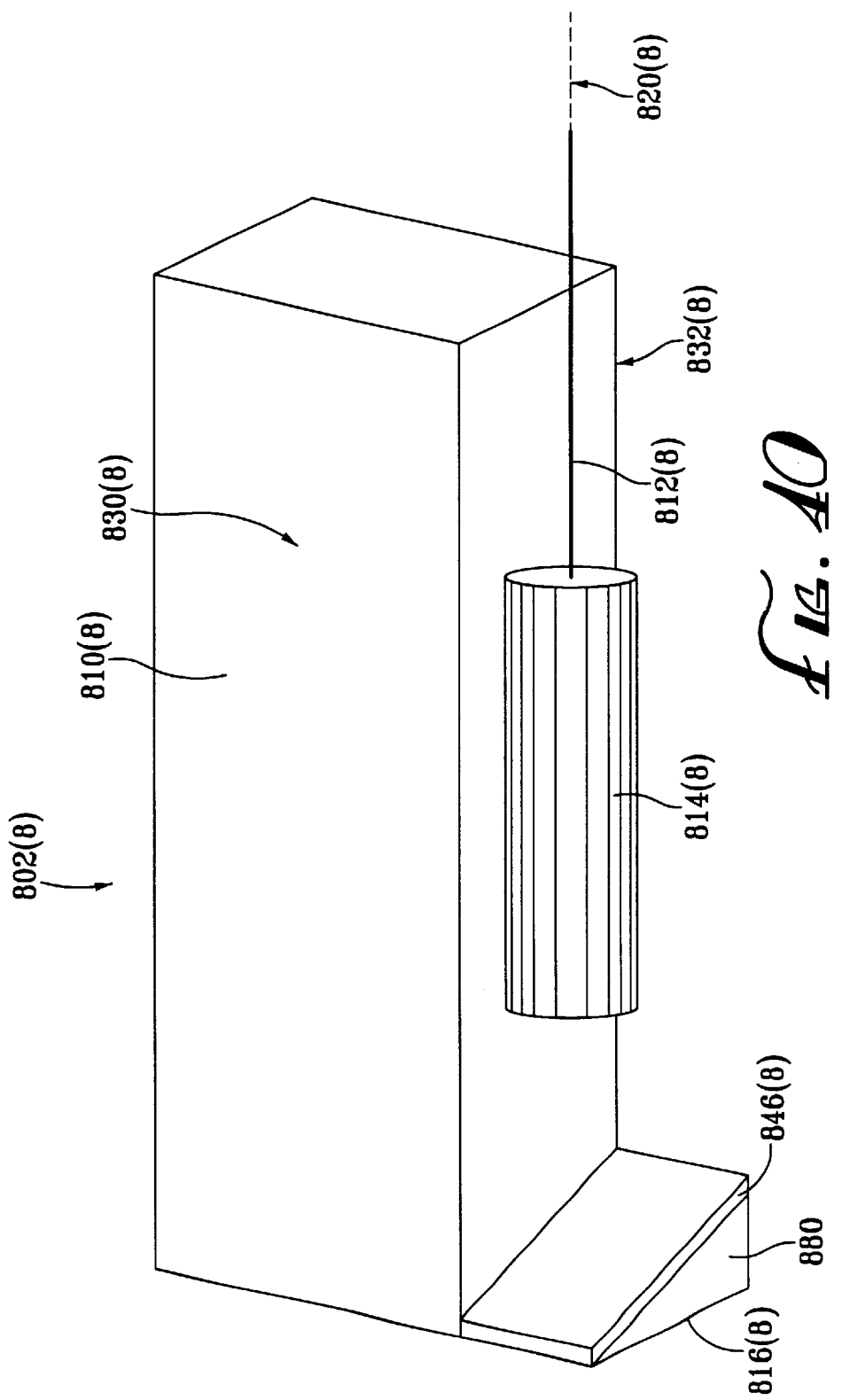
FIG. 40 is a perspective view of a first terminal optical switch module employed in the one-by-sixteen optical switch in FIG. 28.

The first terminal fiber optical switch module 802(8) is depicted in FIG. 40. As discussed briefly above, the first terminal fiber optical switch module 802(8) comprises the first terminal module base 810(8), the optical fiber 812(8) with an affixed GRIN lens 814(8), and the first terminal reflector assembly 816(8). The module base 810(8) has a top surface 830(8) and a bottom surface 832(8). The optical fiber 812(8) and GRIN lens 814(8) are fixably mounted to the module base 810(8) such that the optical axis 820(8) of the optical fiber 812(8) is parallel to the top surface 830(8) of the module base 810(8). The reflector assembly 816(8) comprises a mirror holder, such as a protuberance 880 integrally formed on the module base 810(8). The reflector assembly 816(8) further comprises the reflector 846(8) fixably mounted to the protuberance 880 at a forty-five degree angle to the top surface 830(8) of the module base 812(8) such that when the top surface 830(8) of the first terminal fiber optical switch module 802(8) faces in the same direction as the bottom surfaces 830(1)–830(7) of the intermediate fiber optical switch modules 802(1)–802(17) as depicted in FIG. 28, the first terminal reflector 846(8) is parallel to the respective first intermediate reflectors 846(1)–846(7).

The second terminal fiber optical switch module 802(16) is identical in structure to the first terminal fiber optical switch module 802(8) with the exception that the elements of the second terminal fiber optical switch module 802(16) are transposed from the elements of the first terminal fiber optical switch module 802(8). That is, when the top surface 830(16) of the second terminal fiber optical switch module 802(16) faces in the same direction as the bottom surfaces 832(10)–832(16) of the respective intermediate fiber optical switch modules 802(10)–802(16) as depicted in FIG. 28, the second terminal reflector 846(16) is parallel to the respective second intermediate reflectors 834 (10)–834(16).

Figure 41:
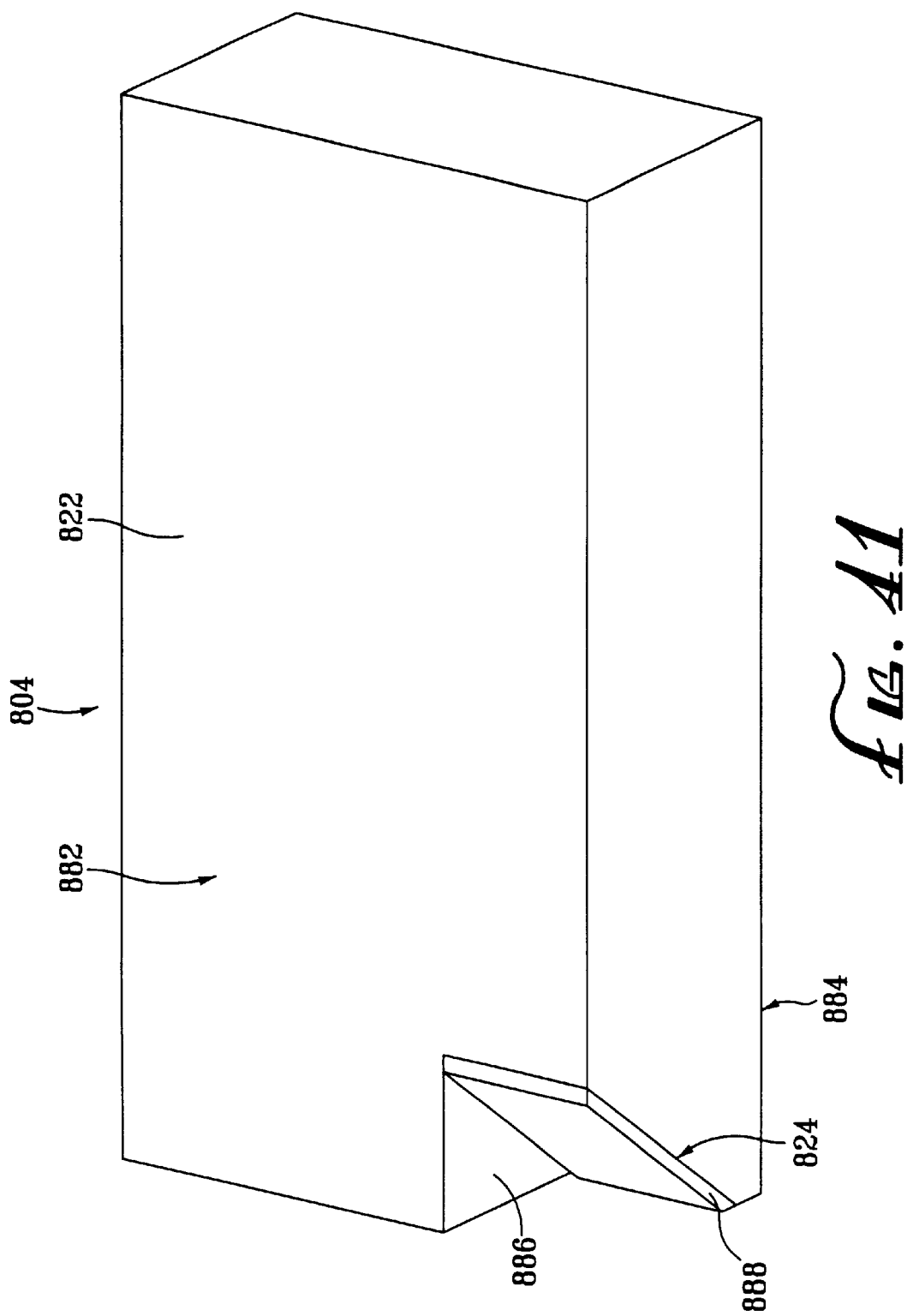
FIG. 41 is a perspective view of a trans-series optical switch module employed in the one-by-sixteen optical switch in FIG. 28.

The common terminal fiber optical switch module 804 is depicted in FIG. 41. As discussed briefly above, the common terminal fiber optical switch module 804 comprises the common terminal module base 822 and the common terminal reflector assembly 824. The module base 822 has a top surface 882 and a bottom surface 884. The reflector assembly 824 comprises a mirror holder, such as a notch 886 formed into the module base 822. The reflector assembly 824 further comprises the reflector 888 fixably mounted to the notch 886 at a forty-five degree angle to the top surface 882 of the module base 822 such that when the top surface 882 of the common terminal fiber optical switch module 804 faces in the same direction as the respective top surfaces 830(9)–830(15) of the second intermediate fiber optical switch modules 802(9)–802(15) as depicted in FIG. 28, the reflector 888 of the common terminal fiber optical switch module 804 is parallel to the respective reflectors 846(9) –834(15) of the second intermediate fiber optical switch modules 802(9)–802(15).

Operation of the switch 800 will now be described with reference to FIGS. 29–32 and 42–43. By switching each of the respective reflector assemblies 816 and 816(1)–816(16) into the respective first positions or second positions, the switch 800 can be placed in one of sixteen states to optically couple the common optical fiber 812 with one of the optical fibers 812(1)–812(16). Optically coupling the common optical fiber 812 with the respective optical fibers 812(1)–812 (16) respectively places the switch 800 in states 1–16.

As depicted in FIG. 29, the first series of optical fibers 812(1)–812(8) are optically engaged with the common optical fiber 812, and the second series of optical fibers 812(9) –812(16) are optically disengaged from the common optical fiber 812 by placing the common reflector assembly 816 in its first position.

An optical signal travelling along the common optical axis 820 from the common optical fiber 812 is deflected by the common reflector assembly 816 at a ninety-degree angle along the first deflected axis 826 adjacent the first series of optical fibers 812(1)–812(8). Similarly, but in a reverse fashion, an optical signal originating from one of the first series of optical fibers 812(1)–812(8) and travelling along the first deflected axis 826 is deflected by the common reflector assembly 816 at a ninety degree angle along the common optical axis 820 into the common optical fiber 812.

As depicted in FIG. 30, the first series of optical fibers 812(1)–812(8) are optically disengaged from the common optical fiber 812, and the second series of optical fibers 812(9)–812(16) are optically engaged with the common optical fiber 812 by placing the common reflector assembly 816 in its second position.

An optical signal travelling along the common optical axis 820 from the common optical fiber 812 is not deflected by the common reflector assembly 816, thereby bypassing the first deflected axis; and is deflected by the common terminal reflector assembly 824 at a ninety degree angle along the second deflected axis 828 adjacent the second series of optical fibers 812(9)–812(16). Similarly, but in a reverse fashion, an optical signal originating from one of the second series of optical fibers 812(9)–812(16) and travelling along the second deflected axis 828 is deflected by the common terminal reflector assembly 824 at a ninety degree angle along the common optical axis 820 into the common optical fiber 812.

Referring generally to FIGS. 29 and 31, when the first series of optical fibers 812(1)–812(8) are optically engaged with the common optical fiber 812, a selected first intermediate optical fiber of the first intermediate optical fibers 812(1)–812(7) is optically coupled to the common optical fiber 812. This is accomplished by placing the intermediate reflector assemblies associated with the intervening first intermediate optical fibers (i.e., those first intermediate optical fibers positioned between the common optical fiber 812 and the selected intermediate optical fiber) in their respective second positions, thereby optically decoupling the intervening first intermediate optical fibers from the common optical fiber 812 (shown generally in FIG. 31). In addition, the intermediate reflector assembly associated with the selected first intermediate optical fiber is placed in its first position, thereby optically coupling the selected first intermediate optical fiber to the common optical fiber 812.

An optical signal travelling along the first deflected optical axis 826 originating from the common optical fiber 812 is not deflected by the intermediate reflector assemblies associated with the intervening first intermediate optical fibers, thereby bypassing the intermediate optical axes of the intervening first intermediate optical fibers; and is deflected by the intermediate reflector assembly associated with the selected first intermediate optical fiber at a ninety-degree angle along the intermediate optical axis of the selected first intermediate optical fiber into the selected first intermediate optical fiber. An optical signal travelling from the selected intermediate optical fiber to the common optical fiber occurs in a similar but reversed manner.

Figure 42:
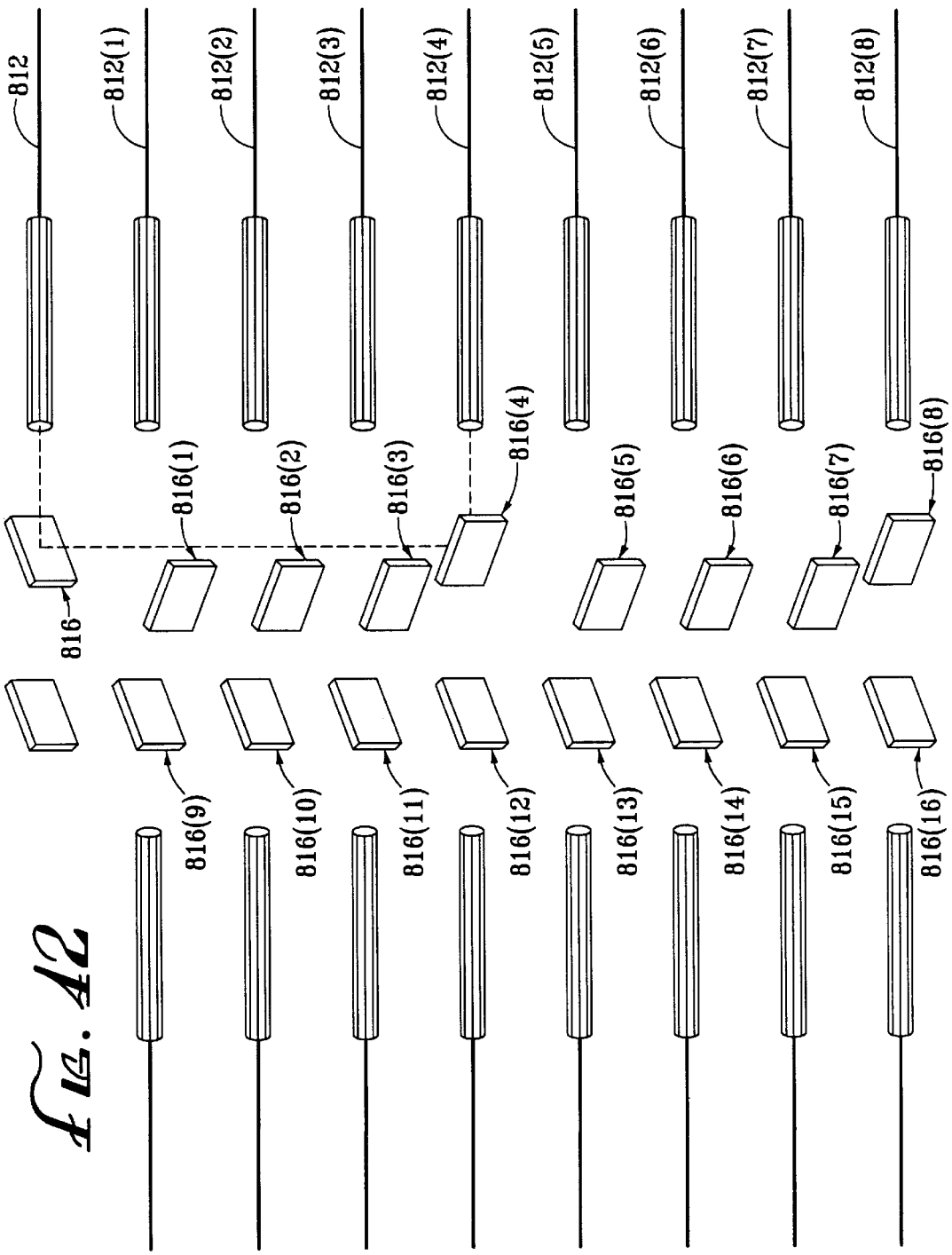
FIG. 42 is a schematic perspective view of the one-by-sixteen fiber optical switch in FIG. 28 showing an optical signal path when the common reflector assembly is in a first position and a selected first intermediate reflector assembly is in a first position.

For instance, as depicted in FIG. 42, the intermediate optical fiber 812(4) is optically coupled to the common optical fiber 812 by placing the common reflector assembly 816 in its first position to optically engage the first series of optical fibers 812(1)–812(8) with the common optical fiber 812, placing the intermediate reflector 816(4) in its first position, and placing the respective intermediate reflector assemblies 816(1)–816(3) in their second positions. The intermediate reflector assemblies 816(5)–816(7) and second intermediate reflector assemblies 816(9)–816(15) can either respectively be in their first positions or second positions.

When the first series of optical fibers 812(1)–812(8) are optically engaged with the common optical fiber 812, the first terminal optical fiber 812(8) is optically coupled to the common optical fiber 812 by placing the first intermediate reflector assemblies 816(1)–812(7) into their respective second positions.

As depicted in FIG. 31, an optical signal travelling along the common optical axis 820 from the common optical fiber 812 is deflected by the common reflector assembly 816 at a ninety-degree angle along the first deflected axis 826. The optical signal is not deflected by the first intermediate reflector assemblies 816(1)–816(7), thereby bypassing the second intermediate optical axis 820(1)–820(7). The optical signal is deflected by the first terminal reflector assembly 820(8) at a ninety degree angle along the first terminal optical axis 820(8) to the second terminal optical fiber 812(8). An optical signal travelling from the first terminal optical fiber 812(8) to the common optical fiber 812 occurs in a similar but reversed manner.

Referring generally to FIGS. 30 and 32, when the second series of optical fibers 812(9)–812(16) are optically engaged with the common optical fiber 812, a selected intermediate optical fiber of the second intermediate optical fibers 812 (9)–812(15) is optically coupled to the common optical fiber 812. This is accomplished by placing the intermediate reflector assemblies associated with the intervening second intermediate optical fibers (i.e., those second intermediate optical fibers positioned between the common optical fiber 812 and the selected intermediate optical fiber) in their respective second positions, thereby optically decoupling the intervening second intermediate optical fibers from the common optical fiber 812. In addition, the intermediate reflector assembly associated with the selected second intermediate optical fiber is placed in its first position, thereby optically coupling the selected second intermediate optical fiber to the common optical fiber 812.

An optical signal travelling along the second deflected optical axis 828 originating from the common optical fiber 812 is not deflected by the intermediate reflector assemblies associated with the intervening second intermediate optical fibers, thereby bypassing the intermediate optical axes of the intervening second intermediate optical fibers; and is deflected by the intermediate reflector assembly associated with the selected second intermediate optical fiber at a ninety-degree angle along the intermediate optical axis of the selected second intermediate optical fiber into the selected second intermediate optical fiber. An optical signal travelling from the selected second intermediate optical fiber to the common optical fiber 812 occurs in a similar but reversed manner.

For instance, as depicted in FIG. 43, the intermediate optical fiber 812(10) is optically coupled to the common optical fiber 812 by placing the common reflector assembly 816 in its second position to optically engage the second series of optical fibers 812(9)–812(6) with the common optical fiber 812, placing the intermediate reflector 816(10) in its first position, and placing the respective intermediate reflector assembly 816(9) in its second positions. The first intermediate reflector assemblies 816(1)–816(7) and intermediate reflector assemblies 816(11)–816(15) can either respectively be in their first positions or second positions.

When the second series of optical fibers 812(9)–812(16) are optically engaged with the common optical fiber 812, the second terminal optical fiber 812(16) is optically coupled to the common optical fiber 812 by placing the second intermediate reflector assemblies 816(9)–812(15) into their respective second positions.

As depicted in FIG. 32, an optical signal travelling along the common optical axis 820 from the common optical fiber 812 is not deflected by the common reflector assembly 816, thereby bypassing the first deflected optical axis 826. The optical signal is deflected by the common terminal reflector assembly 824 at a ninety degree angle along the second deflected optical axis 828; and is deflected by the second terminal reflector assembly 816(16) at a ninety degree angle along the second terminal optical axis 820(16) to the second terminal optical fiber 812(16). An optical signal travelling from the second terminal optical fiber 812(16) to the common optical fiber 812 occurs in a similar but reversed manner.

As alluded to above, the common optical fiber 812 can be employed as an input optical fiber, and the optical fibers 812(1)–812(16) can be employed as output optical fibers to create an input common fiber optical switch 800. Alternatively, the common optical fiber 812 can be employed as an output optical fiber, and the optical fibers 812(1)–812(16) can be employed as input optical fibers to create an output common fiber optical switch 800.

Although the one-by-N fiber optical switch 800 described above comprises one common optical fiber and sixteen optical fibers to which the common optical fiber can be coupled, thereby creating a one-by-sixteen fiber optical switch, various one-by-N fiber optical switches can be created by varying the number of intermediate optical fibers. For instance, a one-by-N fiber optical switch that includes one first intermediate optical fiber, one first terminal optical fiber, one second intermediate optical fiber and one second terminal optical fiber constitutes a one-by-four fiber optical switch; a one-by-N fiber optical switch that includes three first intermediate optical fibers, one first terminal optical fiber, three second intermediate optical fibers and one second terminal optical fiber constitutes a one-by-eight fiber optical switch; a one-by-N fiber optical switch that includes thirty-one first intermediate optical fibers, one first terminal optical fiber, thirty-one second intermediate optical fibers and one second terminal optical fiber constitutes a one-by-thirty two fiber optical switch, and so forth.

Figure 44A:
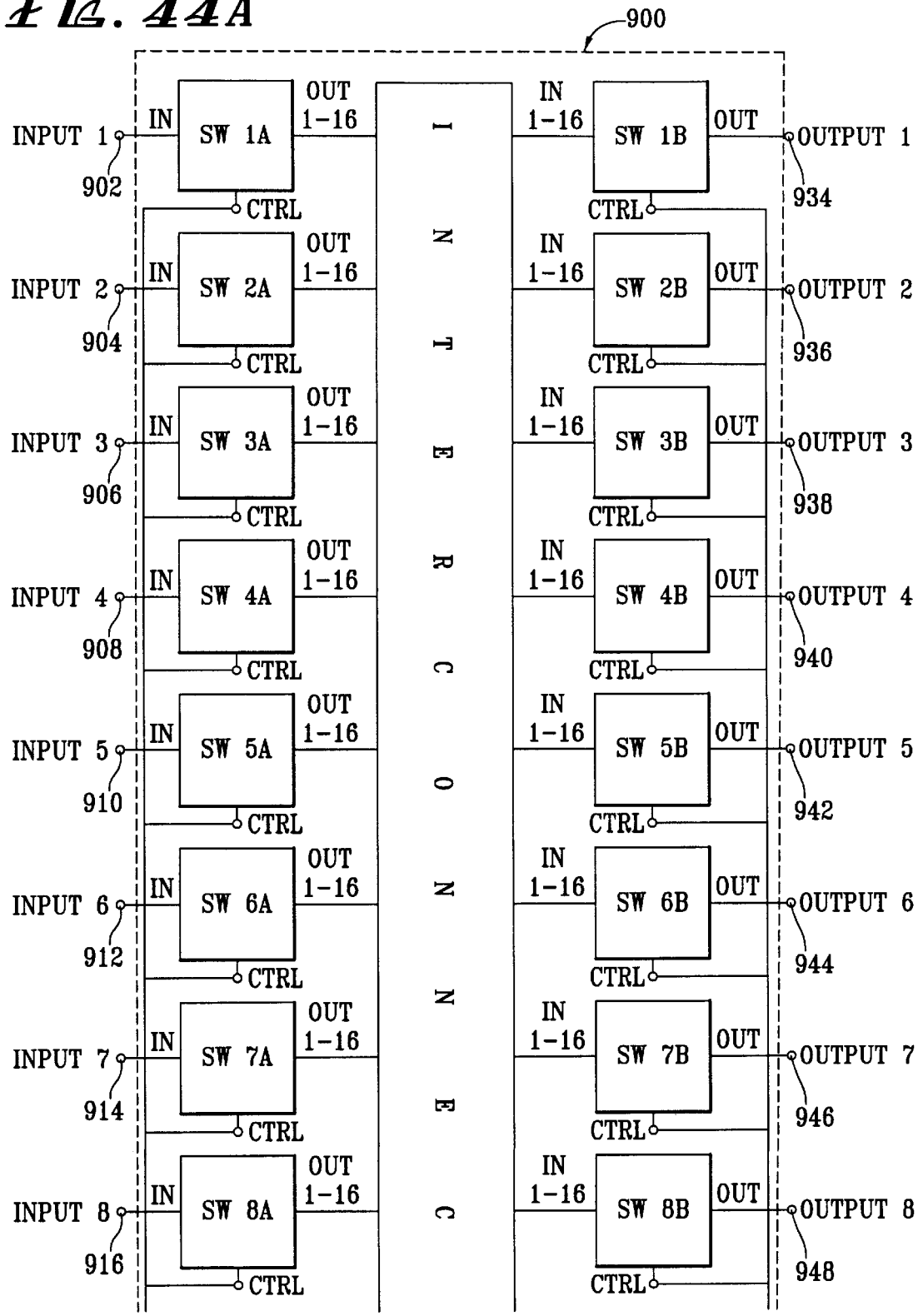
FIGS. 44A and 44B are a schematic top view of a sixteen-by-sixteen fiber optical switch incorporating a plurality of the one-by-sixteen fiber optical switches in FIG. 28.
Figure 44B:
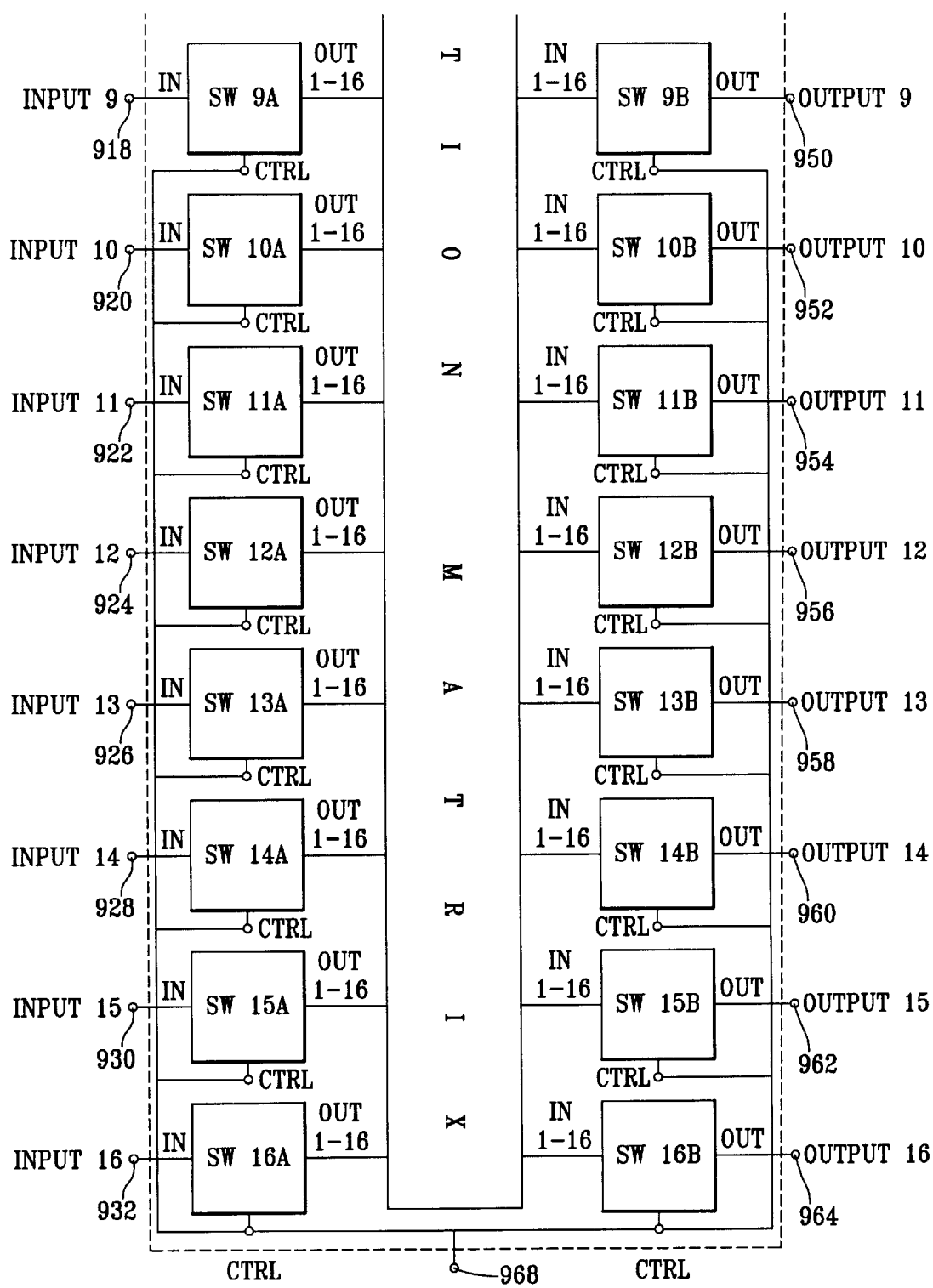

The fiber optical switch 800 can be employed to create a sixteen-by-sixteen fiber optical switch 900 as depicted in FIG. 44. The fiber optical switch 900 includes sixteen respective input terminals 902–932 (i.e., input terminals 902, 904, 906, 908, etc.) and sixteen respective output terminals 934–964 (i.e., output terminals 934, 936, 938, 940, etc.) The internal structure of the fiber optical switch 900 is arranged such that an optical signal that is applied to either of the respective input terminals 902–932 appears on one of the selected output terminals 934–964.

The fiber optical switch 900 includes sixteen respective input common one-by-sixteen switches SW1A–SW16A, each having an input IN, respective outputs OUT1–OUT16, and a control CTRL; and sixteen output common one-by-sixteen switches SW1B–SW16B, each having respective inputs IN1–IN16, an output OUT, and a CTRL. The input terminals 902–932 are respectively formed from the inputs IN of the respective switches SW1A–SW16A. The output terminals 934–964 are respectively formed from the outputs OUT of the respective switches SW1B–SW16B.

The outputs of the fiber optical switches SW1A–SW16A are cross-connected to the fiber optical switches SW1B–SW16B through an interconnection matrix 966 in much the same manner as the fiber optical switches SW1A–SW4A are cross-connected to the fiber optical switches SW1B–SW4B in the four-by-four optical switch 700 with respect to FIG. 26. That is, the outputs OUT1 of the fiber optical switches SW1A–SW16A are respectively optically coupled to the inputs IN1–IN16 of the fiber optical switch SW1B, the outputs OUT2 of the fiber optical switches SW1A–SW16A are respectively optically coupled to the inputs IN1–IN16 of the fiber optical switch SW2B, the outputs OUT3 of the fiber optical switches SW1A–SW16A are respectively optically coupled to the inputs IN1–IN16 of the fiber optical switch SW3B, and so forth.

The fiber optical switch 900 includes a control terminal 968 that is electrically coupled to the respective controls CTRL of the fiber optical switches SW1A–SW16A such that each of the respective switches SW1A–SW16A can be placed in one of sixteen switching states (i.e., IN-OUT1, IN-OUT2, IN-OUT3, IN-OUT4, etc.). Similarly, the control terminal 968 is electrically coupled to the respective controls CTRL of the fiber optical switches SW1B–SW16B such that each of the respective switches SW1B–SW16B can be placed in one of sixteen switching states (i.e., IN1-OUT, IN2-OUT, IN3-OUT, IN4-OUT, etc.).

An optical signal that is applied to one of the sixteen input terminals 902–932 of the fiber optical switch 900 can be routed to one of the sixteen output terminals 934–964 of the fiber optical switch 900 by placing the particular input common one-to-sixteen switch associated with the input terminal to which the optical signal is applied and the particular output common one-to-sixteen switch associated with the output terminal to which the optical signal is to be routed in the proper switching states.

Figure 45:
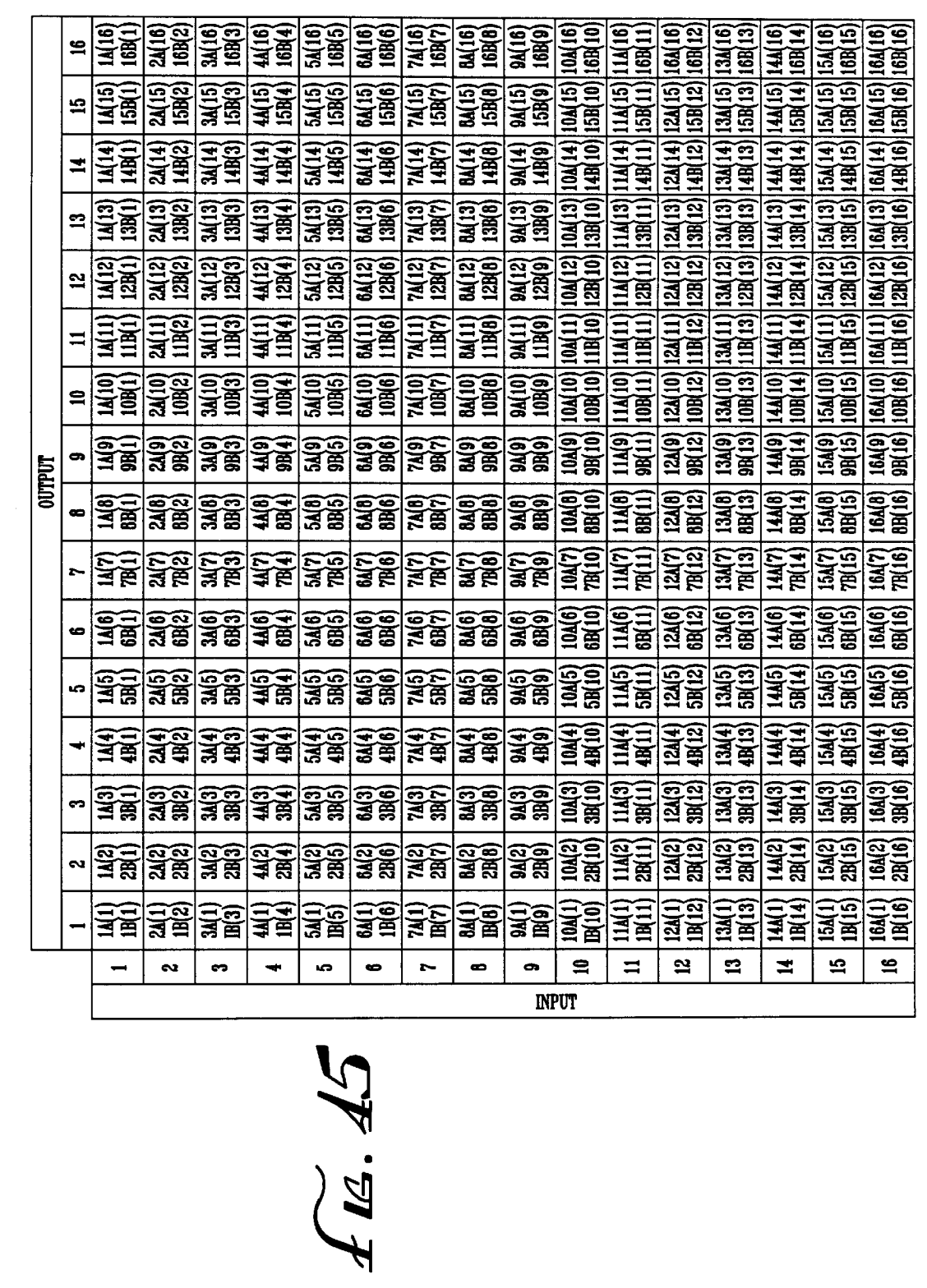

FIG. 45 is a switching table that depicts the particular switch of the respective input common switches SW1A–SW16A and the particular switch of the respective output common one-by-sixteen switches SW1A–SW16A that require activation and the switching states in which the activated switches are placed to effect the desired routing of the optical signal. For instance, to route an optical signal from the input terminal 914 (INPUT 7) to the output terminal 962 (OUTPUT 15) of the fiber optical switch 900, the fiber optical switch SW7A is activated and placed in its fifteenth state, and the fiber optical switch SW15B is activated and placed in its seventh state.

While embodiments and applications of this invention have been shown and described, it would be apparent, to the readers of this description, that many more modifications are possible without departing from the inventive concepts described herein. The invention, therefore, is not to be restricted beyond the scope and in the spirit of the appended claims.

What is claimed is:

1. A one-by-N fiber optical switch, comprising:

a base;

a first optical fiber having a first optical axis, said first optical fiber being fixed relative to said base;

a first reflector corresponding to said first optical fiber, said first reflector being mechanically coupled to said base, said first reflector capable of being in a first position, said first reflector being movable between a first position and a second position;

a first series of optical fibers having first optical axes substantially coplanar with and substantially parallel to said first optical axis, said first series of optical fibers being fixed relative to said base and being adjacent said first optical fiber, said first series of optical fibers comprising a first plurality of optical fibers;

a first series of reflectors mechanically coupled to said base, said first series of reflectors comprising a first plurality of movable reflectors respectively corresponding to said first plurality of optical fibers and being respectively movable between first positions and second positions;

whereby said first series of optical fibers are optically engaged with said first optical fiber when said first reflector is in said first position;

whereby said first plurality of optical fibers are respectively optically aligned with said first optical fiber when said first plurality of reflectors are respectively in said first positions, and said first plurality of optical fibers are respectively optically misaligned with said first optical fiber when said first plurality of reflectors are respectively in second positions;

a second series of optical fibers having second optical axes substantially coplanar with and substantially parallel to said first optical axis, said second series of optical fibers being fixed relative to said base opposite said first optical fiber, said second series of optical fibers comprising a second plurality of optical fibers;

a second series of reflectors mechanically coupled to said base, said second series of reflectors comprising a second plurality of movable reflectors respectively corresponding to said second plurality of optical fibers and being respectively movable between first positions and second positions;

a common terminal reflector fixed relative to said base, said common terminal reflector being opposite said first movable reflector and adjacent said second plurality of movable reflectors;

whereby said first series of optical fibers are optically engaged and said second series of optical fibers are optically disengaged when said first reflector is in said first position; and whereby said first series of optical fibers are optically disengaged and said second series of optical fibers are engaged when said first reflector is in said second position; and whereby said second plurality of optical fibers are respectively optically aligned with said first optical fiber when said second plurality of reflectors are respectively in said first positions, and said second plurality of optical fibers are respectively optically misaligned with said first optical fiber when said second plurality of reflectors are respectively in second positions.

2. The one-by-N fiber optical switch of claim 1, wherein said second series of optical fibers further comprise a second terminal optical fiber; and wherein said second series of reflectors further comprise a second terminal reflector corresponding to said second terminal optical fiber and fixed relative said base;

whereby said second terminal optical fiber is optically aligned with said first optical fiber.

3. The one-by-N fiber optical switch of claim 2, wherein said first series of optical fibers comprise eight optical fibers, said first series of reflectors comprise eight reflectors, said second series of optical fibers comprise eight optical fibers, and said second series of reflectors comprise eight reflectors.

4. The one-by-N fiber optical switch of claim 2, wherein said first optical fiber is an input optical fiber, said first series of optical fibers and said second series of optical fibers comprises output optical fibers, and all of said optical fibers respectively comprise GRIN lenses.

5. A one-by-N fiber optical switch, comprising:

a base;

a common optical fiber having a common optical axis, said common optical fiber fixably mounted to said base;

at least one first intermediate optical fiber having at least one first intermediate optical axis, said at least one first intermediate optical fiber fixably mounted to said base adjacent said common optical fiber, said at least one first intermediate optical fiber substantially coplanar with and substantially parallel to said common optical fiber;

a common reflector assembly mounted to said base, said common reflector positioned to intersect said common optical axis to create a first deflected optical axis;

at least one first intermediate reflector assembly movably mounted to said base adjacent said common reflector assembly, said at least one first intermediate reflector assembly movable to a first position to intersect said first deflected optical axis and said at least one first intermediate optical axis, said at least one first intermediate reflector assembly movable to a second position to bypass said first deflected optical axis;

at least one second intermediate optical fiber having at least one second intermediate optical axis, said at least one second intermediate optical fiber fixably mounted to said base opposite said common optical fiber, said at least one second intermediate reflector assembly substantially coplanar with and substantially parallel to said common optical fiber;

a common terminal reflector assembly mounted to said base opposite said common reflector assembly, said common terminal reflector assembly positioned to intersect said common optical axis to create a second deflector optical axis; and at least one second intermediate reflector assembly movably mounted to said base adjacent said common terminal reflector assembly, said at least one second intermediate reflector assembly movable to a first position to intersect said second deflected optical axis and said at least one second intermediate optical axis, said at least one second intermediate reflector assembly movable to a second position to bypass said second deflected optical axis;

wherein said common reflector assembly is movably mounted to said base, said common reflector assembly is movable between a first position and a second position to alternately intersect and bypass said common optical axis.

6. The one-by-N fiber optical switch of claim 5, further comprising:

a first terminal optical fiber having a first terminal optical axis, said first terminal optical fiber fixably mounted to said base adjacent said at least one first intermediate optical fiber, said first terminal optical fiber being substantially coplanar with and substantially parallel to said common optical fiber;

a first terminal reflector assembly mounted to said base adjacent said at least one first intermediate reflector assembly, said first terminal reflector assembly positioned to intersect said first deflected optical axis and said first terminal optical axis;

a second terminal optical fiber having a second terminal optical axis, said second terminal optical fiber fixably mounted to said base adjacent said at least one second intermediate optical fiber, said second terminal optical fiber being substantially coplanar with and substantially parallel to said common optical fiber; and a second terminal reflector assembly mounted to said base adjacent said at least one second intermediate reflector assembly, said second terminal reflector assembly positioned to intersect said second deflected optical axis and said second terminal optical axis.

7. The one-by-N fiber optical switch of claim 6, further comprising at least one first magnet reflector mover respectively magnetically coupled to said at least one first intermediate reflector assembly, at least one second magnet reflector assembly mover respectively magnetically coupled to said at least one second intermediate reflector assembly, and a common magnet reflector assembly mover magnetically coupled to said common reflector assembly.

8. The one-by-N fiber optical switch of claim 6, wherein said first terminal reflector assembly, said second terminal reflector assembly, and said common terminal reflector assembly are fixably mounted to said base.

9. The one-by-N fiber optical switch of claim 8, wherein said common reflector assembly, said at least one first intermediate reflector assembly, said first terminal reflector assembly, said common terminal reflector assembly, said at least one second intermediate reflector assembly, and said second terminal reflector assembly respectively comprise a first common reflector, at least one first intermediate reflector, a first terminal reflector, a common terminal reflector, at least one second intermediate reflector, and a second terminal reflector;

wherein when said common reflector assembly and said at least one first intermediate reflector assembly are in said first positions, said common reflector, said at least one first intermediate reflector, and said first terminal reflector respectively intersect said common optical axis, said at least one first intermediate optical axis, and said first terminal axis at forty-five degree angles, and said first terminal reflector and said at least one first intermediate reflector face are orthogonally positioned with respect to said common reflector; and wherein when said at least one second intermediate reflector assembly is in said first position, said common terminal reflector, said at least one second intermediate reflector, and said second terminal reflector respectively intersect said common optical axis, said at least one second intermediate optical axis, and said second terminal axis at forty-five degree angles, and said second terminal reflector and said at least one second intermediate reflector are orthogonally positioned with respect to said common terminal reflector.

10. The one-by-N fiber optical switch of claim 9, wherein said common optical fiber is an input optical fiber, and said at least one first intermediate optical fiber, said first terminal optical fiber, said at least one second intermediate optical fiber, and said second terminal optical fiber are output optical fibers.

11. The one-by-N fiber optical switch of claim 9, wherein said at least one first intermediate optical fiber and said at least one second intermediate optical fiber each comprises one optical fiber.

12. The one-by-N fiber optical switch of claim 9, wherein said at least one first intermediate optical fiber and said at least one second intermediate optical fiber each comprises seven optical fibers.

13. A method of transmitting an optical signal from a common optical fiber to one optical fiber of a series of optical fibers having optical axes parallel to a common optical axis of the common optical fiber, the method comprising the steps:

transmitting said optical signal from said common optical fiber along a common optical axis;

deflecting said optical signal at a ninety-degree angle along a deflected optical axis adjacent said series of optical fibers;

deflecting said optical signal at a ninety-degree angle along an optical axis of said one optical fiber of said series of optical fibers; and receiving said optical signal into said one optical fiber of said series of optical fibers wherein said series of optical fibers are a first and second series of optical fibers, the first series of optical fibers adjacent the common optical fiber, the second series of optical fibers opposite the common optical fiber, the method further comprising the step of bypassing said first series of optical fibers.

* * * * *